United States Patent
Ishiwada et al.

(10) Patent No.: US 6,896,415 B2
(45) Date of Patent: May 24, 2005

(54) ROLLING BEARING AND BEARING APPARATUS

(75) Inventors: Hiroshi Ishiwada, Kanagawa (JP); Mamoru Aoki, Kanagawa (JP); Seizou Miyazaki, Kanagawa (JP); Taikou Nawamoto, Kanagawa (JP); Hirotoshi Aramaki, Kanagawa (JP)

(73) Assignee: NSK, Ltd., Tokyo (JP)

( * ) Notice: Subject to any disclaimer, the term of this patent is extended or adjusted under 35 U.S.C. 154(b) by 0 days.

(21) Appl. No.: 10/190,837

(22) Filed: Jul. 9, 2002

(65) Prior Publication Data
US 2003/0026510 A1 Feb. 6, 2003

(30) Foreign Application Priority Data

| Jul. 10, 2001 | (JP) | P. 2001-209387 |
| Aug. 2, 2001 | (JP) | P. 2001-235145 |
| Aug. 6, 2001 | (JP) | P. 2001-238314 |
| Aug. 7, 2001 | (JP) | P. 2001-239151 |
| Aug. 29, 2001 | (JP) | P. 2001-260292 |
| Aug. 29, 2001 | (JP) | P. 2001-260293 |
| Sep. 13, 2001 | (JP) | P. 2001-278525 |
| Nov. 15, 2001 | (JP) | P. 2001-350676 |

(51) Int. Cl.$^7$ ............ F16C 23/06; F16C 19/08; F16C 33/41
(52) U.S. Cl. ............ 384/517; 384/504; 384/510; 384/523; 384/531
(58) Field of Search ............ 384/517, 518, 384/519, 504–506, 510, 512, 523–533

(56) References Cited

U.S. PATENT DOCUMENTS

| 4,133,588 A | * | 1/1979 | Earsley ............ 384/470 |
| 6,000,855 A | * | 12/1999 | Miyazaki ............ 384/517 |
| 6,354,743 B2 | * | 3/2002 | Muraki et al. ............ 384/490 |
| 6,394,657 B1 | * | 5/2002 | Takamizawa et al. ...... 384/512 |

FOREIGN PATENT DOCUMENTS

| JP | 6-200926 | 7/1994 |
| JP | 8-82324 | 3/1996 |
| JP | 8-114233 | 5/1996 |
| JP | 9/317774 | 12/1997 |
| JP | 10-159855 | 6/1998 |
| JP | 2597521 | 5/1999 |
| JP | 2001-124074 | 5/2001 |

* cited by examiner

Primary Examiner—Thomas R. Hannon
(74) Attorney, Agent, or Firm—Sughrue Mion, PLLC

(57) ABSTRACT

In a bearing apparatus which is composed of two bearings each including a crown-shaped retainer and in which a lubricant is filled into its raceways, a preload is applied from the retainer pocket-opening side end face of an inner ring, and also a preload is applied from the retainer counter-pocket-opening side end face of an outer ring.

25 Claims, 41 Drawing Sheets

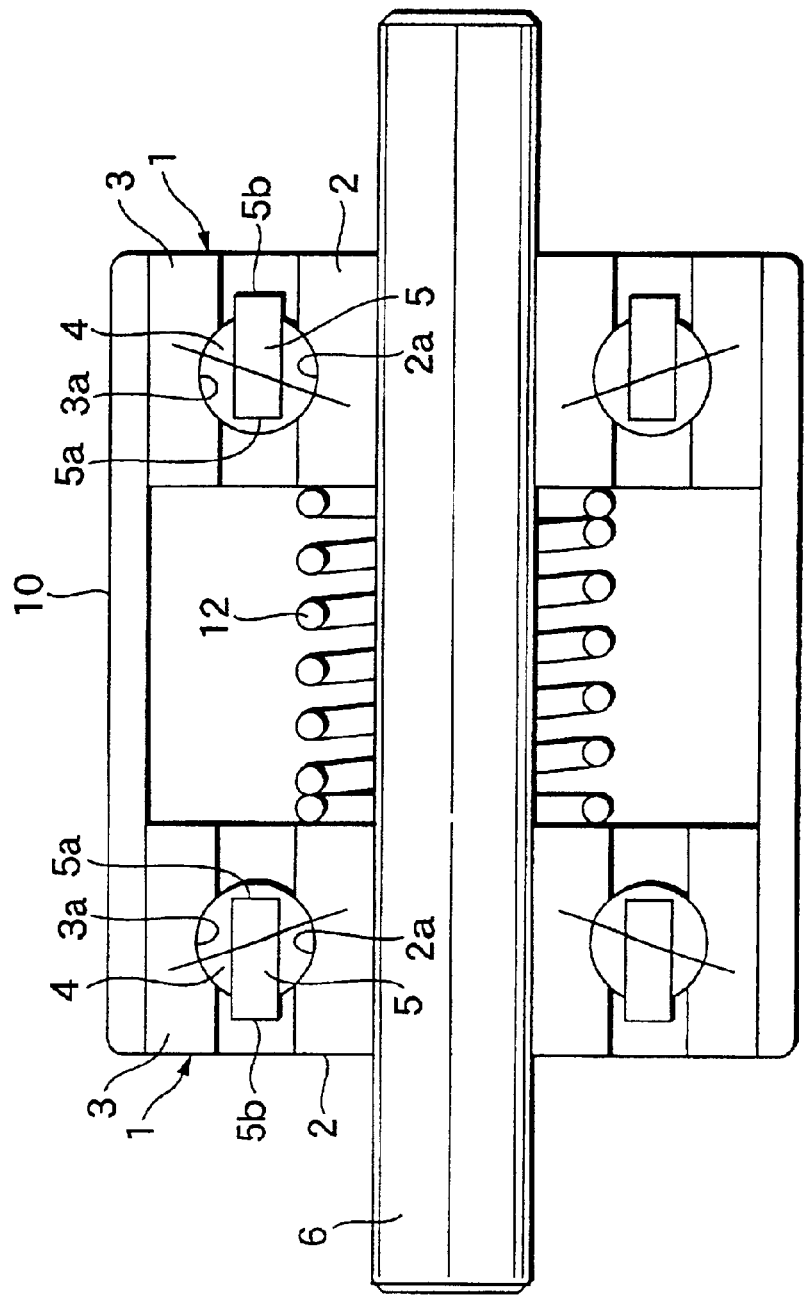

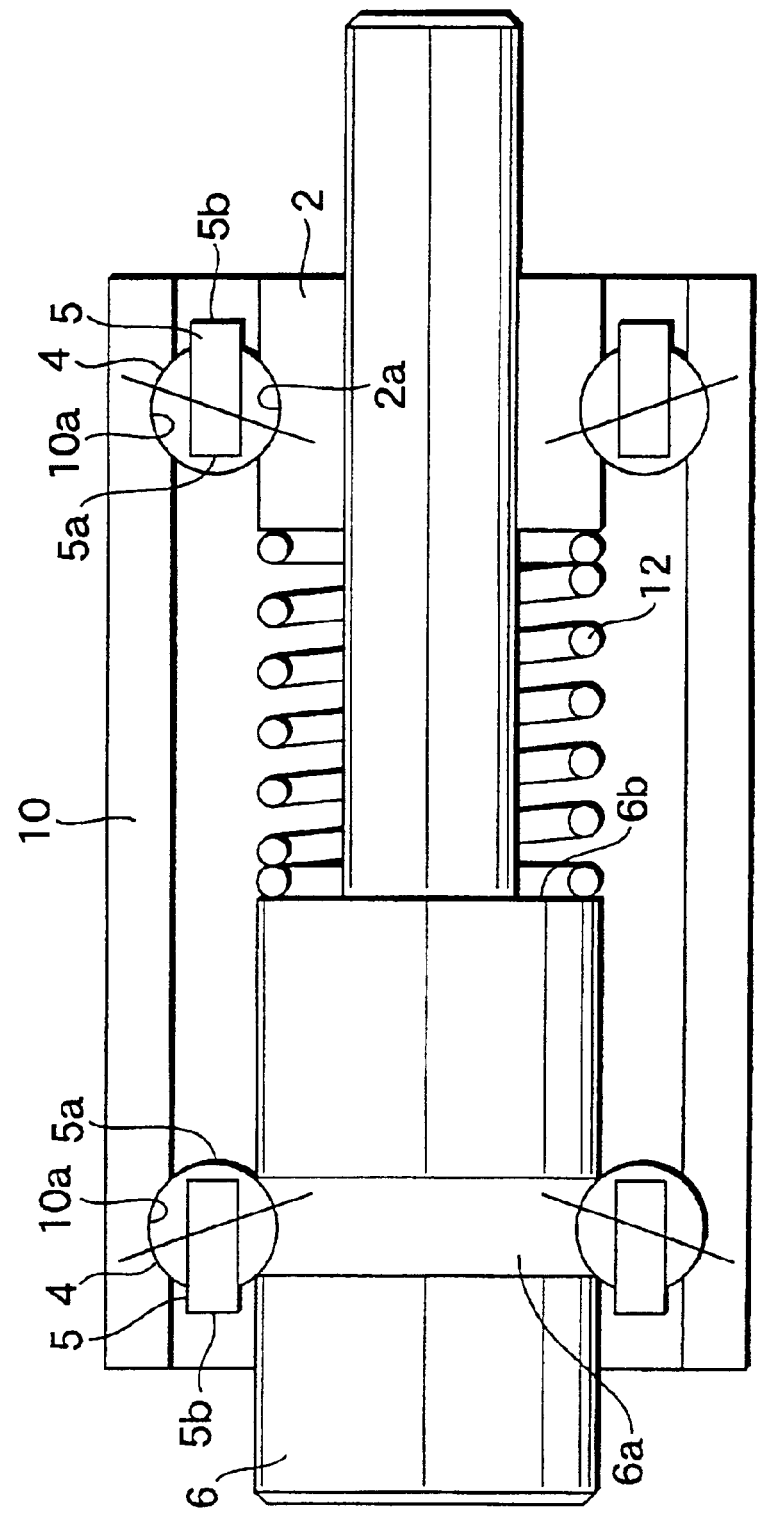

ROLLING BEARING AND BEARING APPARATUS

BACKGROUND OF THE INVENTION

The present invention relates to an improvement in a bearing apparatus for use in various kinds of rotary equipment such as a spindle motor (which is also referred to as SPM) which is applied to, for example, a hard disk drive apparatus (which is also referred to as HDD) or a video cassette recorder (which is also referred to as VCR).

The present invention relates to a rolling bearing and a bearing apparatus for use in a small-sized motor which is used mainly in information equipment and home appliances.

The present invention relates to a reduction not only in the vibrations and noises, but also to a reduction in the dynamic friction torque of the bearing apparatus which is used to support a motor shaft such as a spindle provided in a HDD and a drum spindle provided in a VCR.

The present invention relates to a ball bearing and a bearing apparatus for a small-sized motor which is used in a HDD, a VCR, or a laser beam printer (which is also referred to as an LBP).

Conventionally, a bearing apparatus, as shown in FIG. 44, comprises a pair of bearings 100 and 100 combined together. The combining direction of the two bearings is not fixed specifically but, generally, the opening sides 201 of the respective retainers 200 of the two bearings 100 and 100, in which dust is easy to occur, are disposed opposite to each other, whereby the bearings 100 and 100 are disposed as a bearing unit which can reduce the generation of dust to the outside of the bearing unit. In FIG. 44, reference character 300 designates a shaft and 400 stands for a spacer which is interposed between the two bearings 100 and 100.

Also, as shown in FIG. 45, there is generally known a bearing with a shaft in which double-row raceway 301 and 301 are formed directly in the shaft 300, and a spring 500 is interposed between two outer rings 101 and 101. In this structure, the crown-shaped retainers 200 are incorporated in such a direction that, similarly to the structure shown in FIG. 44, their respective retainer opening sides 202 are opposed to each other. In FIGS. 44 and 45, arrow marks respectively show preload directions. Today, in order to enhance the oscillation resistance (which is also referred to as fretting resistance) of the bearing in transit, a bearing lubricant is filled into the raceways of the bearing, instead of a related method in which the lubricant is filled onto the retainer.

However, when the bearing apparatus of this type is rotated, since the lubricant (a grease as a representative example) is filled in the raceways, the rotation torque of the bearing apparatus and variations in such rotation torque are large. Further, the vibrations of the bearing apparatus not synchronous with the rotation of the bearing apparatus (which is also referred to as NRRO) are also large.

Now, FIG. 46 is an enlarged view of a retainer incorporated into the related bearing apparatus shown in FIG. 45. That is, in such related structure, grease G collecting in the counter-contact-angle side of the outer ring 101 is involved with the rotational movement of a ball 600 and is thereby moved in the rotation (about its own axis) direction of the ball 600. The grease G is scraped by the crown-shaped retainer 200. The thus scraped grease G collects into the outside diameter portion of the retainer end face side (pocket counter-opening side) 202 to provide a collection of grease. The grease collection is contacted with grease G on the outer ring 101 side to thereby generate large resistance, so that the rotation torque of the bearing apparatus increases. Also, the grease G, which has been scraped once, is easy to be involved with the rotational movement of the ball 600, which causes the rotation torque to be unstable and large.

By the way, in the case of an HDD spindle motor for use in information equipment, as shown in FIGS. 47 and 48, a hub 730 is rotatably supported on the periphery of a shaft 720 by a pair of rolling bearings 700 and 700 disposed with a space between them. One end of the shaft 720 is fixed to the central portion of a fixing plate 740 which is referred to as a housing. The rolling bearings 700 and 700 are interposed between the outer peripheral surfaces of the base end portion (in FIG. 47, the lower end portion) and leading end portion (in FIG. 47, the upper end portion) of the shaft 720, so that the hub 730 can be rotated on the periphery of the shaft 720. A stator 750 is fixed to the portion of the middle portion outer peripheral surface of the shaft 720 that is held by the pair of rolling bearings 700 and 700; a rotor is fixed to the portion of the middle portion inner peripheral surface of the hub 730 that is opposed to the outer peripheral surface of the stator 750; and, the stator 750 and rotor 760 cooperate together in constituting an electric motor 770 which is used to drive or rotate the hub 730. Also, a plurality of hard disks 780, 780 is fixed to the outer peripheral surface of the hub 730. By the way, reference characters 790, 790 respectively designate heads for reading records from the hard disks 780, 780 and writing records into the hard disks 780, 780.

On the other hand, the two rolling bearings 700 and 700 respectively comprise inner rings 701 and 701 having inner raceways 701a and 701a formed in the outer peripheral surfaces thereof, outer rings 702 and 702 having outer raceways 702a and 702a formed in the inner outer peripheral surfaces thereof, a plurality of rolling elements 703, 703 rotatably interposed between the inner raceways 701a, 701a and outer raceways 702a, 702a, and crown-shaped retainers 704 made of synthetic resin.

Also, between the outer peripheral surfaces of the axial-direction two end portions of the respective inner rings 701 and 701 and the inner peripheral surfaces of the two end portions of the respective outer rings 702 and 702, there are interposed a pair of seal rings 705 and 705 each of which is formed in a circular ring to thereby close spaces between the inner ring and outer ring peripheral surfaces. The upper and lower bearings are combined together in such a manner that, in order to reduce dust generation to the outside of the bearings, the pocket-opening sides 704a and 704a of the crown-shaped retainers 704 and 704 of the bearings are opposed to each other.

Further, into spaces 706 defined by and between the pair of seal rings 705 and 705, there is filled grease 707 and 707 from one of the pocket-opening sides (in FIG. 47, in the case of the upper rolling bearing 700 the lower-end pocket-opening side; and, also in FIG. 47, in the case of the lower rolling bearing 700, the upper-end pocket-opening side) of the respective spaces 706 and 706. Of the pair of seal rings 705 and 705, at least the seal ring 705 on the grease 707 filling side is to be mounted into a given portion after completion of the grease filling operation.

After the seal rings 705 and 705 are mounted, the seal rings 705 and 705 prevent the grease 707 filled in the respective spaces 706 and 706 from leaking therefrom to the outside.

However, in the above related bearing apparatus, there are still found problems to be solved: that is, when it is rotated, the rotation torque thereof and variations in the rotation torque are large; and vibrations not synchronous with the rotation of the bearing apparatus are also large.

In view of the above, in order to solve the above problems found in the related bearing apparatus, the present inventors have previously proposed a bearing apparatus (Japanese Patent Application 2001-209387) structured such that a bearing incorporating a crown-shaped retainer is fixed to a shaft, wherein a preload is applied to the retainer pocket-opening side of the inner ring of the bearing, and also to the retainer counter-pocket-opening side of the outer ring of the bearing. In this case, it is required that the pocket-opening side and counter-pocket-opening side of the retainer incorporated into the bearing be distinguishable from each other simply and positively from the outside. Especially, in the case of a related bearing with seal plates respectively mounted on two ends thereof, the pocket-opening side and counter-pocket-opening side of the retainer of the bearing, that is, the incorporating direction of the retainer, cannot be distinguished from each other.

By the way, for a motor shaft which is used to drive a hard disk apparatus or a floppy disk apparatus for use in a personal computer and a word processor, there is used a ball bearing having a small diameter. In the case of a ball bearing, as a type for guiding a retainer made of synthetic resin, there are known a rolling element guide type for guiding a retainer using a rolling element (a ball), and an inner ring or outer ring guide type for guiding a retainer using an inner ring or an outer ring. In either of these guide types, as time passes, the quantity of lubricant (grease, or an oil component) filled into the pocket of the retainer decreases, so that the frictional torque of the bearing gradually decreases and becomes almost constant.

As the shape of the pocket of the retainer for holding a ball, there are known two kinds of shapes: that is, as shown in FIGS. 49 and 50, which is an enlarged section view taken along the line VI—VI shown in FIG. 49, one type of retainer pocket shape is such that the inner wall of the pocket 840P of a retainer 840 for holding a ball 830 interposed between an outer ring 810 and an inner ring 820 has a flat cylindrical surface; and, as shown in FIGS. 51 and 52, which is an enlarged section view taken along the line VIII—VIII shown in FIG. 51, the other type of retainer pocket shape is such that the inner wall of the pocket 841P of a retainer 841 has a spherical surface. Further, most of the retainers of an inner ring or outer ring guide type include a cylindrical-shaped pocket, whereas most of the retainers of a rolling element guide type include a spherical-shaped pocket. Also, depending on the situation, there may be taken means in which, as disclosed in JP-A-9-317774, there are formed fine undulations (raised and recessed portions) on the sliding surfaces of these retainers to thereby enhance the lubricating property of the retainers.

On the other hand, when these bearings are used in the above-mentioned motor, in order to enhance the rotation accuracy thereof, generally, two bearings are combined together as a pair and are given a preload.

As described above, in the case of the ball bearing, preferably, when the quantity of the lubricant filled into the pocket of the retainer gradually decreases from the beginning, the ball bearing may be stabilized and the frictional torque of the ball bearing may be constant.

However, in a retainer of an inner ring 820 (or outer ring 810) guide type, including a cylindrical-shaped pocket 840P shown in FIGS. 49 and 50, most of the lubricants circulate in the order of ball surface-raceway surface-pocket surface-ball surface and are left within the pocket. Due to this, the friction torque of the bearing is large when compared with a bearing of a rolling element guide type including a spherical-shaped retainer pocket, which raises a problem to be solved. That is, in the case of a bearing including a retainer of a race guide type including a cylindrical-shaped pocket, since a ball is contacted with the center of the pocket, there does not occur a scraping operation for scraping away the lubricants. Thus even as the time passes, in most cases, the torque of the bearing does not lower.

On the other hand, in the retainer 841 of a rolling element guide type shown in FIGS. 51 and 52, extra lubricants G sticking to the surface of the ball 830 are scraped away by the edge portion of the spherical-surface pocket 841P and are stuck to the inner or outer peripheral surface of the retainer to thereby have no influence on the torque of the bearing; and, the viscous resistance of the lubricant with respect to the ball and race contact portion decreases as the rotation time passes and the reduction of the torque continues.

And, in the case where the scraping operation advances excessively due to the high-speed rotation, cutting of an oil film occurs in the pocket edge portion and ball surface to cause poor lubrication. And due to poor lubrication, there are produced strange sounds. Also, in order to prevent such poor lubrication, the sliding surface of the retainer is set not flat or smooth but is set so as to have desired roughness to thereby form lubricating oil standing portions and thus prevent cutting of the oil film, whereby the friction of the retainer can be controlled for a long period of time. However, in the case of a bearing using such a retainer, similarly to the above-mentioned retainer including a cylindrical-shaped pocket, there is found a problem that the friction torque of the bearing is large.

Conventionally, as means for supporting various rotary parts, for example, there is widely used such a ball bearing as disclosed in JP-A-10-159855 (see FIG. 54).

This ball bearing comprises an outer ring 3 having an outer raceway formed in the inner peripheral surface thereof, an inner ring 2 having an inner raceway formed in the outer peripheral surface thereof, a crown-shaped retainer 5 interposed between the outer and inner rings 3 and 2 in such a manner that it can be rotated with respect to the outer and inner rings 3 and 2, and a plurality of balls 4 respectively rotatably held in a plurality of pockets 5d formed in the crown-shaped retainer 5. The outer peripheral edges 9a of two circular-ring-shaped shield plates 9 are respectively secured to the inner peripheral surfaces of the two end portions of the outer ring 3. The two shield plates 9 prevent grease existing in the above-mentioned ball installation portions from leaking to the outside, and also prevent dust floating on the outside from flowing into the ball installation portions.

As described above, the plurality of balls 4 are rotatably held by the retainer 5. Conventionally, as the retainer 5, for example, there is used a crown-shaped retainer as shown in FIG. 37. This crown-shaped retainer 5 has the same number of spherically-concave-surface pockets 5d as the balls 4 in order to hold the balls 4 in a freely rollable manner. Further, the radius of curvature of the spherically concave surface of the retainer pocket is set slightly larger than the radius of curvature of each of the balls 4.

When the bearing of this type is used to support various rotary apparatuses, generally, two bearings 1 and 1 of this type are used in combination.

However, in the above-mentioned related bearing, there are still found the following problems to be solved.

Recently, as the rotation speed of the rotary apparatus increases, there increases the need for a reduction in the noises and vibrations of the bearing. Also, there is a need for a reduction in the dynamic friction torque of the bearing. However, the related bearing apparatus has become more and more difficult to meet such reduction needs. That is, to reduce the noises and vibrations, the pocket diameter of the retainer 5 may be reduced to reduce the play of the retainer 5 with respect to the ball 4, thereby controlling the movement of the retainer 5. However, when the play (clearance) of the retainer 5 is reduced, there is increased the shearing resistance of lubricants existing between the retainer pockets 5d and balls 4, with the result that the dynamic friction torque of the bearing apparatus increases.

By the way, conventionally, a ball bearing to be incorporated into the above-mentioned HDD, VCR or LBP, for example, as shown in FIG. 44, is composed of a pair of bearings 100 and 100 combined together; and, the combining direction of the two bearings 100 and 100 is not fixed to any specific direction but, generally, the two bearings 100 and 100 are disposed in such a manner that the pocket-opening sides 201 of the respective retainers 200 of the two bearings 100 and 100 are opposed to each other, thereby reducing generation of dust to the outside of the bearings 100 as a training unit.

Also, today, in order to enhance the oscillation resistance (which is also referred to as the fretting resistance) of the product (ball bearing) in transit, a lubricant is filled into raceways formed in the two bearings. Such a configuration is different from a related lubricant filling system in which the lubricant is filled on to the retainers of the two bearings.

However, in the bearing apparatus of this type, there is still found a problem: that is, when it is rotated, since the lubricant is sealed in the grooves of the two bearings, the rotation torque of the apparatus and the variations of the rotation torque are large. Additionally, vibrations not synchronous with the rotation (NRRO) of the apparatus are large.

Also, when the two bearings 1, 1 are used under high-speed rotation, in order to restrict the mechanical slippage of the interior portion of the bearing, it has been considered effective to reduce a contact angle at which the balls and the raceway surfaces are contacted with each other.

However, recently, as the rotation speed of the various rotary apparatus increases, there has been increased the need for a reduction in the dynamic friction torque of the bearing. That is, simply by reducing the contact angle in the above-described manner, the dynamic friction torque of the bearing caused by the high-speed rotation of the bearing can not be restricted sufficiently.

Specifically, the high-speed rotation of the bearing causes the grease existing in the interior of the bearing to move much and, especially, the grease moved to the inside diameter of the outer ring—due to a centrifugal force—is stirred between the outer ring inside diameter and the outside diameter portion of the retainer, thereby increasing stirring resistance or shearing resistance, with the result being that the dynamic friction torque of the bearing is increased.

SUMMARY OF THE INVENTION

The present invention aims at eliminating the drawbacks found in the Cy above-mentioned related bearing apparatus. Accordingly, it is a first object of the present invention to provide a bearing apparatus which not only is small in rotation torque, and variations in such rotation torque, but also is high in rotation accuracy.

A second object of the present invention is to provide a rolling bearing in which the incorporating direction of a retainer can be distinguished easily from the outside and the assembling direction of the bearing can be controlled positively according to the incorporating direction of the retainer. A third object of the present invention is to provide a bearing apparatus which not only can maintain the proper quantity of a lubricant, to thereby stabilize the friction torque of the bearing, but also can control an increase in the temperature thereof and the friction thereof.

A fourth object of the present invention is to provide a bearing apparatus which can satisfy the need for reduction in noise and vibrations thereof, as well as for reduction in the dynamic friction torque thereof.

In attaining the first object, according to a first aspect of the present invention, there is provided a bearing apparatus comprising a bearing fixed to a shaft, the bearing including: an outer ring having an outer raceway formed in an inner peripheral surface thereof; an inner ring having an inner raceway formed in an outer peripheral surface thereof; a crown-shaped retainer interposed between the outer and inner rings so as to be rotated with respect to the outer and inner rings; and a plurality of balls rotatably held in a plurality of pockets formed in the crown-shaped retainer, wherein a preload is applied to a retainer opening side of the inner ring of the bearing and a retainer counter-opening side of the outer ring. That is, the present bearing apparatus is used in a state where a contact angle does not provide an angle of zero. A contact point between the inner ring and ball is situated in the inner raceway surface on the retainer pocket-opening side. And a contact point between the inner ring and ball is situated in the outer raceway surface on the retainer counter-pocket-opening side.

According to a second aspect of the present invention, there is provided a bearing apparatus comprising two bearings fixed to a shaft, each bearing including: an outer ring having an outer raceway formed in an inner peripheral surface thereof; an inner ring having an inner raceway formed in an outer peripheral surface thereof, a crown-shaped retainer interposed between the outer and inner rings so as to be rotated with respect to the outer and inner rings; and a plurality of balls rotatably held in a plurality of pockets formed in the crown-shaped retainer, wherein a preload is applied to the retainer pocket-opening sides of the respective inner rings of the two bearings and the retainer counter-pocket-opening sides of the respective outer rings of the two bearings. Also, a bearing apparatus as set forth in the second aspect of the present invention, wherein the respective retainers of the two bearings are incorporated in such a manner that the counter-pocket-opening sides of the retainers are opposed to each other. Further, there is provided a bearing apparatus as set forth in the second aspect of the present invention, wherein the respective retainers of the two bearings are incorporated in such a manner that the pocket-opening sides of the retainers are opposed to each other.

According to a third aspect of the present invention, there is provided a bearing apparatus comprising two bearings structured such that a preload is applied to the respective outer rings of the two bearings in a direction to separate the outer rings in the two rows from each other, wherein crown-shaped retainers of the two bearings are incorporated in such a manner that their respective counter-pocket-opening sides are opposed to each other. Also, in the present bearing apparatus, there is interposed a spring between the respective outer rings of the two bearings.

According to a fourth aspect of the present invention, there is provided a bearing apparatus comprising two bearings structured such that a preload is applied to respective outer rings of the two bearings in a direction to that the outer rings approach each other, wherein crown-shaped retainers of the two bearings are incorporated in such a manner that their respective pocket-opening sides are opposed to each other.

According to a fifth aspect of the present invention, there is provided a bearing apparatus comprising two bearings structured such that a preload is applied to respective inner rings of the two bearings in a direction so that the inner rings approach each other, wherein crown-shaped retainers of the two bearings are incorporated in such a manner that their respective counter-pocket-opening sides are opposed to each other. Also, there is provided a bearing apparatus comprising two bearings structured such that a preload is applied to respective inner rings of the two bearings by a spring interposed between the respective inner rings in a direction so that the inner rings separate from each other, wherein crown-shaped retainers of the two bearings are incorporated in such a manner that their respective pocket-opening sides are opposed to each other.

In the above-mentioned double-row-type bearing apparatus, there is provided a bearing apparatus as set forth in the second to fifth aspects of the present invention, further comprising a shaft fixing the two bearings, wherein the shaft includes a double row raceway so as to receive rolling elements of the two bearings; or, the inner rings may be fixed to the shaft; or the shaft includes a raceway formed in one side thereof so as to receive rolling elements of one of the two bearings, whereas the inner ring is fixed to the other side of the shaft so as to receive rolling elements of the other of the two bearings. Also, in the double-row-type bearing apparatus, there is provided a bearing apparatus as set forth in the second to fifth aspects of the present invention, wherein a raceway for the balls is formed at least in a portion of the shaft or a housing.

Also, there is provided a bearing apparatus as set forth in the first aspect of the present invention, wherein the bearing apparatus is of an outer ring rotation type or an inner ring rotation type.

Further, in all or some of the above-mentioned bearing apparatuses, there may be provided an indicating arrangement, which allows the incorporating direction of the retainer to be distinguished, on at least one of the axial-direction end faces thereof.

According to a sixth aspect of the present invention, there is provided a rolling bearing comprising: an inner ring having an inner raceway formed in an outer peripheral surface thereof; an outer ring having an outer raceway formed in an inner peripheral surface thereof; a plurality of rolling elements rotatably interposed between the inner raceway and the outer raceway; a crown-shaped retainer for holding the rolling elements at regular intervals; and a seal ring interposed between the inner and outer rings for sealing grease or lubricating oil filled into a bearing space or for preventing dust from being generated to the outside, wherein an indicating arrangement, which allows the incorporating direction of the retainer to be distinguished, is provided on one of the axial-direction end faces thereof.

According to a seventh aspect of the present invention, in a rolling bearing as set forth in the sixth aspect of the present invention, the indicating arrangement may be a mark provided on either of the axial-direction end faces thereof.

According to an eighth aspect of the present invention, in a rolling bearing as set forth in the seventh aspect, the mark includes a toothing.

Further, according to a ninth aspect of the present invention, in a rolling bearing as set forth in the sixth aspect, the indicating arrangement may be a seal ring disposed on either one of the axial-direction end faces thereof.

According to a tenth aspect, in a rolling bearing as set forth in the sixth aspect, the indicating arrangement may be seal rings which are respectively disposed on both of the axial-direction end faces thereof, and which differ in color from each other.

According to an eleventh aspect, there is provided a bearing apparatus in which a bearing as set forth in any one of the sixth to tenth aspects of the present invention, may be fixed to a shaft wherein a preload is applied to a retainer pocket-opening side of the inner ring and a retainer counter-pocket-opening side of the outer ring.

In attaining the above third object, according to a twelfth aspect of the present invention, there is provided a bearing apparatus, as set forth in the first or second aspects, wherein the crown-shaped retainer has at least a rolling element sliding contact surface formed as a rough surface.

In the above bearing apparatuses, there can also be employed a structure that two bearings, each consisting of the above-mentioned bearing, are combined together as a pair. Also, in the bearing apparatus composed of two bearings combined together as a pair, there may be not only a case where the respective retainers of the two bearings are incorporated in such a manner that the counter-pocket-opening sides thereof are disposed opposed to each other, but also a case where the respective retainers of the two bearings are incorporated in such a manner that the pocket-opening sides thereof are disposed opposed to each other. Also, a preload may be applied not only to the retainer pocket-opening sides of the respective inner rings of the two bearings but also to the retainer counter-pocket-opening sides of the respective outer rings of the two bearings.

In attaining the above fourth object, according to a thirteenth aspect of the present invention, there is provided a bearing apparatus, as set forth in the first aspect, wherein a ratio Dp/Dw of a pocket diameter (Dp) of the retainer to a diameter of the ball (Dw) is set such that 1.050>Dp/Dw>1.005.

According to a fourteenth aspect of the present invention, there is provided a beating, as set forth in the thirteenth aspect, wherein the retainers of the two ball bearings are incorporated in such a manner that the counter-pocket-opening sides of the two retainers are opposed to each other, or the pocket-opening sides thereof are disposed opposed to each other.

In attaining the above first object, according to a fifteenth aspect of the present invention, there is provided a ball bearing, comprising: an inner ring having an inner raceway formed in an outer peripheral surface thereof; an outer ring having an outer raceway formed in an inner peripheral surface thereof; a plurality of balls rotatably incorporated between the inner raceway and the outer raceway; and a crown-shaped retainer for holding the balls at regular intervals, wherein a preload is applied to a pocket-opening side of the inner ring of the retainer and a counter-pocket-opening side of the outer ring of the retainer, and a pawl height T of the retainer is set 20% or less of the diameter Da of the ball (T≦20%×Da) with a shoulder position of the raceway of the outer ring as the standard.

According to a sixteenth aspect of the present invention, in a ball bearing as set forth in the fifteenth aspect of the present invention, there is provided an indicating arrangement, which allows the incorporating direction of the retainer to be distinguished, on the two end faces of the ball bearing in the axial direction thereof.

According to a seventeenth aspect of the present invention, there is provided a bearing apparatus, wherein a ball bearing as set forth in the fifteenth or sixteenth aspects of the present invention is incorporated into a shaft.

In attaining the above fourth object, according to an eighteenth aspect of the present invention, there is provided a bearing apparatus, as set forth in the first aspect, wherein an initial contact angle between the ball and raceway surface of the raceway is set at an angle of 5° or more.

Further, two seal plates may be respectively disposed on the two end portions of the bearing in the axial direction thereof.

BRIEF DESCRIPTION OF THE DRAWINGS

FIG. 22 is a schematic section view of an eighteenth embodiment of a bearing apparatus according to the present invention;

FIG. 23 is a schematic section view of a nineteenth embodiment of a bearing apparatus according to the present invention;

FIG. 24A is a schematic section view of a bearing apparatus according to the present invention, and FIG. 24B is a front view thereof;

FIG. 27A shows a structure according to the prior art, and FIG. 27B shows a structure according to the present invention;

FIG. 43A shows an A-direction preload, and FIG. 43B shows a B-direction preload;

DETAILED DESCRIPTION OF THE PREFERRED EMBODIMENTS

Now, description will be given of the preferred embodiments of a bearing apparatus according to the present invention with reference to the accompanying drawings. By the way, the embodiments illustrated herein are just examples of the present invention and, thus, the present invention is not limited to the illustrated embodiments at all. Also, the respective embodiments can be applied to either an outer ring rotation system or an inner ring rotation system.

First Embodiment

Figure 1:
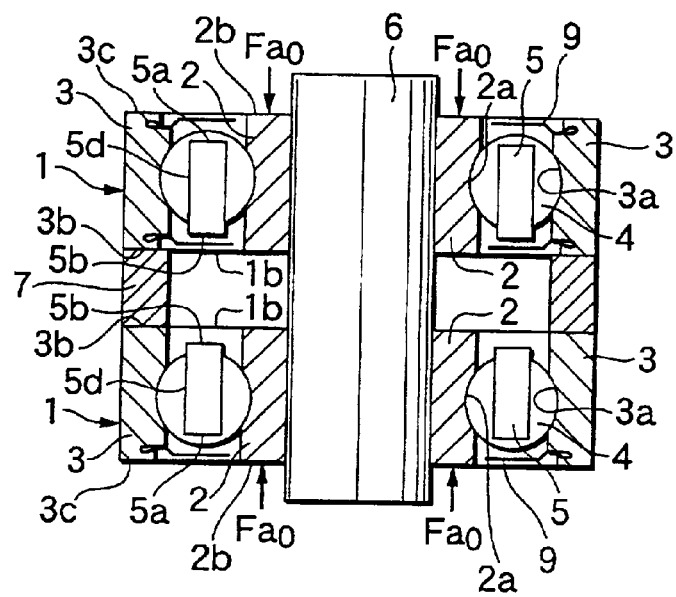
FIG. 1 is a schematic section view of a first embodiment of a bearing apparatus according to the present invention.

Now, FIG. 1 shows a first embodiment of a bearing apparatus according to the present invention. The bearing apparatus comprises two rolling bearings 1 and 1, in which the two rolling bearings 1 and 1 are combined together in such a manner that the inner rings 2 and 2 of the two rolling bearings 1 and 1 are respectively fixed to the outer periphery of a shaft 6 and a preload (axial load) is applied to the two rolling bearings 1 and 1. Although description will be given of a structure using two bearings as a pair, the present invention is not limited to such combination of two bearings.

The rolling bearing 1 is a ball bearing which comprises an inner ring 2 having an inner raceway 2a formed in the outer periphery thereof, an outer ring 3 having an outer raceway 3a formed in the inner periphery thereof, a plurality of rolling elements 4 interposed between the inner raceway 2a and outer raceway 3a, and a crown-shaped retainer 5 for holding the rolling elements 4 at regular intervals.

Figure 37:
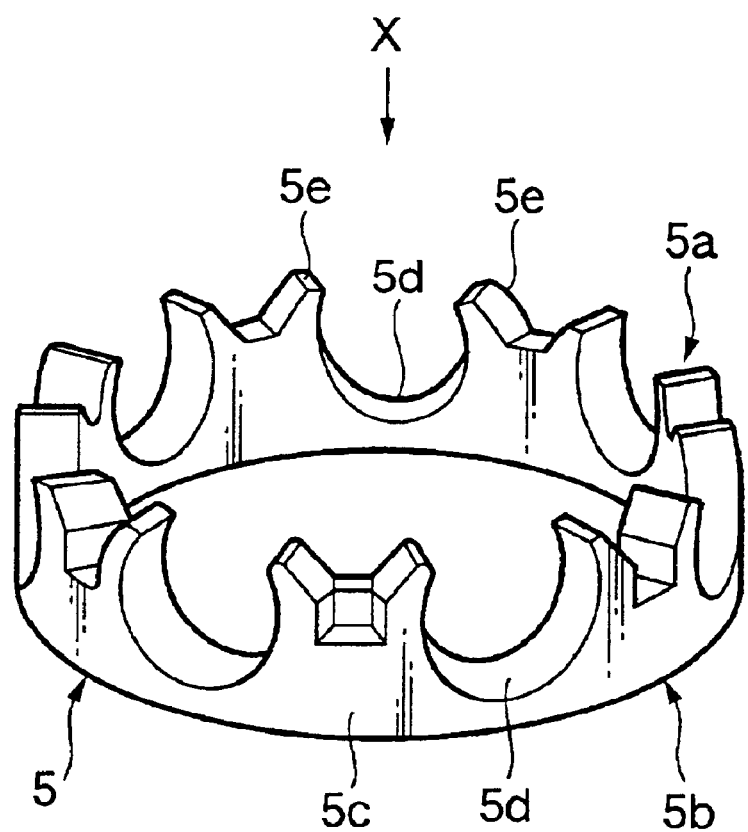
FIG. 37 is a perspective view of a crown-shaped retainer.

The crown-shaped retainer 5 comprises, with reference to FIG. 37 for example, a ring-shaped main portion 5c and a plurality of pockets 5d formed in one axial-direction end surface of the main portion 5c; and, more specifically, each of the pockets 5d is interposed between a pair of pawls (which is also referred to as elastic pieces) 5e disposed spaced from each other on the one axial-direction end surface of the main portion 5c.

Also, between the inner and outer rings 2 and 3 of each of the two bearings 1, there can be interposed a seal plate (in the present embodiment, a shield plate, which can be a contact-type seal or a non-contact type seal) 9 as the need arises. The structure of the seal plate 9 is not limited to any specific one, and it can be changed variously without departing from the scope of the present invention. Also, in order to enhance the oscillation resistance of the product (bearing) in transit, a lubricant (a grease as a representative example) to be filled into the bearing 1 can be filled into the raceways (that is, the inner raceway 2a, outer raceway 3a) of the bearing. Especially, according to the present invention, in the bearing apparatus comprising the two bearings 1 and 1 combined together and employing a lubricant filling sys tem, whereby a lubricant can be filled into the raceways of the bearings, the rotation torque of the bearing apparatus can be reduced and the rotation accuracy of the bearing apparatus can be enhanced.

As described above, although the rolling bearing 1 is not limited to any specific structure (it may employ an ordinary structure), the present embodiment has the following characteristic elements of the present invention: the counter-pocket-opening sides 5b and 5b of the respective retainers 5 and 5 of the two bearings 1 and 1 are disposed opposed to each other; and, a preload (axial load) is applied not only to the end faces 2b and 2b of the inner rings 2 and 2 situated on the retainer pocket-opening sides 5a and 5a, but also to the end faces 3b and 3b of the outer rings 3 and 3 situated on the retainer counter-pocket-opening sides 5b and 5b. Therefore, the structures of the inner ring 2, outer ring 3, rolling element 4, and crown-shaped retainer 5 are not limited to any specific ones but they can be structured arbitrarily, and thus the detailed description there of is omitted here.

Between the outer rings 3 and 3 of the roll ing bearings 1 and 1 there are interposed spacers 7, and a preload Fao is applied to the inner rings 2 and 2 from the retainer pocket-opening sides 5a and 5a, so that the preload can be applied to the outer rings 3 and 3 from the retainer counter-pocket-opening sides 5b and 5b (see FIG. 1). By the way, the method for applying the preload is not limited, and can be changed. Also, the amount of the preload is not limited to any specific amount, but can be set at an optimum amount depending on the situation.

Figure 2:
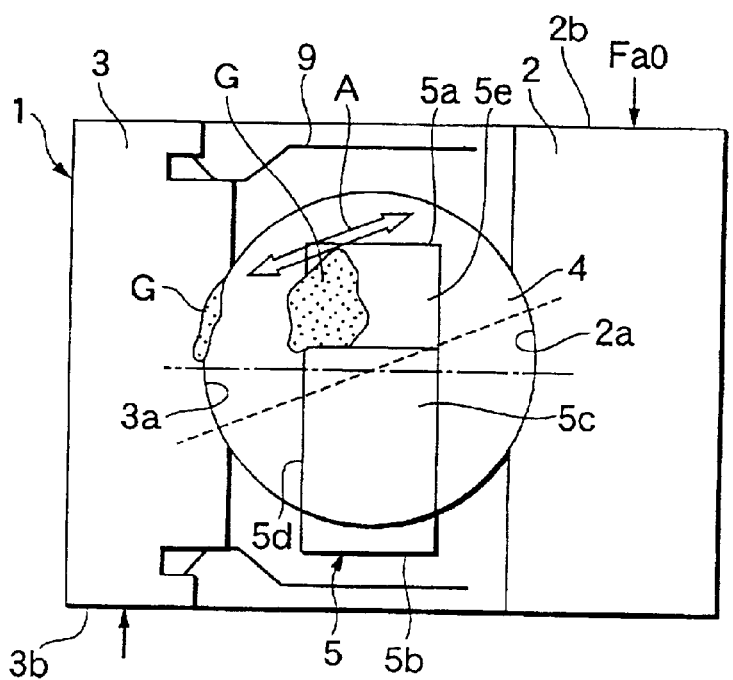
FIG. 2 is a schematic enlarged view of the retainer incorporating direction portion of the first embodiment.

In the bearings 1, since the preload is applied not only to the inner ring end faces 2b and 2b situated on the retainer pocket-opening sides 5a and 5a, but also to the outer ring end faces 3b and 3b situated on the retainer counter-pocket-opening sides 5b and 5b, it is possible to design a bearing apparatus which can provide reduced torque and enhanced rotation accuracy. Also, the dust-production problem, which is found in the above-mentioned related bearing apparatus, can be solved by using a magnetic fluid seal. That is, as shown in FIG. 2, grease G, as the lubricant mentioned above and filled into the bearing raceways, collects on the counter-contact-angle side and, especially due to the centrifugal force thereof, on the outer ring 3 side. Grease G collecting on the counter-contact-angle side of the outer ring 3, due to the rotation of the ball 4, is moved to the retainer pawl 5e side in parallel to the contact angle (the moving direction is shown by an arrow marked A in FIG. 2), and the grease G is scraped in the vicinity of the retainer pawl 5e. The thus scraped grease G accumulates between the pawls 5e, which makes it possible to realize proper grease supply.

Second Embodiment

Figure 3:
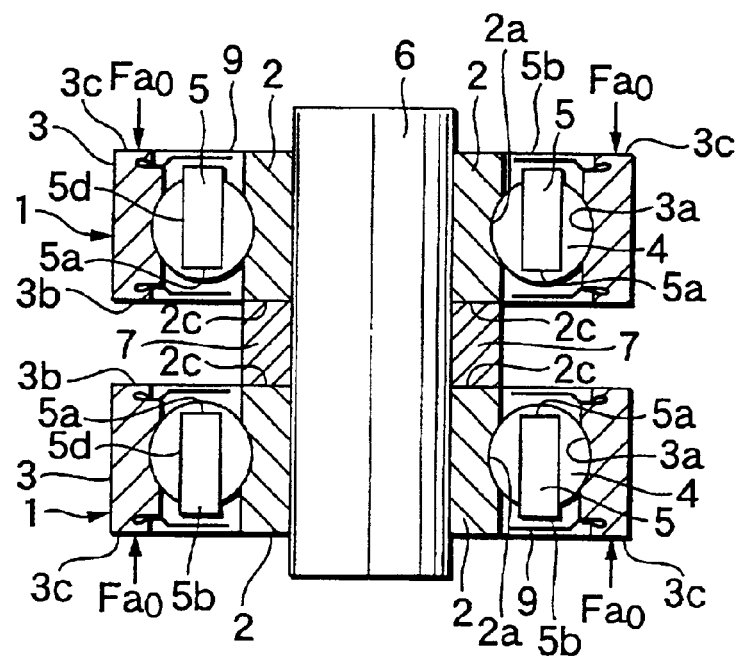
FIG. 3 is a schematic section view of a second embodiment of a bearing apparatus according to the present invention.

Now, FIG. 3 shows a second embodiment of a bearing apparatus according to the present invention.

The present embodiment is different from the first embodiment in that the pocket-opening sides 5a and 5a of the retainers 5 and 5 are opposed to each other. Additionally, a preload is applied not only to the end faces 2c and 2c of the inner rings 2 and 2 situated on the retainer pocket-opening sides 5a and 5a, but also to the end faces 3c and 3c of the outer rings 3 and 3 situated on the retainer counter-pocket-opening sides 5b and 5b. The inner rings 2, outer rings 3, rolling elements 4 and retainers 5 are not limited to any specific structures, and thus the detailed description thereof is omitted here.

Between the inner rings 2 and 2 of the rolling bearings 1 and 1, there are interposed spacers 7, and a preload Fao is applied to the outer rings 3 and 3 from the retainer counter-pocket-opening sides 5b and 5b. By the way, the method for applying the preload is not limited, and can be changed. Also, the amount of the preload is not limited to any specific amount, but can be set at an optimum amount depending on the situation.

Because the preload is applied not only to the inner ring end faces 2c and 2c situated on the retainer pocket opening sides 5a and 5a, but also to the outer ring end faces 3c and 3c situated on the retainer pocket counter-opening sides 5b and 5b, it is possible to design a bearing apparatus which can provide reduced torque and enhanced rotation accuracy. Also, the dust-production problem, which is found in the related bearing apparatus, can be solved by using a magnetic fluid seal.

By the way, in the first and second embodiments, the two bearings 1 and 1 are spaced from each other by the spacer 7. Alternatively, however, the two bearings 1 and 1 may also be spaced from each other by changing the widths of the inner and outer rings 2 and 3.

Third Embodiment

Figure 4:
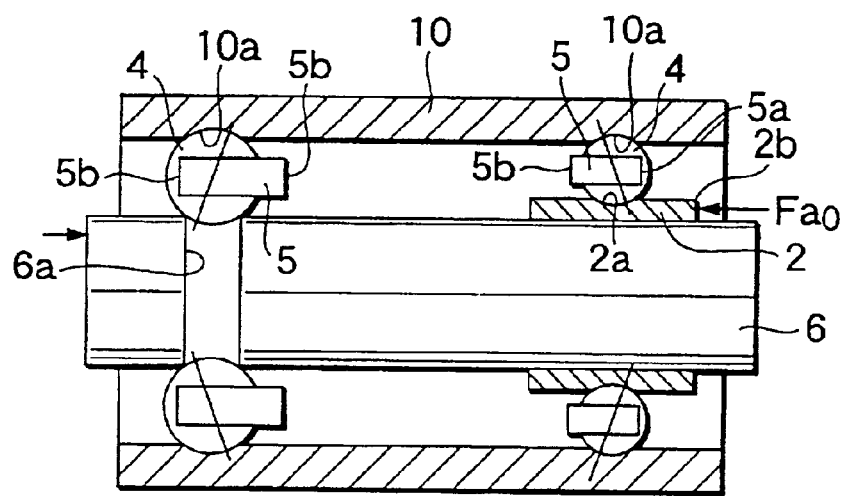
FIG. 4 is a schematic section view of a third embodiment of a bearing apparatus according to the present invention.

FIG. 4 shows a third embodiment of a bearing apparatus according to the present invention.

The bearing apparatus comprises a housing 10, a shaft 6, a plurality of rolling elements 4, and crow-shaped retainers. The housing 10 has a double row raceway 10a and 10a formed in the inner periphery thereof. The shaft 6 has a raceway 6a so formed in one portion of the outer periphery thereof as to be opposed to one raceway 10a of the housing 10, and an inner ring 2 in formed separately from, and fixable to, another portion of the outer periphery of the shaft 6 such that its raceway 2a is opposed to the other raceway 10a of the housing 10. The plurality of rolling elements (balls) 4 . . . and 4 . . . are incorporated between one raceway 10a of the housing 10 and the raceway 6a of the shaft 6, as well as between the other raceway 10a of the housing 10 and the raceway 2a of the inner ring 2, through their respective crown-shaped retainers 5 and 5.

In the present embodiment, as shown in FIG. 4, the left side of the shaft 6 is held and the right-side end face 2b of the inner ring 2 is pushed to thereby apply a preload Fao. Therefore, this preload type provides a so called O-type preload. The crown-shaped retainers 5 and 5 are incorporated in such a direction that their respective counter-pocket-opening sides 5b and 5b are opposed to each other.

Figure 5:
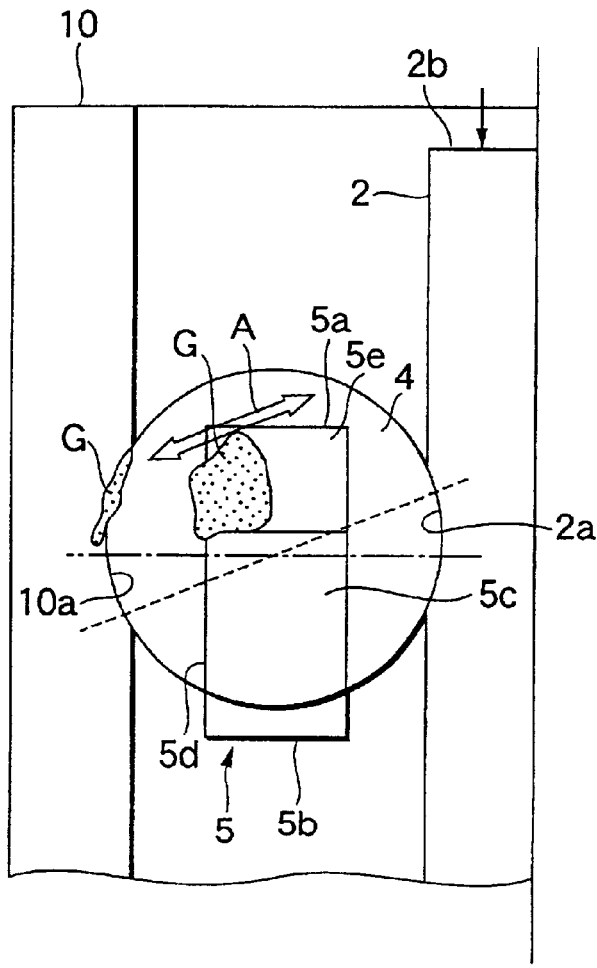
FIG. 5 is a schematic enlarged view of the retainer incorporating direction portion of the third embodiment.

As described above, since the preload Fao is applied to the end face 2b while the crown-shaped retainers 5 and 5 are disposed in such a manner that the respective pocket counter-opening sides 5b and 5b are opposed to each other (that is, the crown-shaped retainers 5 and 5 of the two bearings are disposed in an outwardly facing manner that the respective pockets 5d are not opposed to each other), similarly to the previously described first and second embodiments, grease G collecting on the counter-contact-angle side of the groove 10a of the housing 10 is involved with the rotational movement of the ball 4 and is thereby moved with the rotation of the ball 4 about its own axis. The grease G is scraped by the crown-shaped retainers 5, and the thus scraped grease G collects between the pawls 5e of the crown-shaped retainers 5 and is stabilized there (see FIG. 5). The detailed structures and operation effects of the inner rings 2, rolling elements 4, and crown-shaped retainer 5 are similar to those previously described, and thus the description thereof is omitted here.

Fourth Embodiment

Figure 6:
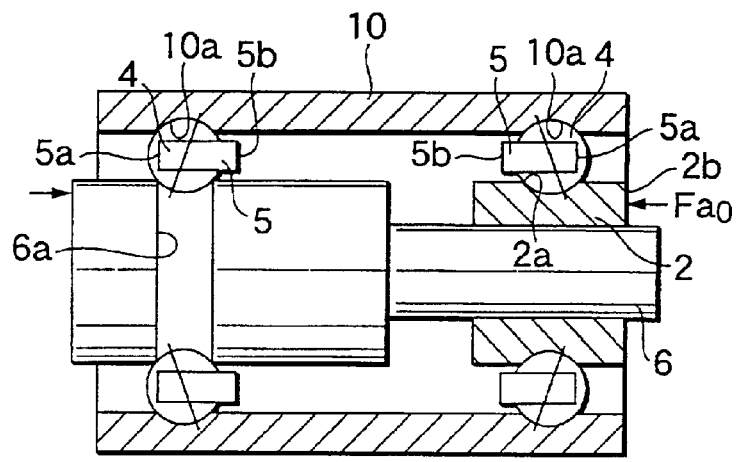
FIG. 6 is a schematic section view of a fourth embodiment of a bearing apparatus according to the present invention.

FIG. 6 shows a fourth embodiment of a bearing apparatus according to the present invention.

The present embodiment provides a similar structure to the previously described third embodiment, but is different therefrom in that the shaft 6 has a stepped portion.

The remaining structures, and a method for applying the preload, as well as the operation effects, of the present embodiment are the same as the third embodiment.

Fifth Embodiment

Figure 7:
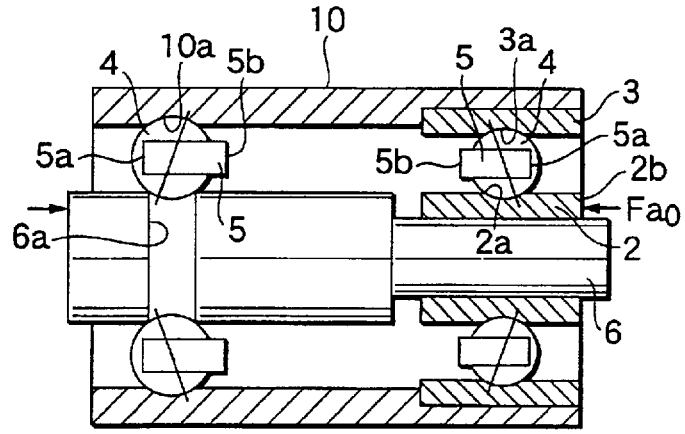
FIG. 7 is a schematic section view of a fifth embodiment of a bearing apparatus according to the present invention.

FIG. 7 shows a fifth embodiment of a bearing apparatus according to the present invention.

According to the present embodiment, there is provided a bearing apparatus which comprises: a stepped housing 10 having a raceway 10a formed in one portion of the inner periphery thereof; a stepped shaft 6 having a raceway 6a so formed in one portion of the outer periphery thereof as to be opposed to the raceway 10a formed in the one portion of the inner periphery of the stepped housing 10; a plurality of rolling elements (balls) 4 . . . incorporated between the raceway 10a of the housing 10 and the raceway 6a of the shaft 6 through a crown-shaped retainer 5; and, a single ball bearing 1 in which an outer ring 3 is fixed to the stepped portion of the housing 10, an inner ring 2 is fixed to the shaft 6, and a plurality of rolling elements 4 . . . are incorporated between the outer and inner rings 3 and 2 through a crown-shaped retainer 5.

The detailed structures of the parts of the fifth embodiment, and the operation effects are the same as the previously described third embodiment.

Sixth Embodiment

Figure 8:
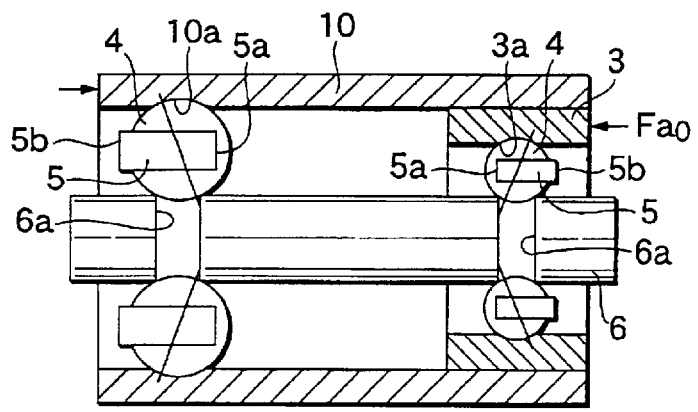
FIG. 8 is a schematic section view of a sixth embodiment of a bearing apparatus according to the present invention.

FIG. 8 shows a sixth embodiment of a bearing apparatus according to the present invention.

A bearing apparatus according to the present embodiment comprises: a shaft 6 having a double row raceway 6a, 6a formed in the outer periphery thereof; a housing 10 having a raceway 10a so form red in one portion of the inner periphery thereof as to be opposed to one raceway 6a of the shaft 6; an outer ring 3 formed separately from, and fixable to, the inner periphery of the housing 10 opposed to the other raceway 6a of the shaft 6 in such a manner that the two raceways 3a, 6a, are opposed to each other; and, a plurality of rolling elements (balls) 4 . . . , 4 . . . incorporated between the raceway 10a of the housing 10 and one raceway 6a of the shaft 6, as well as between the other raceway 6a of the shaft 6 and the raceway 3a of the outer ring 3 through the crown-shaped retainers 5 and 5.

In the present embodiment, in FIG. 8, the left side of the housing 10 is held and the separately formed outer ring 3 on the right side is pushed, whereby a preload Fao is applied. Therefore, the present preload provides a so called X-type preload. The crown-shaped retainers 5 and 5 are disposed so that the pocket-opening sides 5a and 5a are opposed to each other.

The detailed structures of the other parts of the sixth embodiment, and the operation effects of the sixth embodiment, are the same as the previously described third embodiment.

Seventh Embodiment

Figure 9:
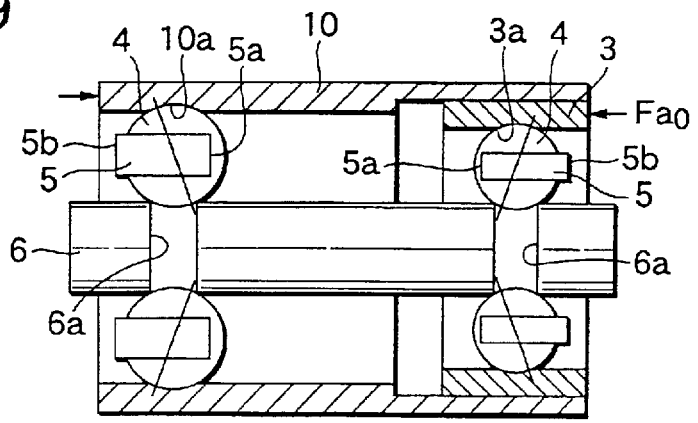
FIG. 9 is a schematic section view of a seventh embodiment of a bearing apparatus according to the present invention.

FIG. 9 shows a seventh embodiment of a bearing apparatus according to the present invention.

The present embodiment provides a similar structure to the previously described sixth embodiment, but is different therefrom in that the housing 10 has a stepped portion.

The remaining structures, method for applying the preload. and the operation effects, of the present embodiment are the same as those in the sixth embodiment.

Eighth Embodiment

Figure 10:
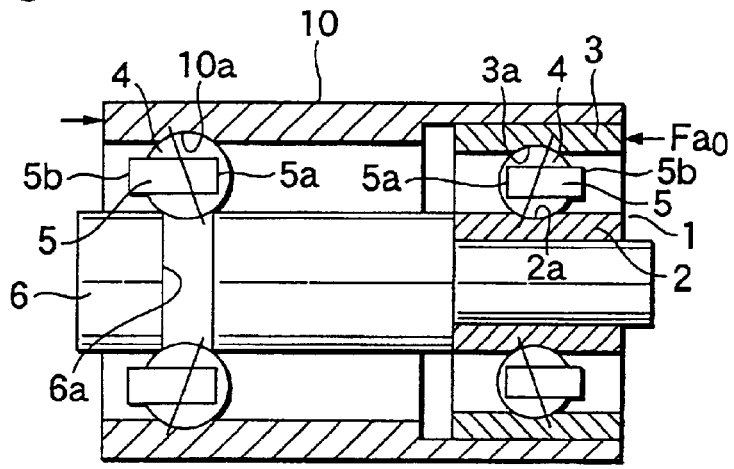
FIG. 10 is a schematic section view of an eighth embodiment of a bearing apparatus according to the present invention.

FIG. 10 shows an eighth embodiment of a bearing apparatus according to the present invention.

According to the present embodiment, there is provided a bearing apparatus which comprises: a stepped housing 10 having a raceway 10a formed in one portion of the inner periphery thereof; a stepped shaft 6 having a raceway 6a so formed in one portion of the outer periphery thereof as to be opposed to the raceway 10a; and, a plurality of rolling elements (balls) 4 . . . incorporated between the raceway 10a of the housing 10 and the raceway 6a of the shaft 6 through a crown-shaped retainer 5; and, a single ball bearing 1 in which an outer ring 3 is fixed to the stepped portion of the housing 10, an inner ring 2 is fixed to the shaft 6, and a plurality of rolling elements 4 . . . are incorporated between the outer and inner rings 3 and 2 through a crown-shaped retainer 5. The present embodiment is substantially similar in structure to the previously described fifth embodiment. However, in the present embodiment, the crown-shaped retainers 5 and 5 are disposed in such a manner that their respective pocket opening sides 5a and 5a are opposed to each other; and, a so-called X-type preload is applied (the preload applying method of the present embodiment is the same as the sixth embodiment). Therefore, the operation effects of the present embodiment are the same as the sixth embodiment.

Ninth Embodiment

Figure 11:
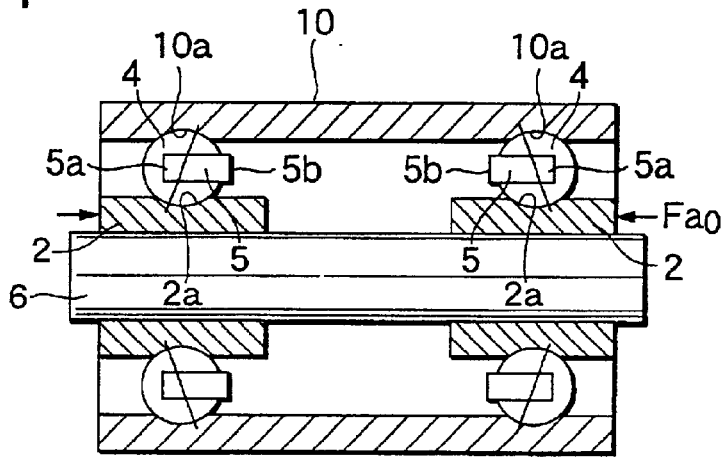
FIG. 11 is a schematic section view of a ninth embodiment of a bearing apparatus according to the present invention.

FIG. 11 shows a ninth embodiment of a bearing apparatus according to the present invention.

According to the present embodiment, a bearing apparatus comprises: a housing 10 having a double row raceway 10a and 10a formed in the inner periphery thereof; a straight-shaped shaft 6; two inner rings 2 and 2 separately formed and fixed to the outer periphery of the shaft 6 in such a manner that their respective raceways 2a and 2a are opposed to the raceways 10a and 10a of the housing 10; and, a plurality of rolling elements 4 . . . , 4 . . . incorporated between the raceways 10a, 10a of the housing 10 and the raceways 2a, 2a of the inner rings 2, 2 through respective crown-shaped retainers 5 and 5.

According to the present embodiment, one inner ring 2 is held and the other inner ring 2 is pushed, whereby a preload is applied. Therefore, this preload type is a so called O type.

The crown-shaped retainers 5 and 5 are incorporated in such a manner that their respective counter-pocket-opening sides 5b and 5b are opposed to each other. The detailed structures of the respective parts of the ninth embodiment such as the inner rings 3, rolling elements 4, and crown-shaped retainers 5, as well as the operation effects of the ninth embodiment, are the same as the previously described third embodiment.

Tenth Embodiment

Figure 12:
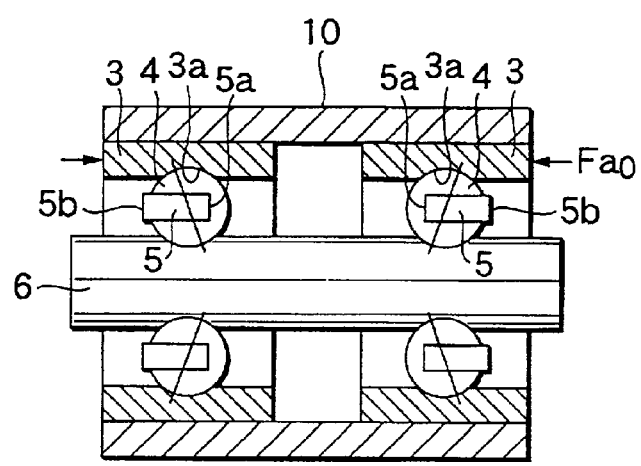
FIG. 12 is a schematic section view of a tenth embodiment of a bearing apparatus according to the present invention.

FIG. 12 shows a tenth embodiment of a bearing apparatus according to the present invention.

According to the present embodiment, a bearing apparatus comprises: a shaft having a double row raceway 6a and 6a formed in the outer periphery thereof, a straight-shaped housing 10; two outer rings 3 and 3 formed separately from, and fixed to, the outer periphery of the housing 10 in such a manner that their respective raceways 3a and 3a are opposed to the raceways 6a and 6a of the shaft 6; and, a plurality of rolling elements 4 . . . , 4 . . . incorporated between the raceways 6a, 6a of the shaft 6 and the raceways 3a, 3a of the outer rings 3, 3 through respective crown-shaped retainers 5 and 5.

According to the present embodiment, one outer ring 3 is held and the other outer ring 3 is pushed, whereby a preload is applied. Therefore, this preload type provides a so called X type. The crown-shaped retainers 5 and 5 are incorporated in such a direction that their respective pocket-opening sides 5b and 5b are opposed to each other. The detailed structures of the other parts of the tenth embodiment (such as the inner rings 3, rolling elements 4, and crown-shaped retainers 5), as well as the operation effects of the tenth embodiment, are the same as the previously described sixth embodiment.

By the way, additional description will be given below of the preload applying methods according to the embodiments shown in FIGS. 4 to 12. In the case of the separately formed portions, that is, between the shaft 6 and inner ring 2 as well as between the outer ring 3 and housing 10, the following two methods can be applied between the shaft 6 and the inside diameter of the inner ring 2 as well as between the housing 10 and the outside diameter of the outer ring 3.

(1) a dead weight is put on them with a clearance between them, a given preload applied to them and, in this state, they are adhered and fixed to each other.

(2) they are pressure inserted with interference between them, and the rigidity of them is controlled using their torque or resonance frequencies. Then, a given preload is applied to them.

Eleventh Embodiment

Figure 13:
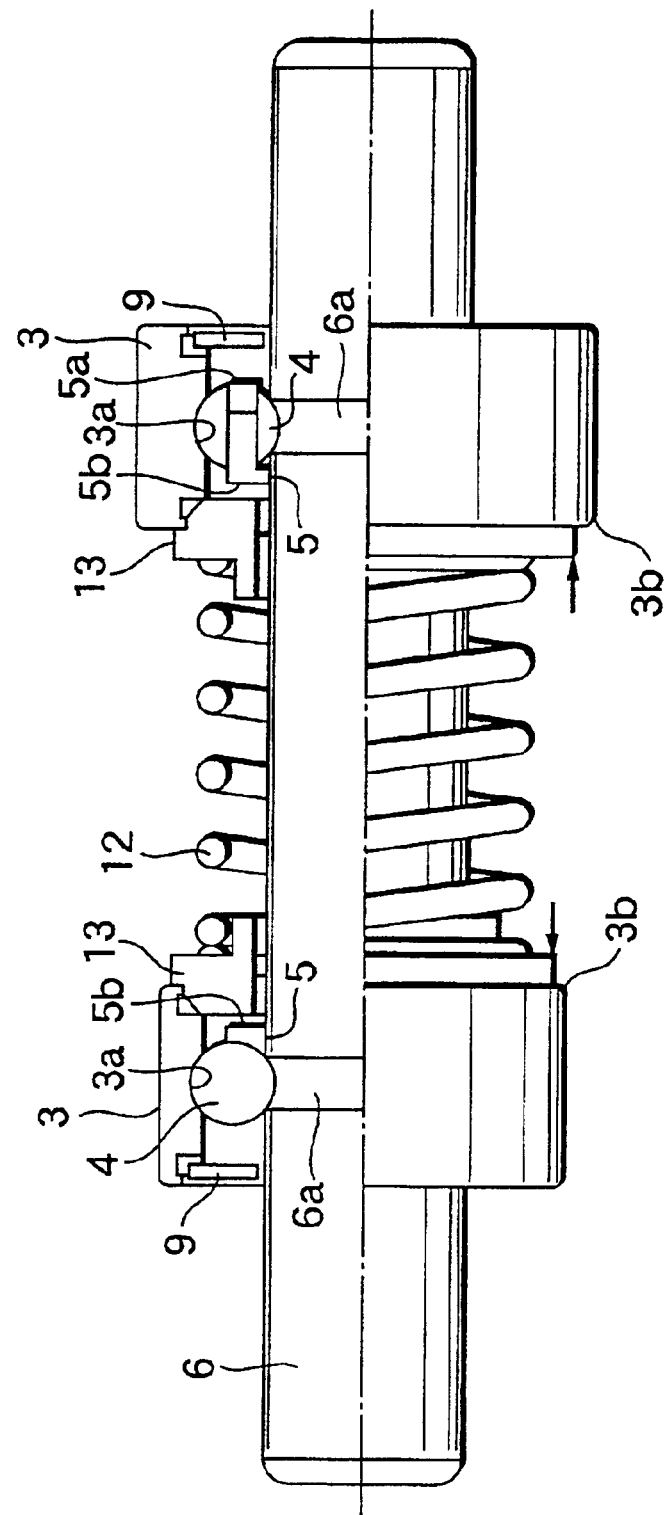
FIG. 13 is a schematic section view of an eleventh embodiment of a bearing apparatus according to the present invention.

FIG. 13 shows an eleventh embodiment of a bearing apparatus according to the present invention.

According to the present embodiment, a bearing apparatus comprises: a shaft 6 having a double row raceway 6a and 6a formed in the outer periphery thereof; two outer rings 3, 3; a plurality of rolling elements 4 . . . , 4 incorporated between the raceways 6a, 6a of the shaft 6 and the raceways 3a, 3a of the outer rings 3, 3 through respective crown-shaped retainers 5 and 5; and, a spring 12 interposed between the two outer rings 3 and 3. In the present embodiment, a preload is applied to the two outer rings 3 and 3 by the spring 12 in a direction where the two outer rings 3 and 3 are moved away from each other (a so called O-type preload is formed); and, the retainers 5 and 5 are incorporated in a direction where their respective counter-pocket-opening sides 5b and 5b are opposed to each other. In FIG. 13, reference character 9 designates a seal plate and 13 stands for a spring seat.

Figure 14A:
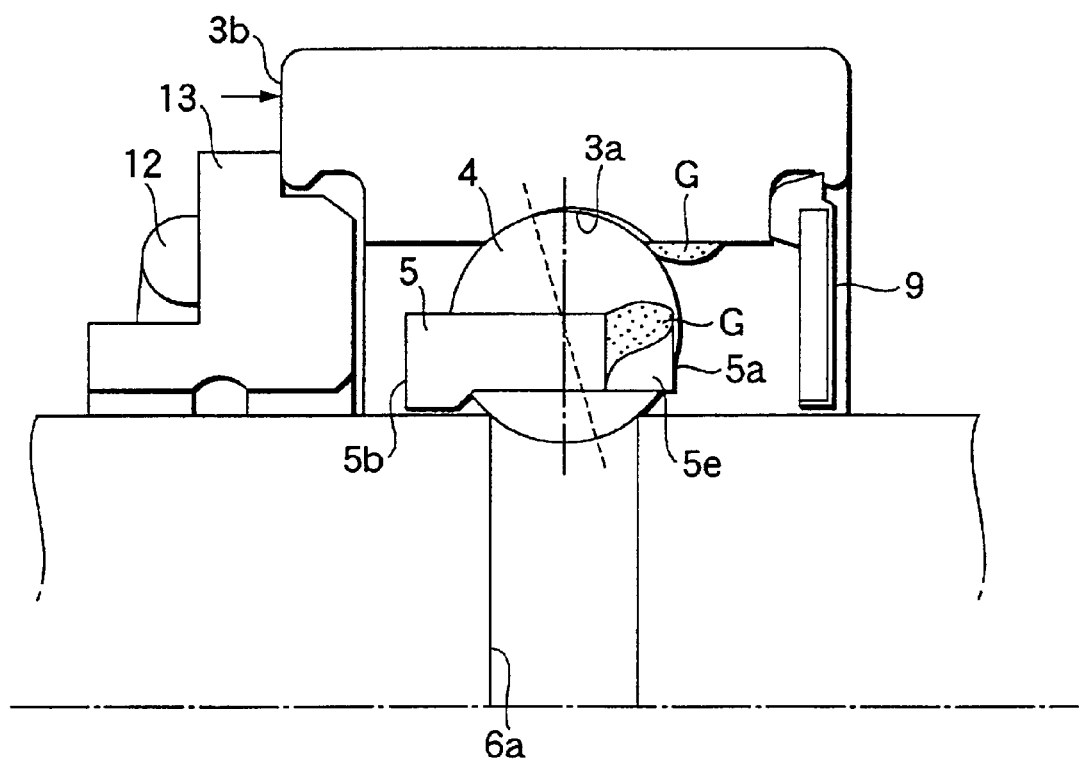
FIG. 14A is a schematic enlarged view of the retainer incorporating direction portion of the eleventh embodiment; and, FIG. 14B is a partially enlarged view of the retainer pawl portion, showing a state thereof when viewed from top.
Figure 14B:
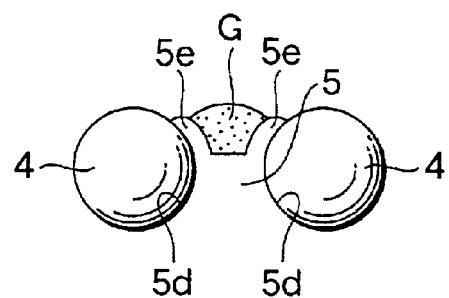

According to the present embodiment, when the counter-pocket-opening sides 5b and 5b of the crown-shaped retainers 5 and 5 are opposed to each other (that is, they are in an outwardly facing state where the retainer pockets 5d and 5d are not opposed to each other), the preload (O-type preload) is applied to the end faces 3b and 3b of the outer rings 3 and 3. Therefore, as shown in FIGS. 14A and 14B, grease G collecting on the counter-contact-angle sides of the outer rings 3 is involved with the rotational movement of the ball 4 about its own axis and is thereby moved in the rotation direction of the ball 4. Grease G is scraped by the retainers 5, and the thus scraped grease G collects between the pawls 5e and 5e of the retainers 5 where it becomes stable.

Figure 15:
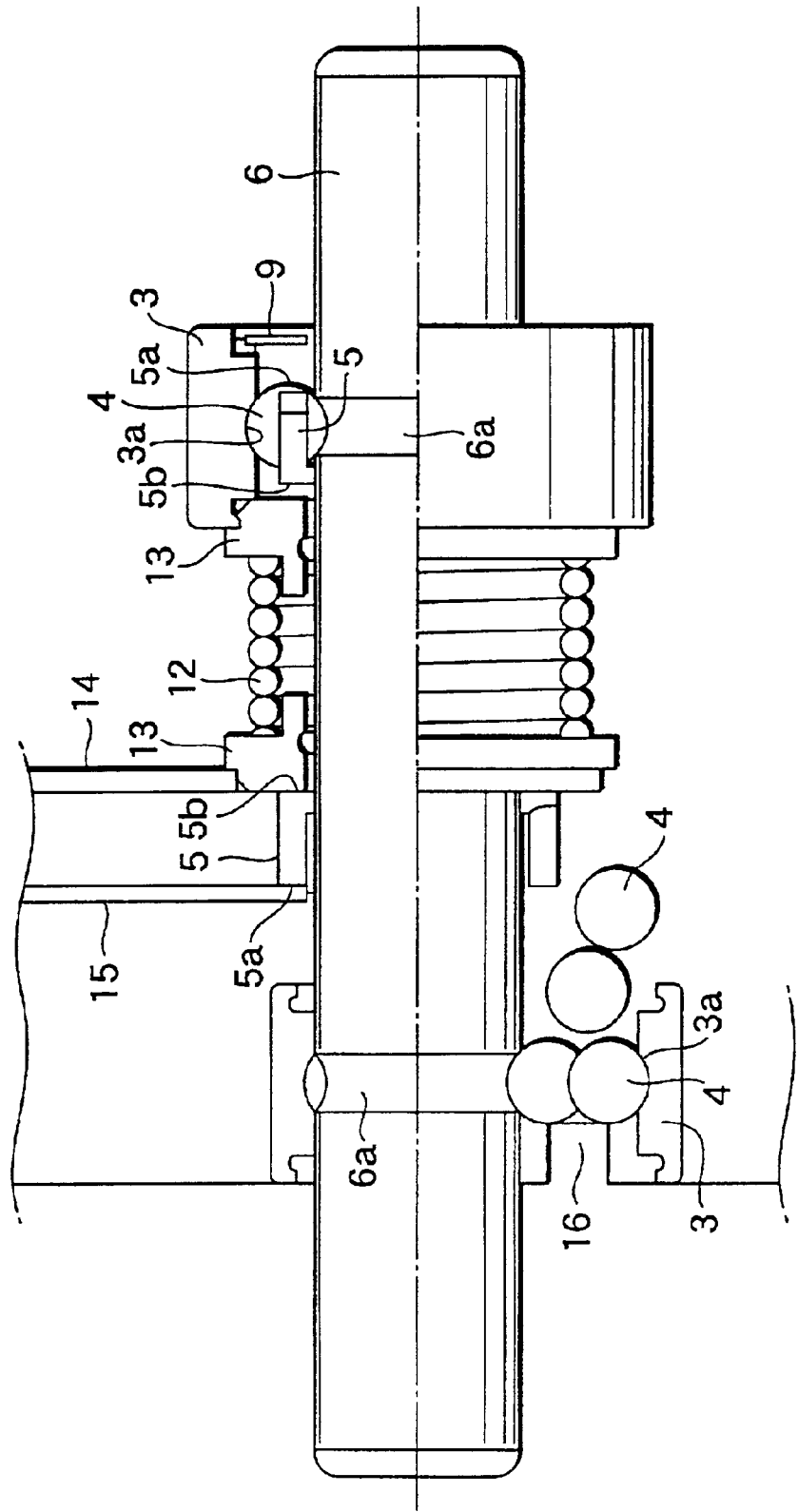
FIG. 15 is a schematic view of a bearing apparatus according to the eleventh embodiment, showing its assembling method.

By the way, FIG. 15 shows an example of a method for assembling the two bearings, each including a shaft, according to the present invention. The bearing to be incorporated first can be incorporated easily regardless of the direction of the retainer 5. To assemble the remaining bearing, with the spring 12 held through a spring retainer 14, the retainer 5 is previously inserted between the spring 12 and the outer ring 3 to be assembled. In FIG. 15, reference character 15 designates a retainer receiver and 16 stands for a crescent-shaped ball receiver. Next, the balls 4 are inserted between the outer raceway 3a and shaft raceway 6a, which are disposed eccentric to each other. The outer ring 3 is then made concentric with the shaft 6 and, after that, the balls 4 are disposed at regular intervals, the position of the retainer pocket 5d is matched to the position of the balls 4, and the retainer 5 is then pushed into the bearing to thereby assemble the bearing. Then, the spring retainer 14 is removed and the spring 12 held by the spring retainer 14 is expanded and pressed against the outer ring 3 to thereby apply a preload to the outer ring.

Twelfth Embodiment

Figure 16:
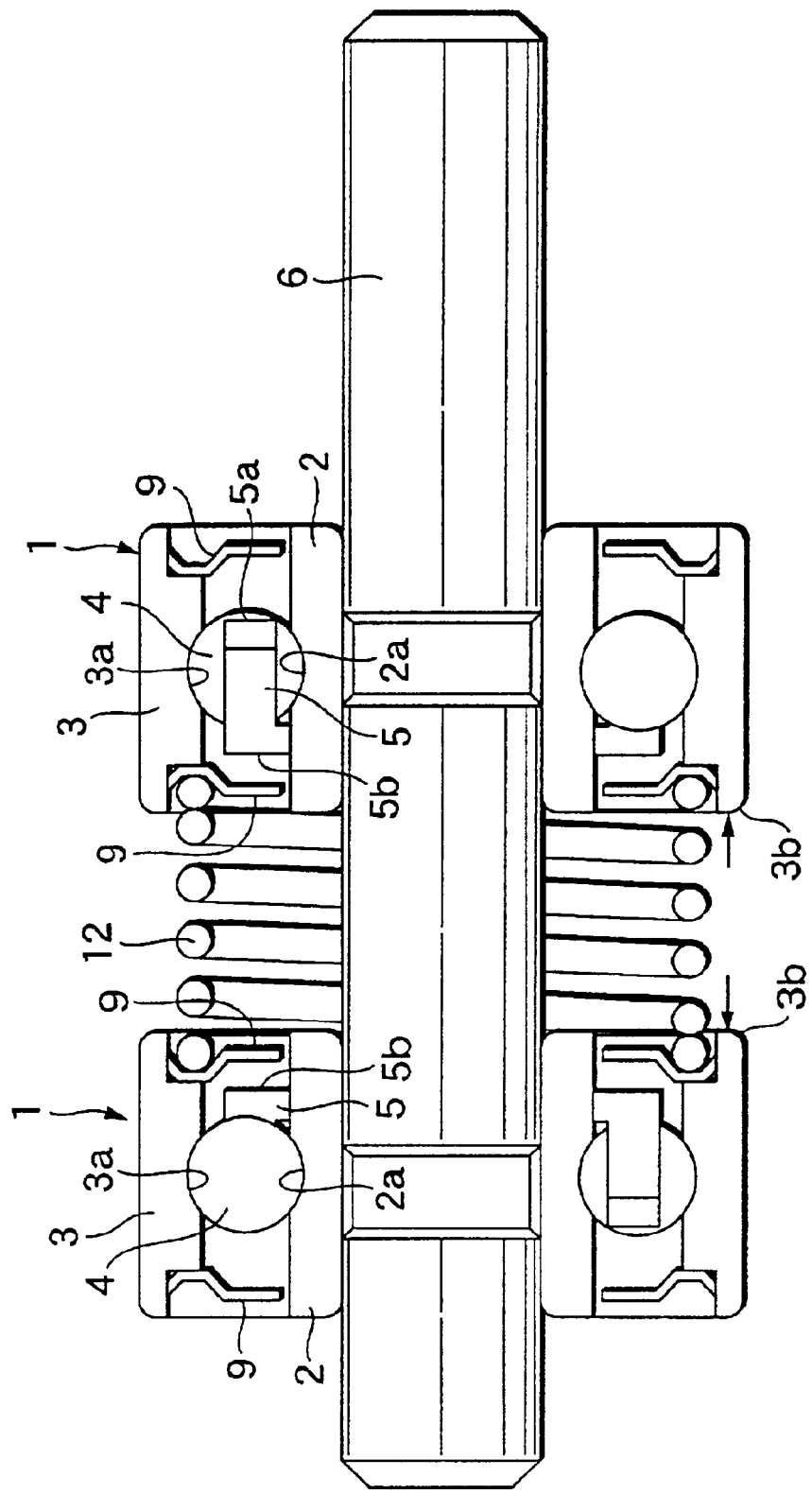
FIG. 16 is a schematic section view of a twelfth embodiment of a bearing apparatus according to the present invention.

FIG. 16 shows a twelfth embodiment of a bearing apparatus according to the present invention.

According to the present embodiment, two ball bearings 1 and 1 are inserted onto a shaft 6 and, by pressure insertion or by adhesion, the two bearings are fixed to the shaft 6; and, a preload is applied to the outer rings 3 and 3 of the two bearings 1 and 1 by a spring 12 interposed between the two outer rings 3 and 3 in a direction so that the two races 3 and 3 part away from each other. This preload is a so called O-type preload, and the crown-shaped retainers 5 and 5 of the two bearings 1 and 1 are disposed in such a manner that their respective counter-pocket-opening sides 5b and 5b are opposed to each other (that is, they are in an outwardly facing direction where the pockets 5d and 5d of the retainers 5 are not opposed to each other). Thanks to this, the present embodiment has similar operation effects to those of the eleventh embodiment. Also, in the present embodiment, two seal plates 9 serve also as spring seats to thereby reduce the cost and size of the bearing apparatus. However, it is also possible to provide spring seats separately. By the way, each of the bearings 1 is a ball bearing which comprises an inner ring 2, an outer ring 3, rolling elements 4, a crown-shaped retainer 5, and a seal plate 9; but, the bearing 1 is not limited to a specific structure.

Thirteenth Embodiment

Figure 17:
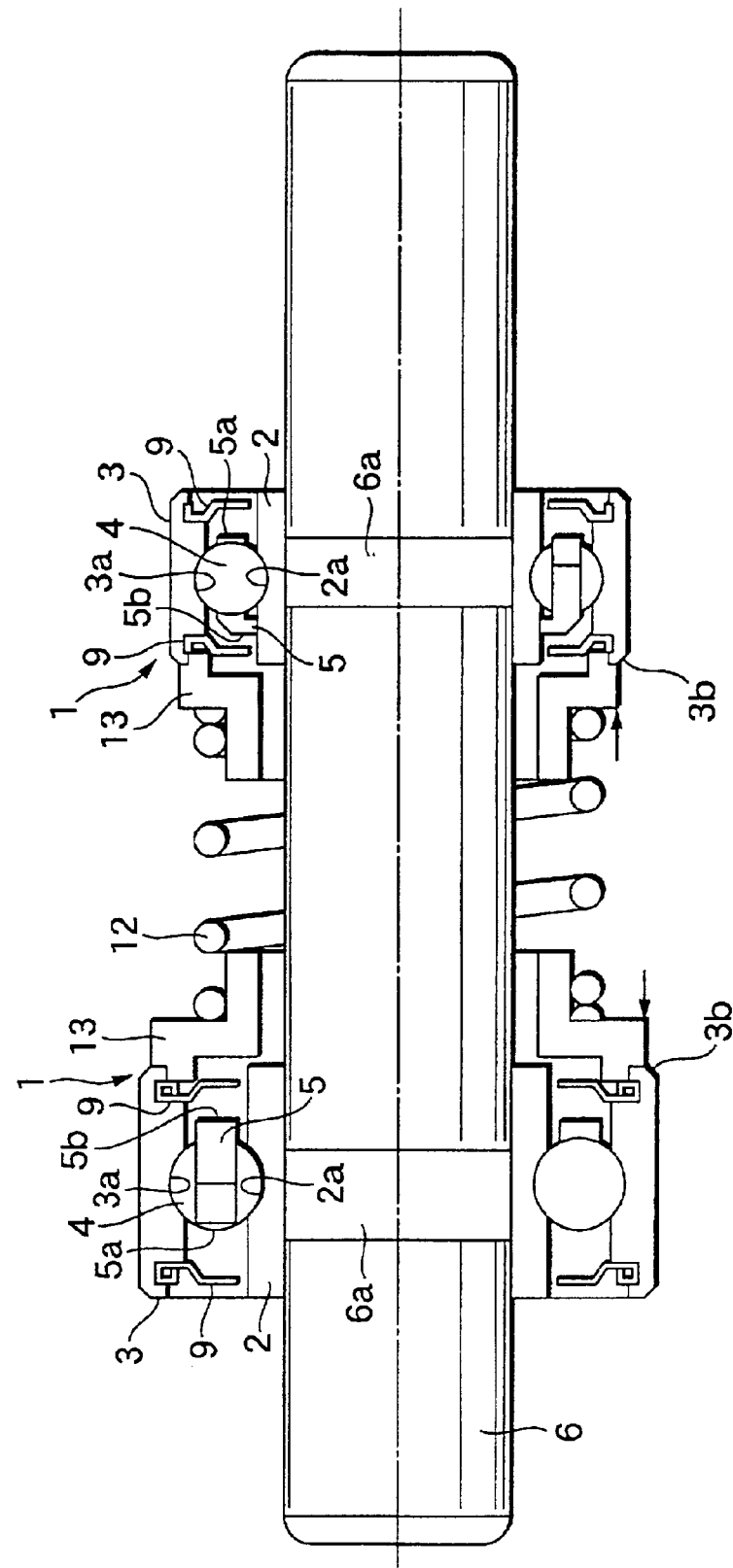
FIG. 17 is a schematic section view of a thirteenth embodiment of a bearing apparatus according to the present invention.

FIG. 17 shows a thirteenth embodiment of a bearing apparatus according to the present invention.

The present embodiment is different from the twelfth embodiment in that two bearings 1 and 1 differing in size are fixed to a shaft 6 by pressure insertion or by adhesion, and a preload is applied to the outer rings 3 and 3 of the bearings 1 and 1 by a spring 12 through their respective spring seats 13 in a direction to that the outer rings 3 and 3 part away from each other. The remaining structures and operation effects of the present embodiment are similar to the twelfth embodiment.

Fourteenth Embodiment

Figure 18:
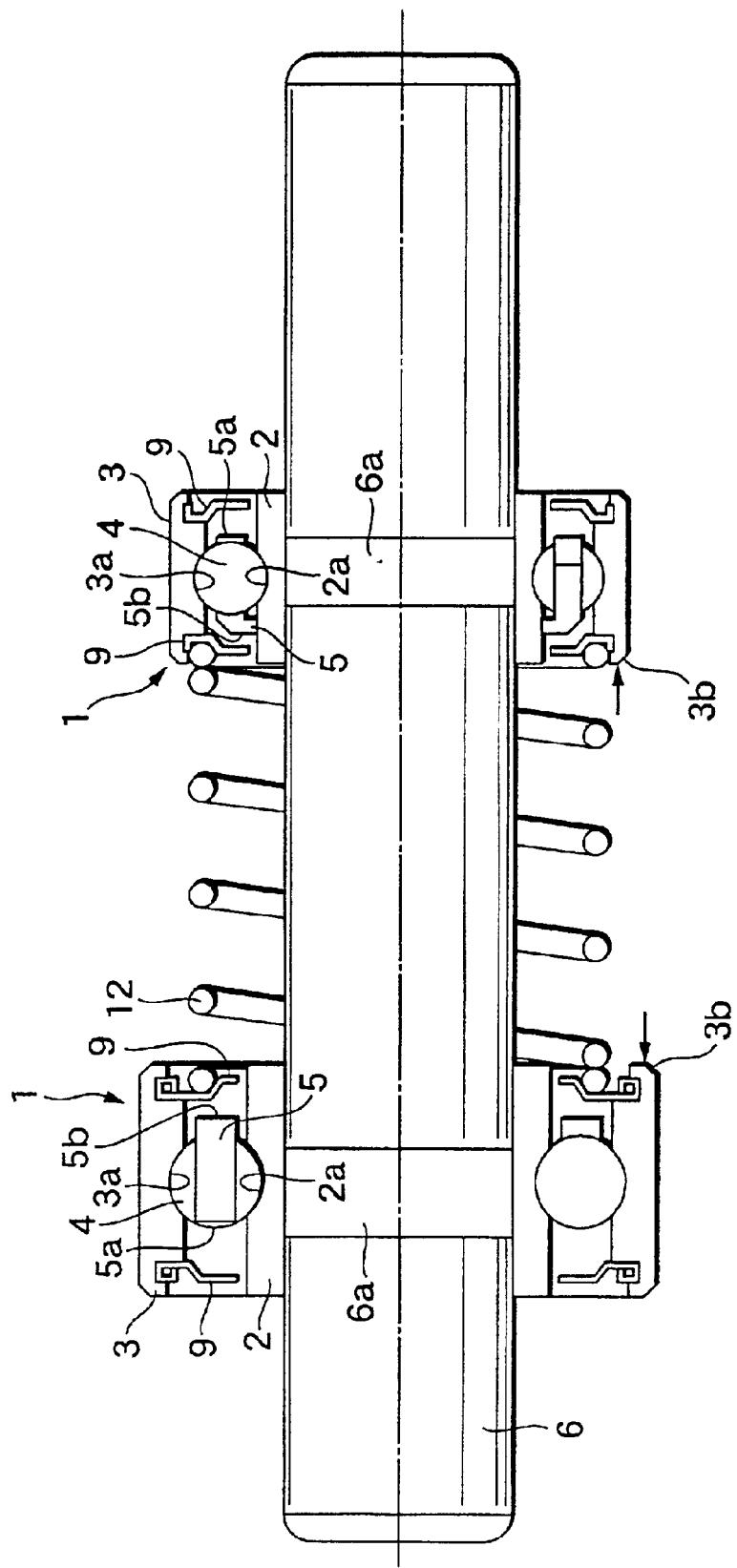
FIG. 18 is a schematic section view of a fourteenth embodiment of a bearing apparatus according to the present invention.

FIG. 18 shows a fourteenth embodiment of a bearing apparatus according to the present invention.

The present embodiment is different from the thirteenth embodiment in that the two seal plates 9 function also as spring seats. In this case, it is not necessary to provide the spring seats separately, which makes it possible to reduce the cost of the bearing apparatus. The remaining structures and operation effects of the present embodiment are similar to the thirteenth embodiment.

Fifteenth Embodiment

Figure 19:
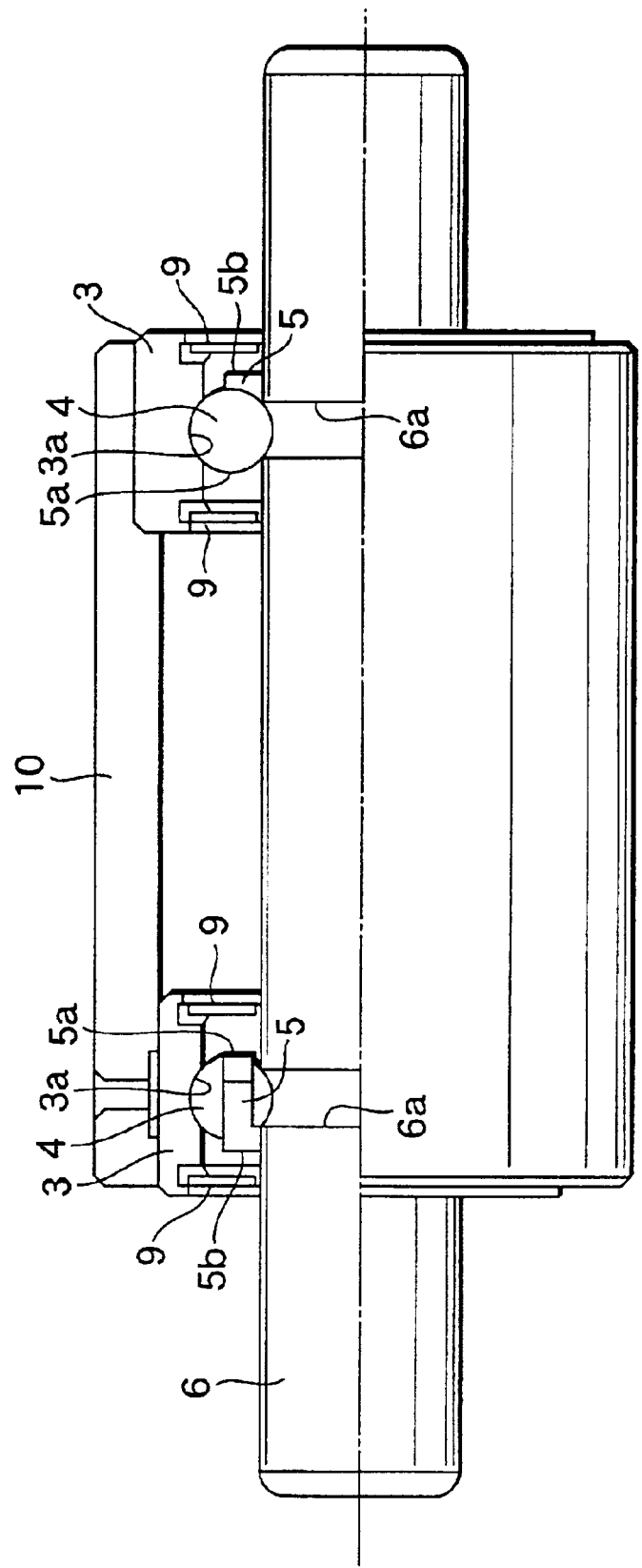
FIG. 19 is a schematic section view of a fifteenth embodiment of a bearing apparatus according to the present invention.

FIG. 19 shows a fifteenth embodiment of a bearing apparatus according to the present invention. According to the present embodiment, a bearing apparatus comprises: a shaft 6 having a double row raceway 6a, 6a formed in the outer periphery thereof; a housing 10 having a stepped portion; two outer rings 3 and 3 separately formed and fixed to the inner periphery of the housing 10; and, a plurality of rolling elements 4 . . . , 4 . . . incorporated between the raceways 3a, 3a of the two outer rings 3, 3 and the raceways 6a, 6a of the shaft 6 through respective crown-shaped retainers 5 and 5. An X-type preload is applied to the outer rings 3 and 3, which have been inserted with light pressure, in a direction so that they approach each other. The outer rings 3 and 3 are adhered and fixed to the housing 10. The crown-shaped retainers 5 and 5 are disposed in such a manner that their respective pocket-opening sides 5a and 5a are opposed to each other.

As described above, because the pocket opening sides 5a and 5a of the crown-shaped retainers 5 and 5 of the two bearings are opposed to each other, and because the X-type preload is applied to the outer rings 3 and 3 in the direction so that they approach each other, grease collecting on the counter-contact-angle side of the outer rings 3 is involved with the rotational movement of the ball about its own axis and is moved with the rotation of the ball. Thus, this grease is scraped by the crown-shaped retainers 5, and the thus scraped grease collects and becomes stable between the pawls 5e and 5e of the retainers 5.

Sixteenth Embodiment

Figure 20:
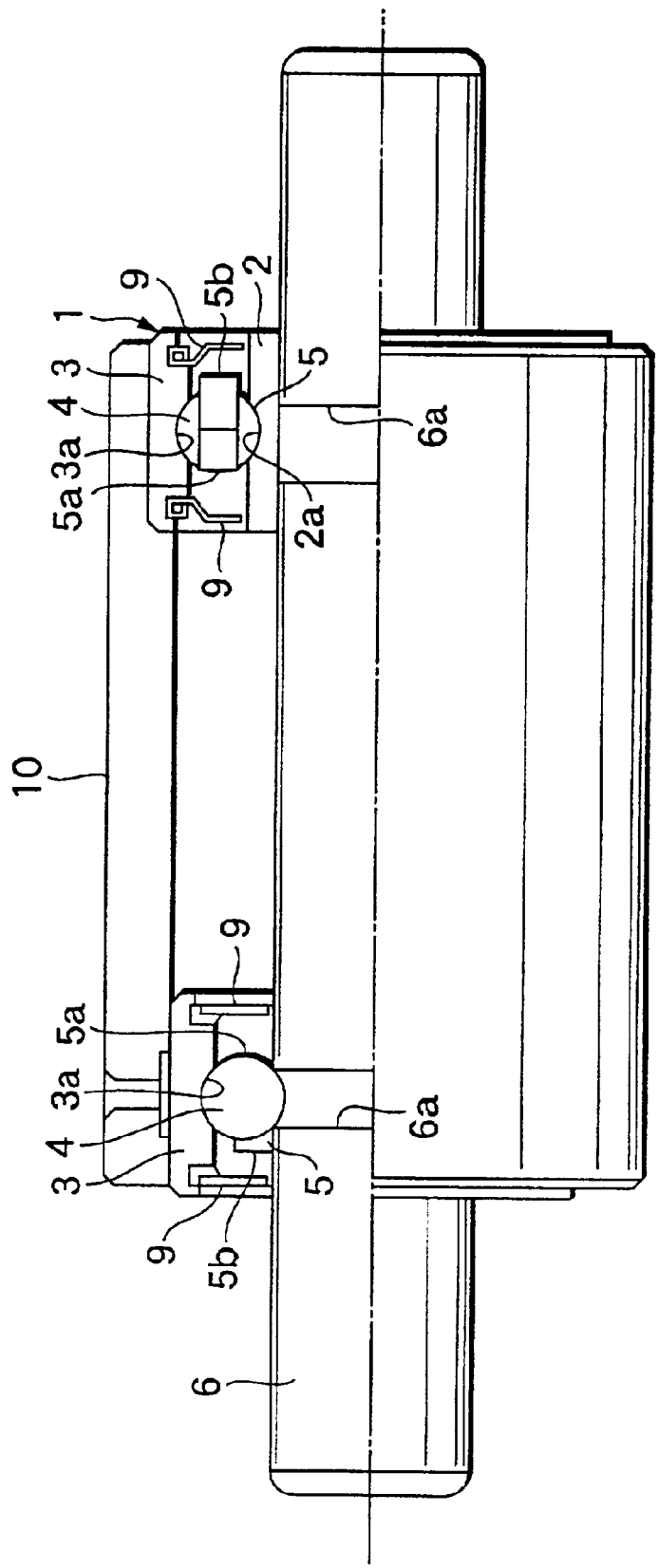
FIG. 20 is a schematic section view of a sixteenth embodiment of a bearing apparatus according to the present invention.

FIG. 20 shows a sixteenth embodiment of a bearing apparatus according to the present invention. According to the present embodiment, there is provided a bearing apparatus which comprises: a housing 10 having a stepped portion; a shaft 6 having a raceway 6a formed in one portion of the outer periphery thereof; an outer ring 3 formed separately from, and fixed to, one portion of the inner periphery of the housing 10 such that it is opposed to the raceway 6a; a plurality of rolling elements 4 . . . , 4 . . . incorporated between the raceway 3a of the outer ring 3 and the raceway 6a of the shaft 6 through a crown-shaped retainer 5; and, a ball bearing 1 including an inner ring 2, an outer ring 3, a plurality of rolling elements 4, a crown-shaped retainer 5 and two seal plates 9. In this embodiment, an X-type preload is applied to the outer rings 3 and 3 in a direction to that they approach each other, and the outer rings 3 and 3 are adhered and fixed to the housing 10. The inner ring 2 may be fixed to the shaft 6 by pressure insertion or by adhesion. The crown-shaped retainers 5 and 5 are disposed in an inwardly facing direction so that their respective pocket opening sides 5a and 5a are opposed to each other. In the present embodiment, there are disposed another two seal plates (shield plates) 9 so as to extend between the separately formed outer ring 3 and the outer periphery of the shaft 6. The operation effects of the present embodiment are the same as the fifteenth embodiment.

Seventeenth Embodiment

Figure 21:
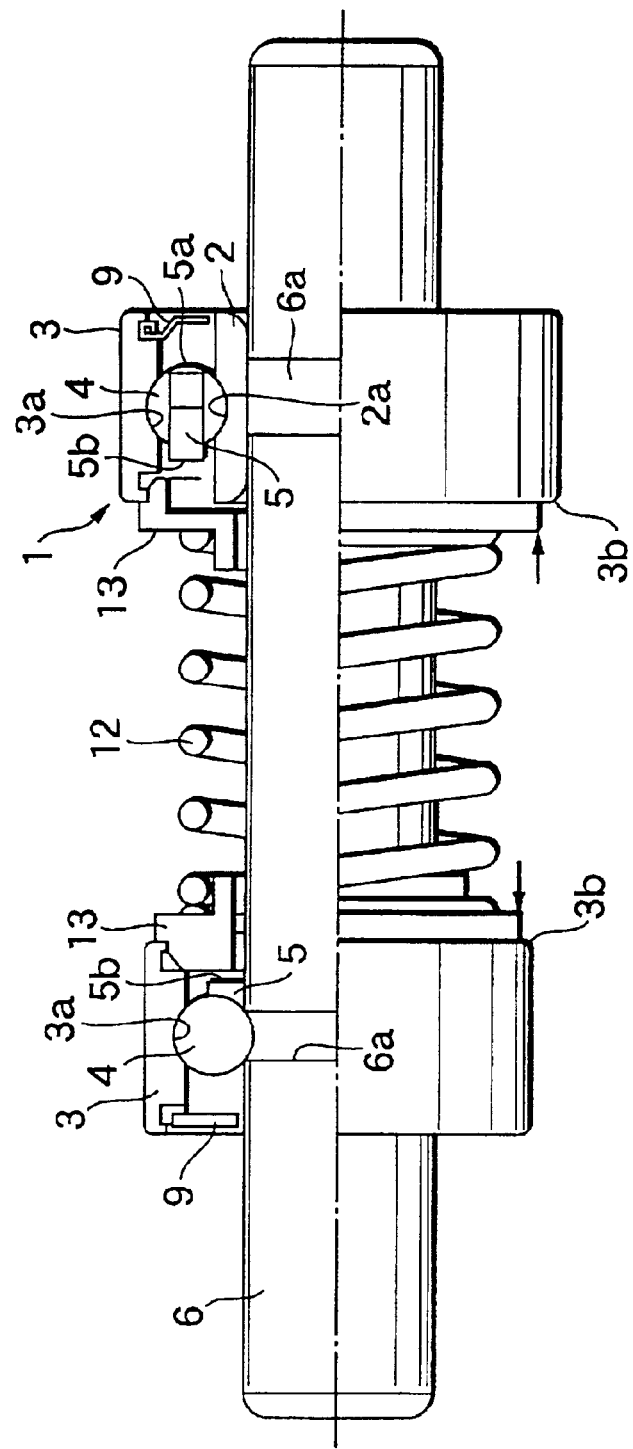
FIG. 21 is a schematic section view of a seventeenth embodiment of a bearing apparatus according to the present invention.

FIG. 21 shows a seventeenth embodiment of a bearing apparatus according to the present invention. According to the present embodiment, there is provided a bearing apparatus, which comprises: a shaft 6 having a raceway 6a formed in one portion of the outer periphery thereof; an outer ring 3 so disposed as to be opposed to the raceway 6a; a plurality of rolling elements 4 . . . incorporated between the raceway 3a of the outer ring 3 and the raceway 6a of the shaft 6 through a crown-shaped retainer 5; a ball bearing 1 including an inner ring, an outer ring 3, a plurality of rolling elements 4 . . . , 4 . . . incorporated between the outer ring 3 and inner ring 2 through a crown-shaped retainer 5, the inner ring 2 being fixed to the shaft 6; and, a spring 12 interposed between the two outer rings 3 and 3. In this structure, a preload is applied to the two outer rings 3 and 3 by the spring 12 in a direction so that the two out er rings 3 and 3 are moved away from each other. The inner ring can be fixed to the shaft by pressure insertion or by adhesion. The two crown-shaped retainers 5 and 5 are disposed in such a direction that their respective counter-pocket-opening sides 3b and 3b are opposed to each other. The remaining structures and operation effects of the present embodiment are the same as those of the previously described eleventh embodiment.

Eighteenth Embodiment

FIG. 22 shows an eighteenth embodiment of a bearing apparatus according to the present invention. According to the present embodiment, there is provided a hearing apparatus, which comprises: a shaft 6; a housing 10; two inner rings 2 and 2; two outer rings 3 and 3; a plurality of rolling elements 4 . . . , 4 . . . incorporated between the inner raceways 2a, 2a of the inner rings 2, 2 and the outer raceways 3a, 3a of the outer rings 3, 3 through respective crown-shaped retainers 5 and 5; and, a spring 12 interposed between the two inner rings 2 and 2. In the present embodiment, a preload is applied by the spring 12 in a direction so that the inner rings 2 and 2 are moved away from each other (that is, the present preload provides a so-called X-type preload); and, the two retainers 5 and 5 are incorporated in such a direction that their respective pocket-opening sides 5a and 5a are opposed to each other. The remaining operation effects of the present embodiment are the same as those of the second embodiment.

Nineteenth Embodiment

FIG. 23 shows a nineteenth embodiment of a bearing apparatus according to the present invention. According to the present embodiment, there is provided a bearing apparatus, which comprises: a housing 10 having a double row raceway 10a and 10a formed in the inner periphery thereof; a shaft 6 having a raceway 6a opposed to one raceway 10a of the housing 10 and also including a stepped portion 6b; an inner ring 2 formed separately from, and fixed to, the outer periphery of the shaft 6 in such a manner that its raceway 2a is opposed to the other raceway 10a of the housing 10; a plurality of rolling elements 4 . . . , 4 . . . incorporated between one raceway 10a of the housing 10 and the raceway 6a of the shaft 6, as well as between the other raceway 10a of the housing 10 and the inner raceway 2a of the inner ring 2, through respective crown-shaped retainers 5 and 5; and, a spring 12 interposed between the separately-formed inner ring 2 and the stepped portion 6b of the shaft 6. In the present embodiment, a preload is applied by the spring 12 in a direction so that the separately formed inner ring 2 and the stepped portion 6b of the shaft 6 are moved away from each other (that is, the present preload provides a so-called X-type preload); and the two retainers 5 and 5 are incorporated in such a direction that their respective pocket-opening sides 5a and 5a are opposed to each other. The remaining operation effects of the present embodiment are the same as those of the second embodiment.

Twentieth Embodiment

To be able to apply the preload Fao from the inner ring 2 on the retainer pocket-opening side 5a or from the outer ring 3 on the retainer counter-pocket-opening side 5b, when assembling the bearing 1 to the shaft 6, the incorporating direction of the crown-shaped retainer 5 must be known. Especially, in the case of the bearing 1 incorporating two seal plates 9 therein, it is difficult to distinguish the incorporating-direction of the crown-shaped retainer 5 from the outside.

Figure 24A:
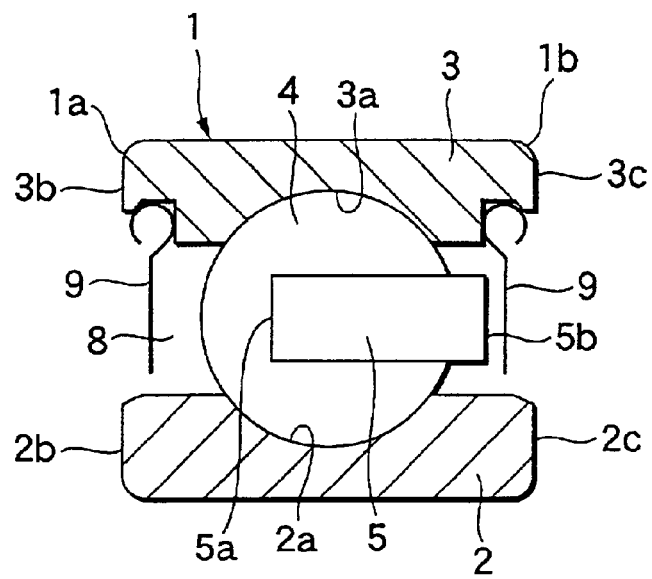
FIGS. 24A and 24B show a twentieth embodiment allowing a retainer incorporating direction to be distinguished; specifically.
Figure 24B:
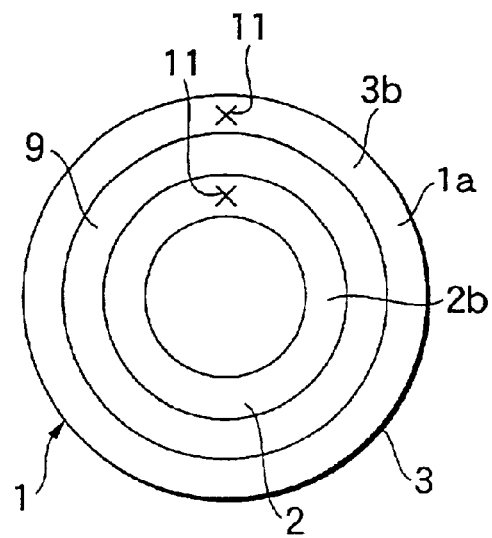

In view of the above, as shown in FIGS. 24A and 24B, preferably, between one end face 1a and the other end face 1b of the bearing 1 in the axial direction thereof (in FIG. 24A, in the right and left direction), there may be provided arrangements (distinctive arrangements) which allow the incorporating direction of the crown-shaped retainer 5 to be distinguished easily from the outside.

Such retainer incorporating-direction distinctive arrangements can be properly selected in all of the above-mention ed first to nineteenth embodiments, or in other arbitrary embodiments.

Now, description will be given below of the retainer incorporating-direction distinctive arrangements as well as the operation effects thereof.

For example, as shown in FIG. 24B, marks 11 and 11, which indicate the retainer incorporating direction, may be provided on only one end face 2b and/or 3b of one or both of the inner and outer rings 2 and 3. These marks 11, 11, as shown in FIG. 24B, may be applied to the inner ring end face 2b and outer ring end face 3b of the bearing situated on the retainer pocket-opening side 5a. When the marks 11, 11 are applied to the inner ring end face 2b and outer ring end face 3b of the bearing situated on the retainer opening side 5a in this manner, the end face with the marks 11, 11 applied thereto provides the retainer opening side 5a, which makes it possible to distinguish the retainer incorporating direction simply and instantaneously.

By the way, marks 11, reversely to the illustrated example, may be applied to the inner ring end face 2c and outer ring end face 3c of the bearing situated on the retainer counter-pocket-opening side 5b. In this case, the marks 11 indicate the incorporation start position side of the retainer 5 and, naturally, it can be confirmed that the end face side with no marks thereon is the pocket-opening side 5a.

In FIG. 24, an x mark 11 is used but this is just an example, and the mark can be selected arbitrarily. As the mark 11, a separately formed mark may be bonded onto, or a mark may be engraved directly in the end face, or a plane-shaped or projection-shaped mark may be provided; and, the number of marks and the positions thereof may also be selected arbitrarily. Also, the mark 11 can be provided to only one of the end faces 2b and 3b.

Further, the mark 11 may also be applied to the seal plate 9 that is opposed to either of the retainer pocket-opening side 5a or the retainer counter-pocket-opening side 5b. In this case, similarly to the above-mentioned arrangements, the retainer incorporating direction can be distinguished instantaneously.

Also, when the seal plates 9 and 9 are made different in color and material from each other, to thereby cause the seal plate 9 on one end of the bearing to differ in structure from the seal plate 9 on the other end of the bearing, the incorporating direction of the retainer 5 can also be distinguished from the outside. For example, when the color and patterns of both of the seal plates 9 and 9 are made different from each other, or when one of the seal plates 9 is made of synthetic resin or rubber and the other seal plate 9 is made of steel material, the incorporating direction of the retainer 5 can also be distinguished from the outside.

Further, when the seal plate is made of synthetic resin, when transparent synthetic resin is used, the incorporating direction of the retainer 5 can be confirmed through the transparent seal plate.

And, as illustrated in the seventeenth embodiment (FIG. 21), by making different the shapes and sizes of the two seal plates from each other, the incorporating direction of the retainer 5 can be distinguished.

Also, when the ball bearing 1 is assembled to such shaft 6 as shown FIGS. 16, 17 and 18, when, instead of mounting the seal plates 9 on the two end portions of the bearing 1 as in the above-described embodiments, they are mounted on only one of the bearing end faces, the incorporating direction of the retainer 5 can be distinguished from the outside. That is, when the seal plate 9 is mounted only on the bearing end face situated on the counter-pocket-opening side 5*b* of the crown-shaped retainer 5, or only on the bearing end face situated on the pocket-opening side 5*a* of the crown-shaped retainer 5, the seal plate 9 mounting side provides the retainer pocket-opening side 5*a* (or retainer counter-pocket-opening side 5*b*), so that the incorporating direction of the retainer 5 can be distinguished easily.

Further, when undulations such as notches are formed in the axial-direction end edge portions of one or both of the inner and outer rings 2 and 3 to thereby provide a distinctive arrangement, the incorporating direction of the retainer can be distinguished. According to this distinctive arrangement, an automatic machine for assembling an HDD can be structured such that, while distinguishing the incorporating direction of the retainer 5 through the undulations such as notches, it is able to assemble the bearing to the shaft in a given direction.

In the process for manufacturing a bearing with a seal, an operation to provide a distinctive arrangement between the two end faces of the bearing (according to the retainer incorporating direction) can be carried out easily and positively without incurring any troublesome operation.

In the case of the above-structured two ball bearings each having a seal, since the retainer incorporating direction can be distinguished easily and positively from the outside, the assembling directions of the respective bearings can be controlled positively according to their respective retainer-incorporating directions.

In case where the above-mentioned rolling bearing 1 structure is employed, since there can be provided various distinctive arrangements which allow the incorporating direction of the crown-shaped retainer 5 to be distinguished from the outside, the incorporating direction of the crown-shaped retainer 5 can be distinguished easily from the outside.

Thanks to this, since the preload Fao can be applied easily and positively to the portion of the inner ring 2 on the retainer pocket-opening side 5, the rotation torque of the bearing apparatus, variations in such rotation torque, and the vibrations of the bearing apparatus not synchronous with the rotation thereof, can be reduced.

Description of Tests

Here, description will be given below of tests conducted in order to confirm the effects of the bearing apparatus described hereinbefore.

Figure 27A:
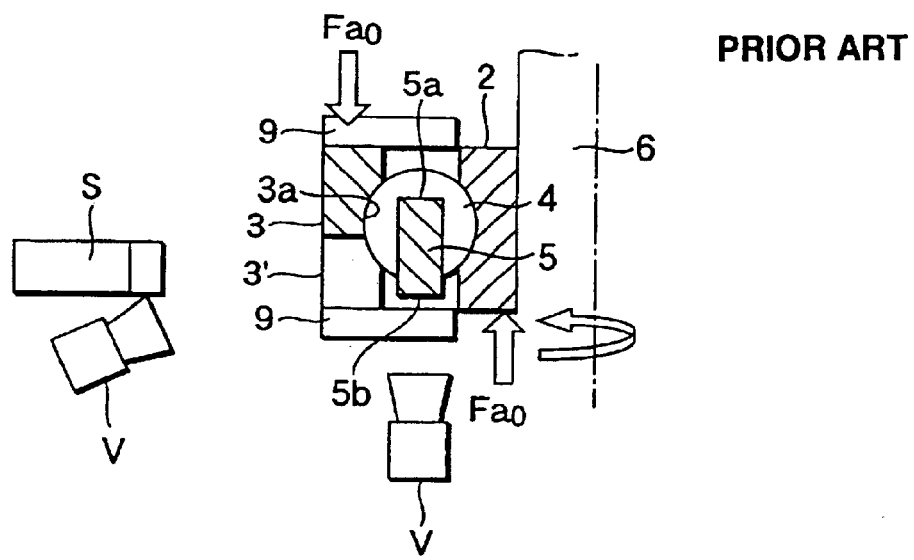
FIGS. 27A and 27B are schematic section views of structures on which a first test was conducted in order to observe the movement of grease existing in the interior of a bearing; specifically.
Figure 27B:
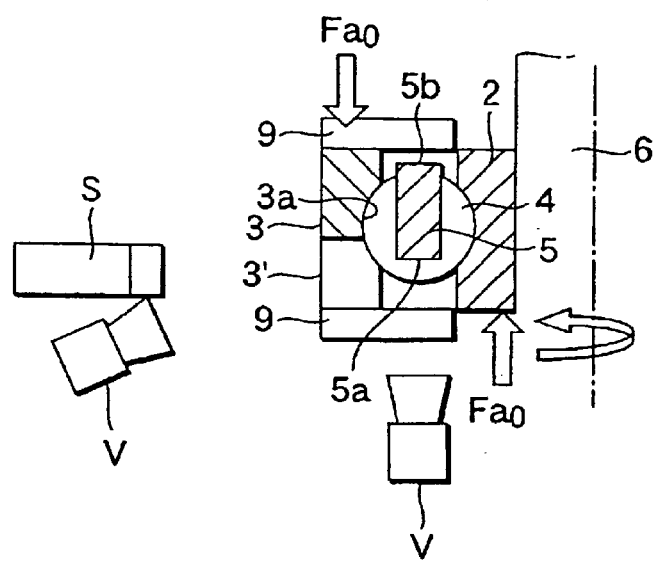

Firstly, the movement of the grease existing in the interior portion of the bearing was observed. FIGS. 27A and 27B are schematic views of observation test apparatuses. In the present test, in order to be able to confirm the movement of the grease, the counter-load side portion 3' of the outer ring 3 and the seal plate 9 portion are made of transparent acrylic acid resin. In observation, an electric flash S or a high-speed video V was used and the movement of the grease was photographed while rotating the inner ring 2.

The grease was colored with a dye and was filled into the space of the retainer 5 on the counter-pocket-opening side 5*b*.

FIG. 27A shows a structure where a preload Fao is applied to the inner ring end face on the retainer counter-pocket-opening side 5*b* and to the outer ring end face on the retainer pocket-opening side 5*a* ((1) which is also referred to as a structure according to the prior art); and, FIG. 27B shows a structure where a preload is applied to the inner ring end face on the retainer pocket-opening side 5*a* and to the outer ring end face on the retainer counter-pocket-opening side 5*b* ((2) which is also referred to as a structure according to the present invention).

(1) In the case of the structure according to the prior art:

Grease existing on the raceway surface 3*a* of the outer ring 3, due to passage of the ball 4, is discharged out of the raceway surface 3*a*, and most of the grease flows to the counter-pocket-opening side 5*b* of the retainer 5 (that is, the outer ring counter-load side direction) and joins grease which flows in the radial direction from between the counter-pocket-opening side 5*b* end face and seal 9 inner surface.

On the other hand, only a little grease collects in a space on the retainer pocket-opening side 5*a*, i.e., only that which touches the ball 4 and is allowed to flow through the ball 4, whereas the other remaining grease little flows.

(2) In the case of the structure according to the present invention:

Grease existing on the raceway surface 3*a* of the outer ring 3, due to the passage of the ball 4, is discharged out of the raceway surface 3*a*, and most of the grease flows to the pocket-opening side 5*a* of the retainer 5 (that is, the outer ring counter-load side direction) and collects in a space on the retainer pocket-opening side 5*a*. The grease, only when it touches the ball 4, is allowed to flow and the other remaining grease little flows.

On the other hand, only a little grease flowing to the retainer counter-pocket-opening side 5*b* joins grease which flows outwardly in the radial direction from between the counter-pocket-opening side 5*b* end face and seal 9 inner surface.

The above test results show that, in both of the (1) and (2) structures, in the case of the grease existing on the outer raceway surface 3*a* (the grease, which touches the ball 4, inner ring 2 and retainer 5 and receives a centrifugal force, is splashed outwardly in the radial direction and is easy to be supplied to the outer ring side), due to the passage of the ball 4 through the raceway surface 3*a*, most of the grease flows in the outer ring counter-load side direction. Therefore, in the case of the (1) structure, the grease easily touches the retainer 5 and, thus, the fluidity of the grease is active. On the other hand, in the case of the (2) structure, the grease easily collects in the space on the retainer pocket-opening side 5*a* and, thus, when compared with the (1) structure, the fluidity of the grease is low.

First Test

Figure 28:
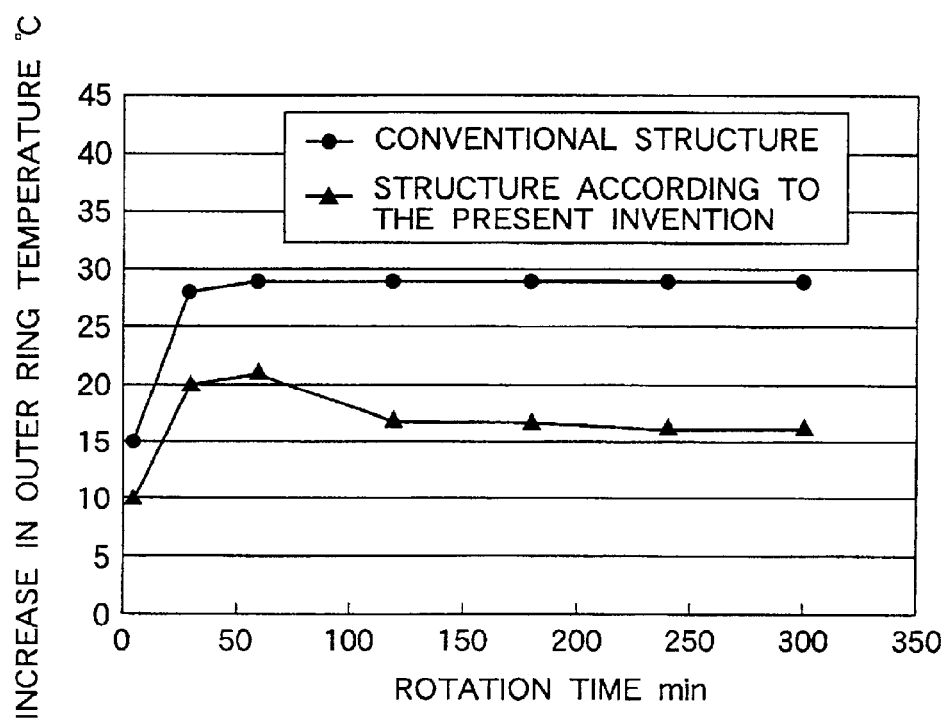
FIG. 28 is a graphical representation of the results of the first test for confirmation of the effects of the present invention.
Figure 44:
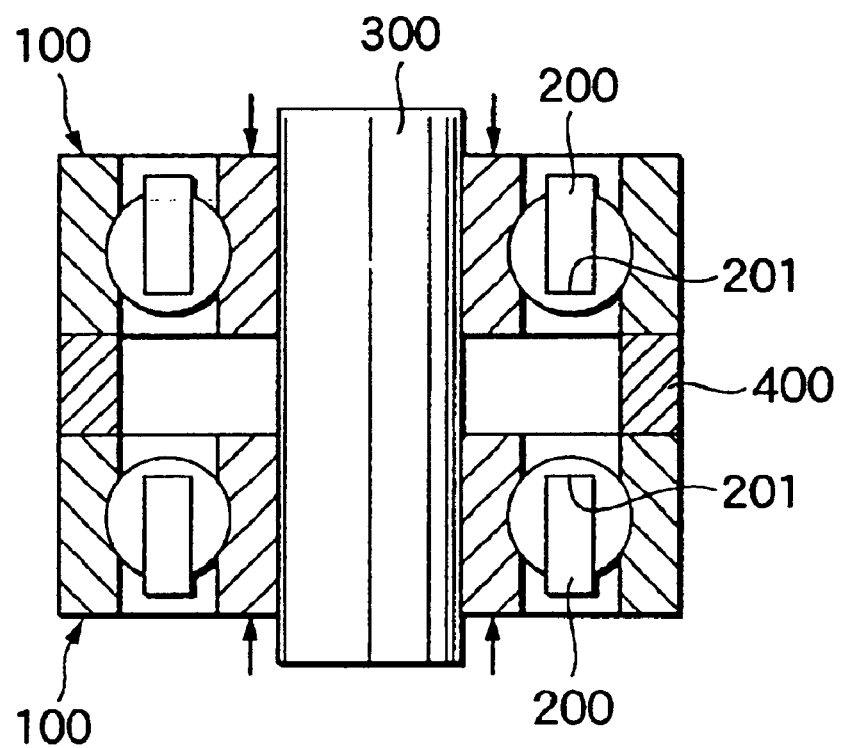
FIG. 44 is a schematic section view of a related bearing apparatus.
Figure 45:
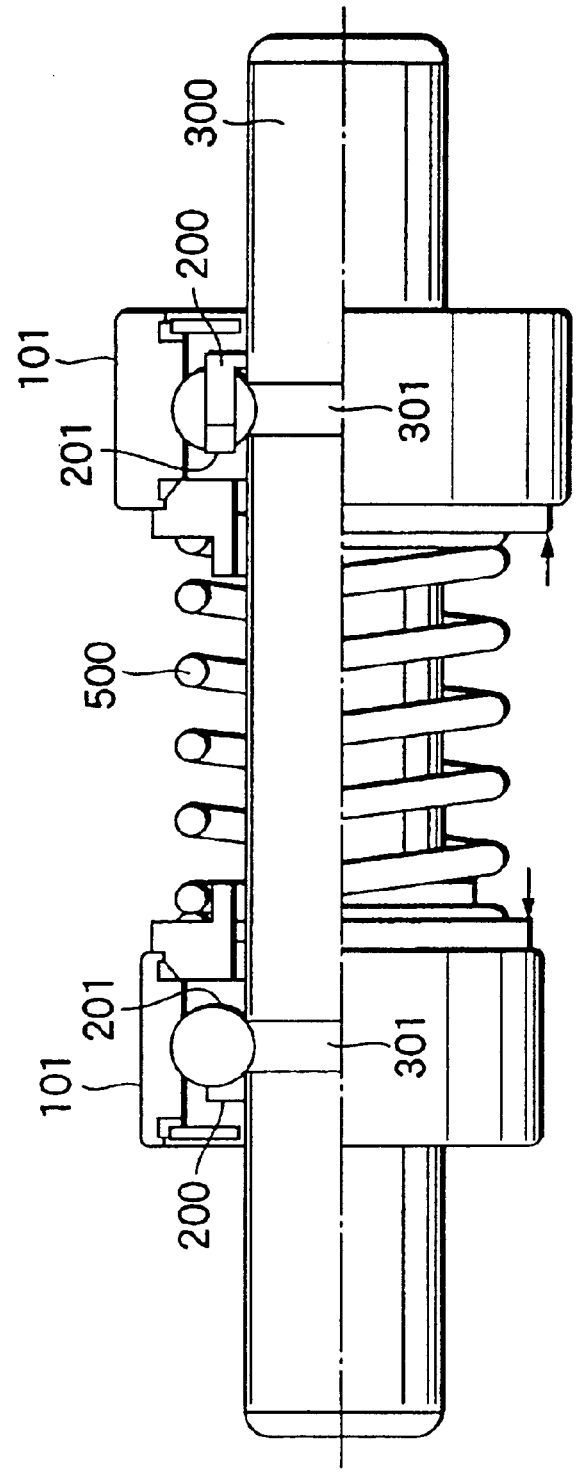
FIG. 45 is a schematic section view of another related bearing apparatus.
Figure 46:
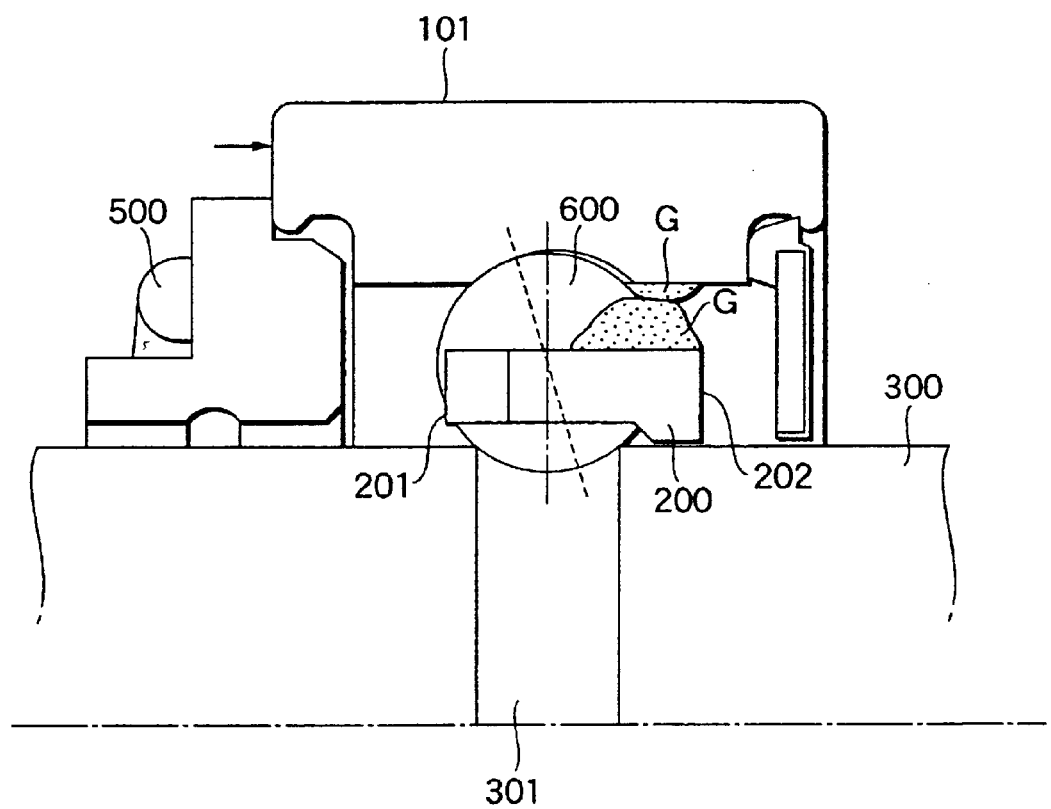
FIG. 46 is a schematic enlarged view of the retainer incorporating direction portion of the related bearing apparatus shown in FIG. 45.
Figure 47:
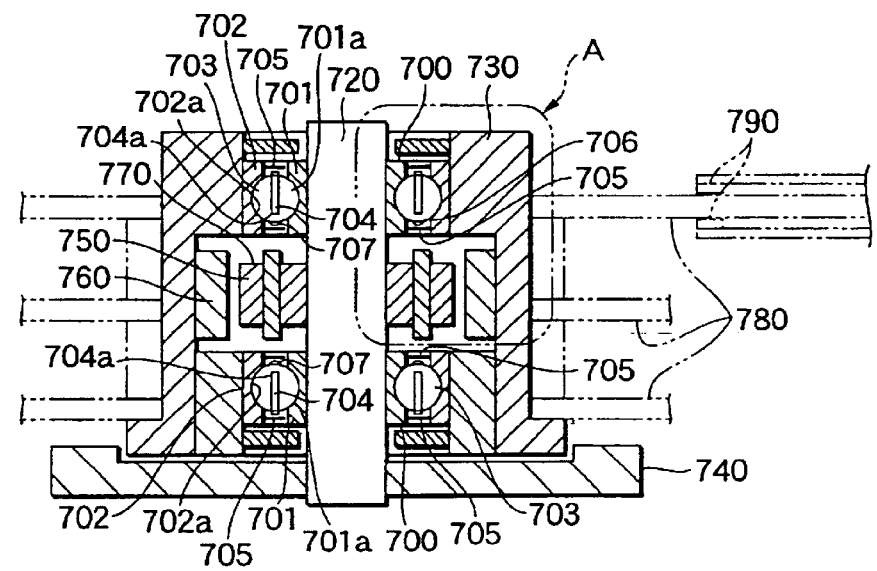
FIG. 47 is a longitudinal section view of another related bearing apparatus.
Figure 48:
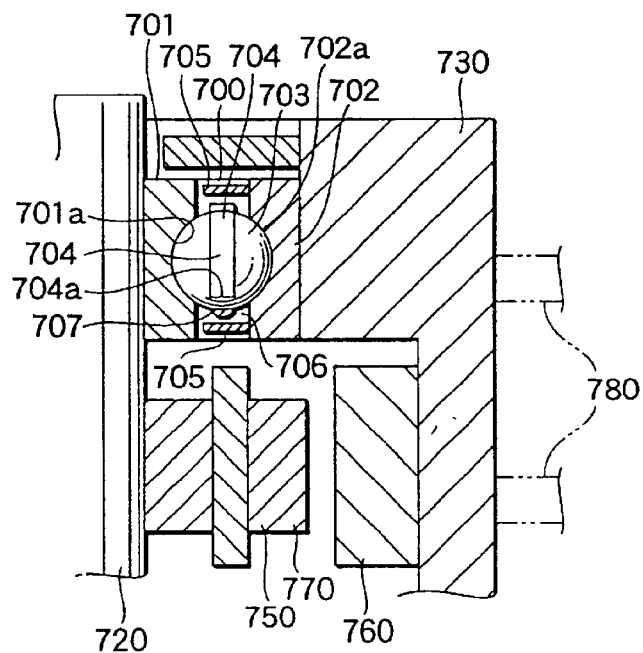
FIG. 48 is a longitudinal section view of the A portion shown in FIG. 47, while the A portion is enlargedly shown.
Figure 49:
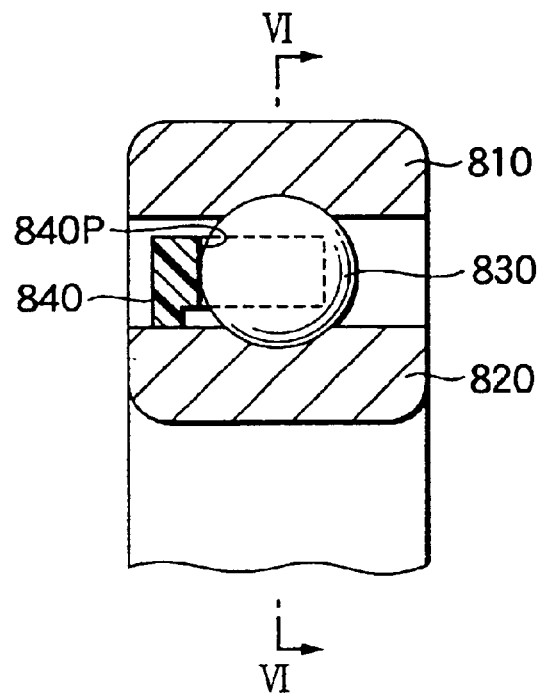
FIG. 49 is a section view of a portion of a related bearing apparatus incorporating therein a retainer having a flat cylindrical-shaped pocket.
Figure 50:
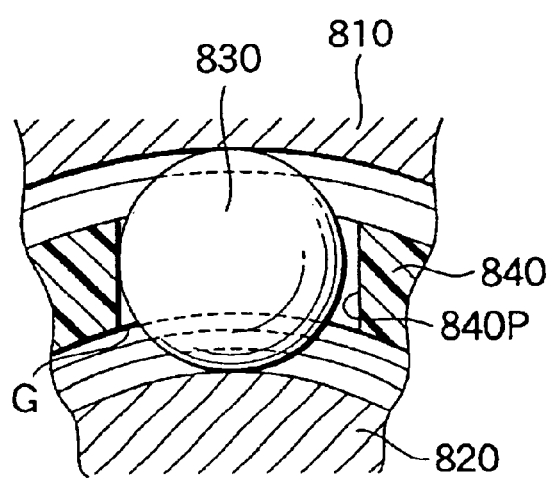
FIG. 50 is a partially enlarged view of a section shown by the line VI—VI shown in FIG. 49.
Figure 51:
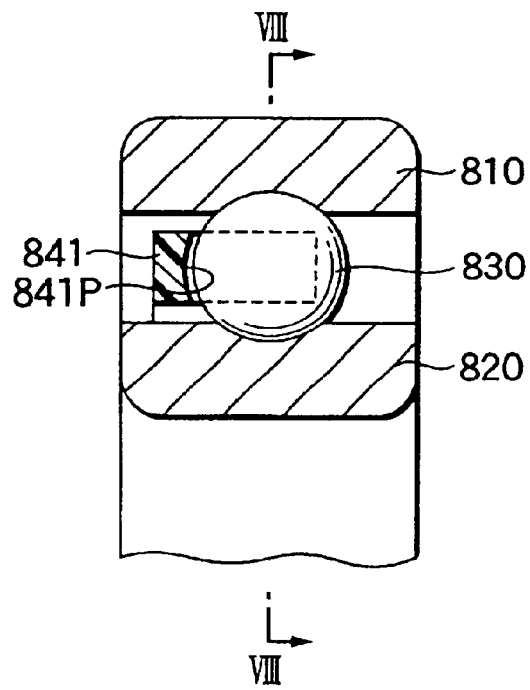
FIG. 51 is a section view of a portion of a related bearing apparatus incorporating therein a retainer having a spherical-shaped pocket.
Figure 52:
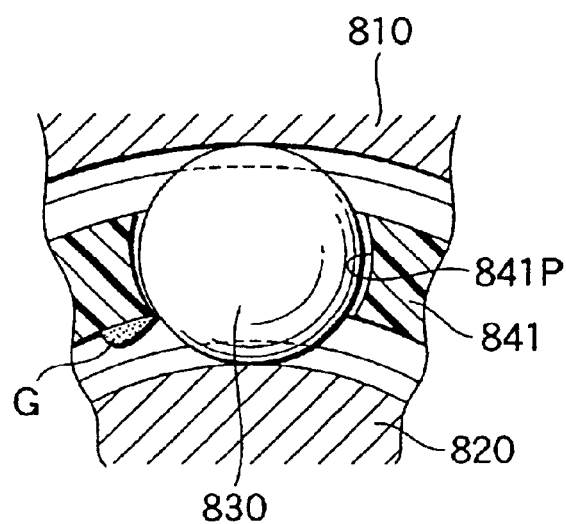
FIG. 52 is a partially enlarged view of a section shown by the line VIII—VIII shown in FIG. 51.

Next, FIG. 28 shows the results of a test conducted in order to confirm the effects of the present embodiment. In the test, there were used a bearing apparatus (FIG. 44) according to the prior art employing the preload pattern of the (1) structure, and a bearing apparatus (FIG. 1) according to the present invention employing the preload pattern of the (2) structure. An increase in the bearing temperature (a value obtained by subtracting the atmospheric temperature from the outer ring temperature) was measured. The test conditions were the same for both of the structures except that, as described above, the preload patterns were different.

Bearing: Single-row deep-raceway ball bearing having an inside diameter 30 mm, an outside diameter 72 mm and a width Number of rotations:50s-1 (3000 rpm) (inner ring rotation)

Preload: Axial load 490N

Test time: 5 hours

As can be seen from FIG. 28, when compared with the prior art, the present invention is low in an increase in the temperature and is also low in torque. Therefore, with use of the present invention, the flow of the grease in the interior portion of the bearing settles in an early stage and thus a reduction in the torque of the bearing can be realized.

Although the present test was conducted using an inner ring rotation system, similar results can be expected in the case of an outer ring rotation system as well. Therefore, in both of the inner ring and outer ring rotation systems, with use of the preload pattern employed in the present invention, a reduction in the torque can be attained.

Also, when an axial load and a radial load are applied at the same time, the contact angle does not provide an angle of 0° and, thus, the effects of this case may be considered to be similar to the above-mentioned embodiment of the present invention.

Second Test

Figure 31:
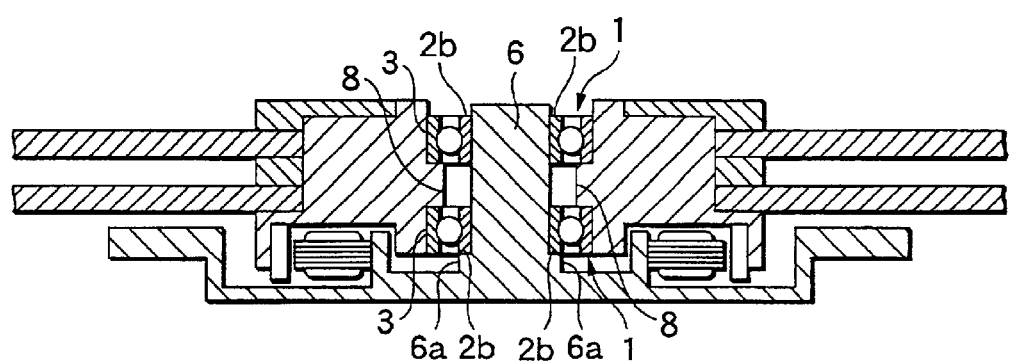
FIG. 31 is a schematic section view of an HDD/SPM apparatus.

In a second test, a bearing apparatus having the related structure (FIG. 44) and a bearing apparatus having the structure according to the present invention FIG. 1) were disposed on the HDD/SPM apparatus shown in FIG. 31. Time series variations in the torque and NRRO of the two bearing apparatuses were compared.

In the present test, the end face 2b of the inner ring 2 in one bearing (in FIG. 31, the lower bearing) was butted against a stepped portion 6a formed on one side of the shaft 6 of the HDD/SPM apparatus; between the outer rings 3 and 3 of the two bearings 1 and 1, there were interposed the stepped portions 8 that are formed in the inside diameter surface of the housing; and, a weight or a spring force equal to a desired preload was applied to the end face 2b of the inner ring 2 of the other bearing (in FIG. 31, the upper bearing) to thereby fix the inner ring 2 to the shaft 6 by adhesion. Instead of adhesion, the inner ring 2 may also be fixed by pressure insertion.

Bearing: Miniature ball bearing for information equipment, having an inside diameter 5 mm, an outside diameter 13 mm, a width 3 mm Number of rotations: 120 s-1 (7200 rpm) (outer ring rotation)

Preload: Axial load 11.76N (1.2 kgf)

Test time: 2 Hrs.

Figure 29A:
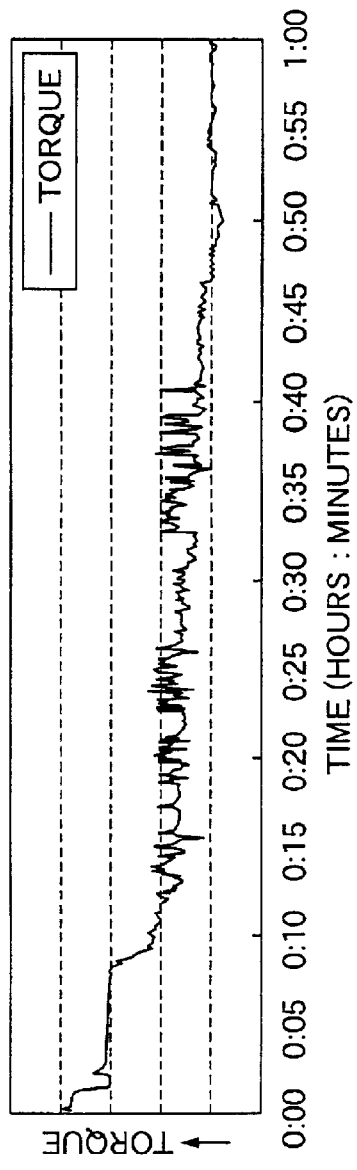
FIGS. 29A and 29B show the results of the second test conducted in order to confirm the effects of a related bearing apparatus (specifically, FIG. 29A shows time series variations in the torque of the related bearing apparatus; and, FIG. 29B shows time series variations in NRRO thereof)
Figure 29B:
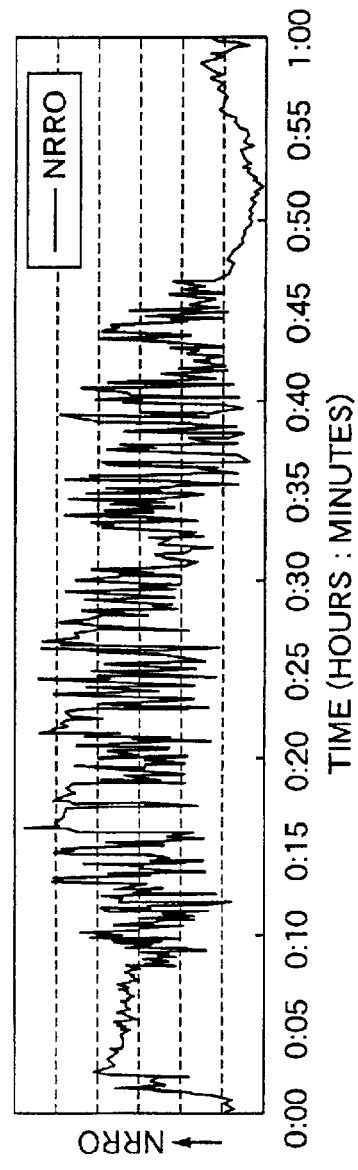
Figure 30A:
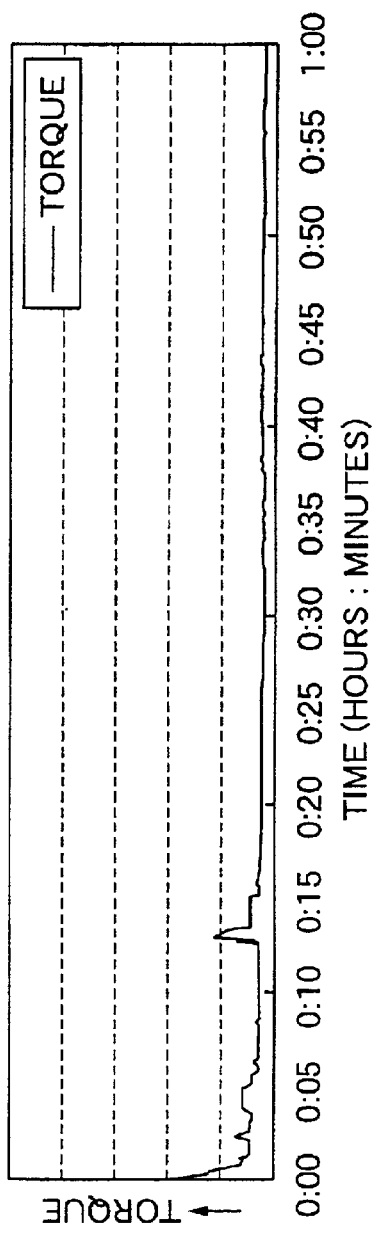
FIGS. 30A and 30B show the results of a second test conducted in order to confirm the effects of the present invention (specifically, FIG. 30A shows time series variations in the torque of the bearing apparatus according to the present invention; and, FIG. 30B shows time series variations in NRRO thereof)
Figure 30B:
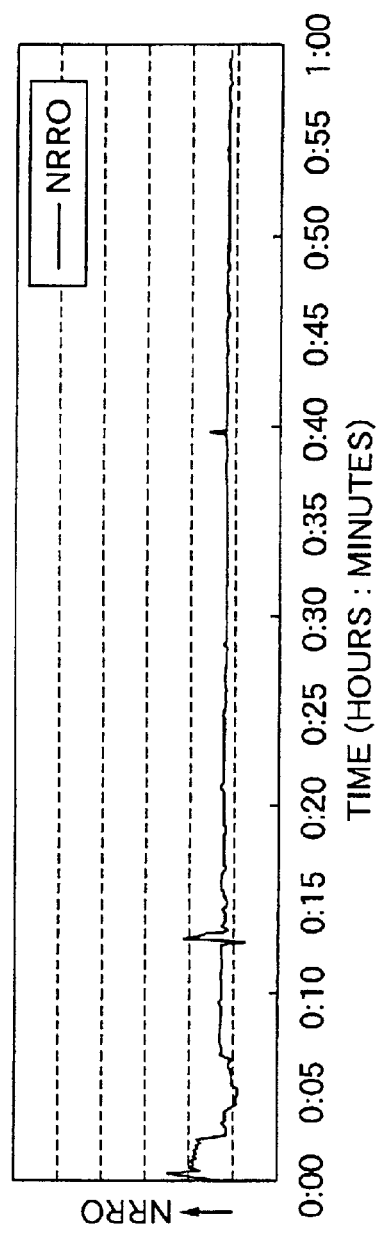

FIGS. 29 and 30 show the results of the second test. Specifically, FIG. 30 shows the results of the structure according to the present invention, whereas FIG. 29 shows the results of the related structure (in the respective figures, FIGS. 29A and 30A show the time series variations in the torque and FIGS. 29B and 30B show the time series variations in NRRO). These results show clearly that the bearing apparatus according to the present invention is small in the torque, as well as variations in the torque, as well as in NRRO. When these results are compared with the results of the related bearing apparatus, it can be confirmed that the bearing apparatus according to the present invention is better in both torque and NRRO than the related bearing apparatus. By the way, in the present test example, there was employed the outer ring rotation system but, in the case of the inner ring rotation system as well, a similar effect could be expected. Also, the number of rotations and the quantity of the preload are not limited to any specific values.

Twenty-First Embodiment

Figure 25:
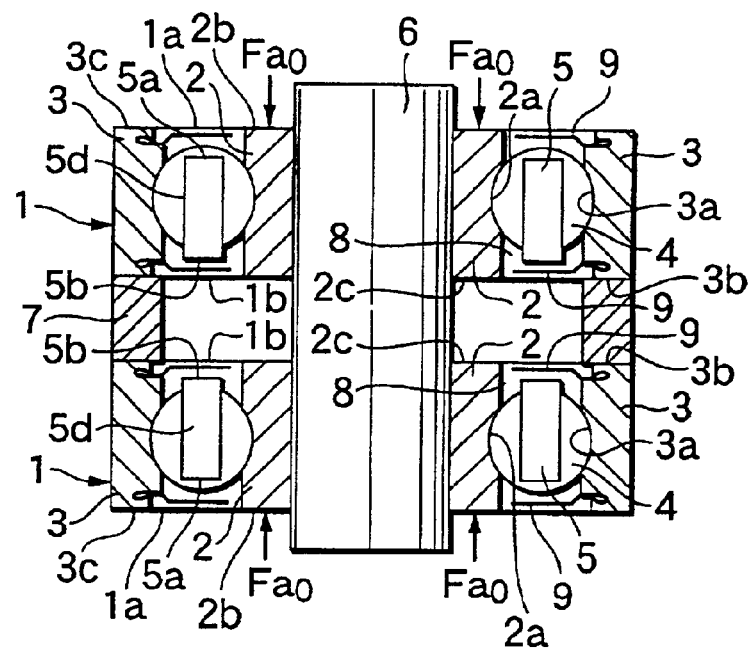
FIG. 25 is a schematically longitudinal section view of a twenty-first embodiment of a bearing apparatus according to the present invention.

Now, FIG. 25 shows a twenty-first embodiment of a bearing apparatus according to the present invention, which comprises two bearings 1 and 1 similar to those in the first embodiment. Specifically, the inner rings 2 and 2 of the two bearings 1 and 1 are respectively fixed to the outer periphery of a shaft 6, the counter-pocket-opening sides 5b and 5b of the retainers 5 and 5 of the two bearings 1 and 1 are respectively opposed to each other and, between the outer rings 3 and 3 of the two bearings 1 and 1, there is interposed a spacer 7. In this structure, by applying a preload Fao to the inner rings 2 and 2 from the retainer opening sides 5a and 5a, the preload can be applied to the outer rings 3 and 3 from the retainer counter-pocket-opening sides 5b.

According to the present embodiment, the two bearings 1 and 1 are combined together in such a manner that marks 11, as shown in FIGS. 24A and 24B, are not opposed to each other: that is, in the case of the bearing 1 situated on the upper side in the axial direction of the bearing apparatus in FIG. 25, the marks 11 are provided on the upper end faces (as the apparatus is shown in FIG. 25) 2c and 3c of the inner and outer rings 2 and 3; and, in the case of the lower-side bearing 1, the marks 11 are provided on the lower end faces (as the apparatus is shown in FIG. 25) 2c and 3c of the inner and outer rings 2 and 3.

According to this embodiment, lubricants are sealed into the raceway surfaces 2a and 3a of the inner 2 and outer 3 rings and, thus, torque can be reduced and accuracy can be enhanced.

Twenty-Second Embodiment

Figure 26:
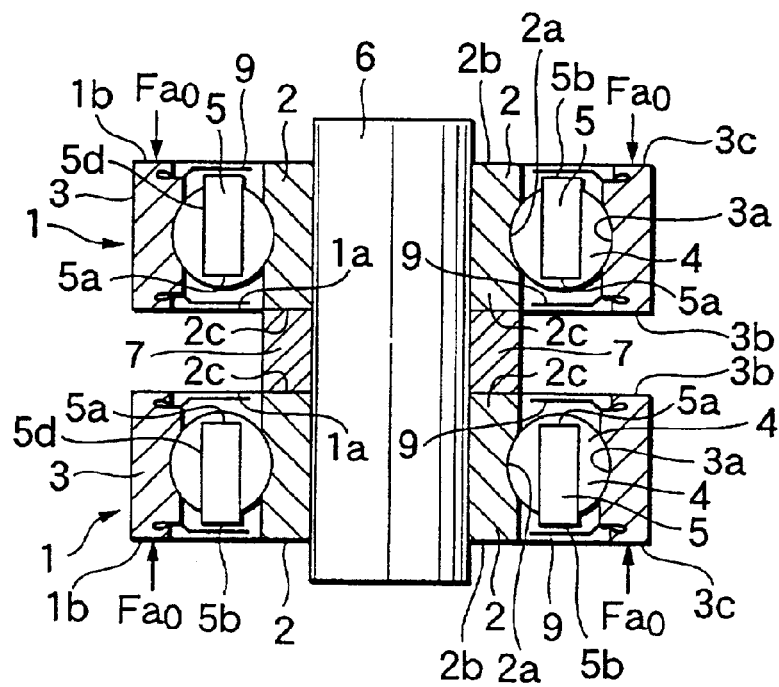
FIG. 26 is a schematically longitudinal section view of a twenty-second embodiment of a bearing apparatus according to the present invention.

Now, FIG. 26 shows a twenty-second embodiment of a bearing apparatus according to the present invention, which comprises two bearings 1 and 1 similar to those in the second embodiment of FIG. 3. Specifically, the inner rings 2 and 2 of the two bearings 1 and 1 are respectively fixed to the outer periphery of a shaft 6, the pocket-opening sides 5a and 5a of the retainers 5 and 5 of the two bearings 1 and 1 are opposed to each other, and there is interposed a spacer 7 between the two inner rings 2 and 2. In this structure, by applying a preload Fao to the outer rings 3 and 3 of the two bearings 1 and 1 from the retainer counter-pocket-opening sides 5b and 5b, the preload can be applied to the inner rings 2 and 2 from the retainer pocket-opening sides 5a.

According to the present embodiment, the two bearings 1 and 1 are combined together in such a manner that marks 11, as shown in FIGS. 24A and 24B, are opposed to each other: that is, in the case of the bearing 1 situated on the upper side in the axial direction of the bearing apparatus in FIG. 26, the marks 11 are provided on the lower end faces (as the apparatus is shown in FIG. 26) 2c and 3c of the inner and outer rings 2 and 3; and, in the case of the lower-side bearing 1, the marks 11 are provided on the upper end faces (as the apparatus is shown in FIG. 26) 2c and 3c of the inner and outer rings 2 and 3.

Embodiment of the Retainer

Figure 32:
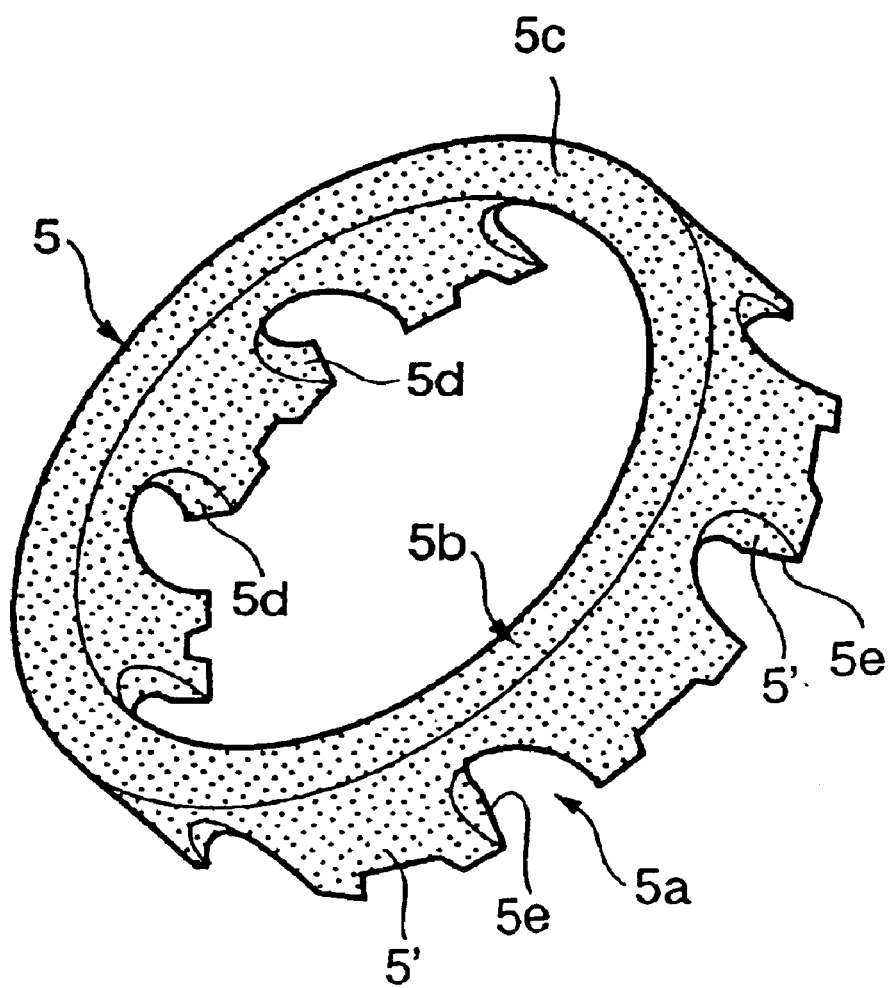
FIG. 32 is a perspective view of an embodiment of a crown-shaped retainer to be incorporated into a bearing apparatus according to the present invention.

Now, FIG. 32 shows an embodiment of a crown-shaped retainer 5 for a bearing which is used in a bearing apparatus according to the present invention. The retainer 5 is injection molded using a molding metal mold which is worked by shot blast or by electric discharge machining so as to provide such surface roughness having the maximum height Ry being of 3 to 50 μm or so. The basic shape of the retainer 5 can be selected arbitrarily. Therefore, on the surface of the retainer 5, there are innumerably and randomly formed delicate recessed portions 5', . . . which serve as lubricating oil standing portions. In the present embodiment, while the recessed portions 5' are formed on the entire surface of the retainer 5, the surface roughness of at least the pocket surface (rolling element sliding contact surface) 5d of the retainer 5 may only be formed such that it has the above-mentioned maximum height Ry. Due to lubricants held in the recessed portions 5', there are formed oil films between the rolling surfaces of the rolling elements 4 and the inner surface of the retainer pocket 5d to thereby allow the rolling elements 4 to roll smoothly. Also, the lubricants stuck to the rolling surfaces of the rolling elements 4 are fed to the rolling contact portions of the rolling surfaces of the rolling element 4 with respect to the inner raceway surface and outer raceway surface, thereby being able to enhance the lubricating conditions of these rolling contact portions of the rolling elements 4.

As described above, the rolling bearing 1 is not limited to a specific structure but employs a general structure. The present embodiment is characterized in that: the crown-shaped retainer 5 with the specified surface roughness is incorporated into the bearing 1.

In the bearings 1 respectively incorporating the crown-shaped retainers 5 therein, since the preload is applied not only to the inner ring end faces 2b and 2b situated on the retainer pocket opening sides 5a and 5a but also to the outer ring end faces 3b and 3b situated on the retainer pocket counter-opening sides 5b and 5b, it is possible to design a bearing apparatus which can provide reduced torque and enhanced rotation accuracy. Also, the dust-production problem, which is found in the above-mentioned related bearing apparatus, can be solved by using a magnetic fluid seal.

Third Test

Here, description will be given below of a third test conducted in order to confirm the effects of the present invention.

In the third test, the bearings were incorporated into an apparatus shown in FIG. 31 and variations in current values (which are converted to torque) with passage of time were measured.

By the way, in the present test, the end face 2b of the inner ring 2 of one bearing (in FIG. 31, the lower bearing) was butted against a stepped portion 6a formed on one end side of the shaft 6 of the apparatus, a stepped portion 8 formed in the periphery of the inside diameter surface of a housing is situated between the outer rings and 3 of the two bearings 1 and 1, and a weight or a spring force equal to a desired preload was applied to the end face 2b of the inner ring 2 of the other bearing (in FIG. 31, the upper bearing) 1 to thereby adhere and fix it to the shaft 6. In this case, instead of adhesion, the end face 2b may also be pressure inserted into the shaft 6.

Bearing: Inside diameter 5 mm, outside diameter 13 mm, width 4 mm (corresponding to JIS 695)

Number of rotations: 7200 min-1 (Out er ring rotation)

Preload: Axial load 11.8N

TABLE 1

| | The Present Invention | Comparison Example 1 | Comparison Example 2 | Comparison Example 3 |
|---|---|---|---|---|
| Retainer pocket shape | -> | Spherical surface, Pocket surface roughness Ry = 10 μm | Spherical surface, Pocket surface roughness Ry = 1 μm or less | Circular cylinder Pocket surface roughness Ry = 1 μm or less |
| Guide type | | Ball guide | Ball guide | Inner ring guide |
| Preload direction | Retainer pocket opening side inner ring | Retainer pocket counter-opening side inner ring | Retainer pocket counter-opening side inner ring | Retainer pocket counter-opening side inner ring |

Figure 33:
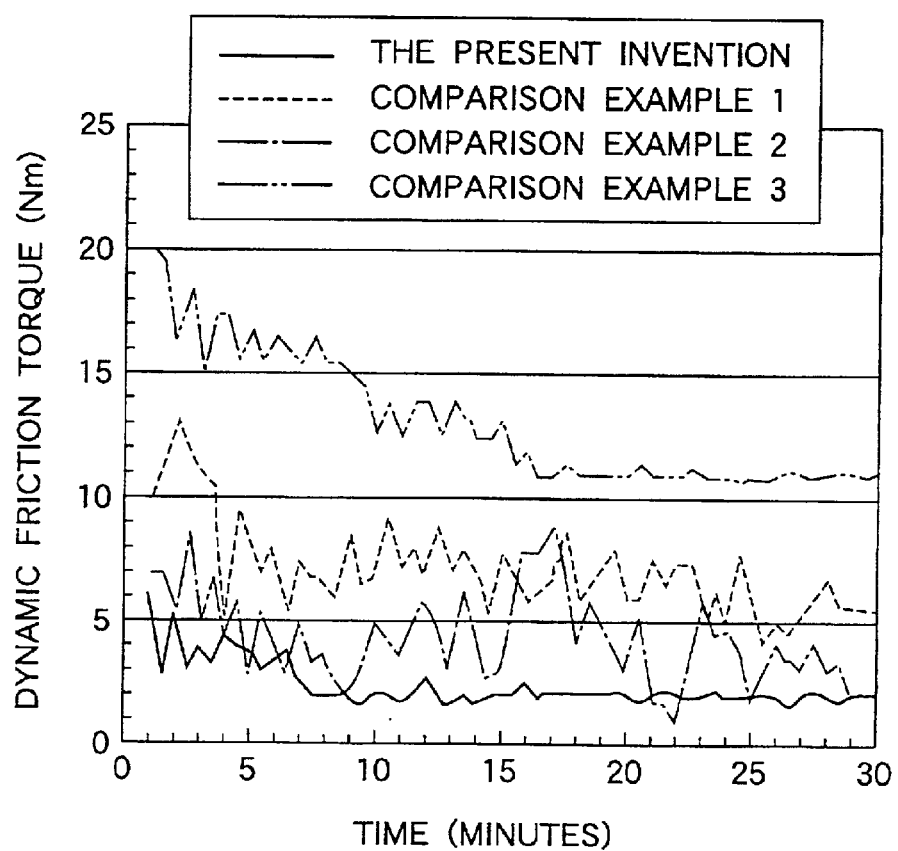
FIG. 33 is a graphical representation of the third test results.

FIG. 33 shows the results of the above third test. In FIG. 33, data shown by a solid line express the present invention, data shown by a chained line express the comparison example 1, data shown by a one-dot chained line express the comparison example 2, and data shown by a two-dot chained line express the comparison example 3.

As can be seen from the third test results, according to the structure of the present invention, even when a retainer with increased pocket surface (sliding contact surface) roughness is used, the dynamic friction torque can be reduced and stabilized when compared with the related bearing.

By the way, when the retainer pocket surface roughness exceeds the maximum height Ry=50 μm, unfavorably, during the injection molding, burrs can be produced and dimension accuracy can be deteriorated, but high rotation accuracy is required. For example, the maximum height Ry for the HDD spindle motor or VCR may be preferably set for 10 μm or less. Also, when the maximum height Ry is less than 3 μm, the holding capacity of the lubricant is unfavorably short. This shows that, as described above, the maximum height Ry may be preferably set in the range of 3 to 50 μm.

Second Embodiment of the Retainer

Figure 53A:
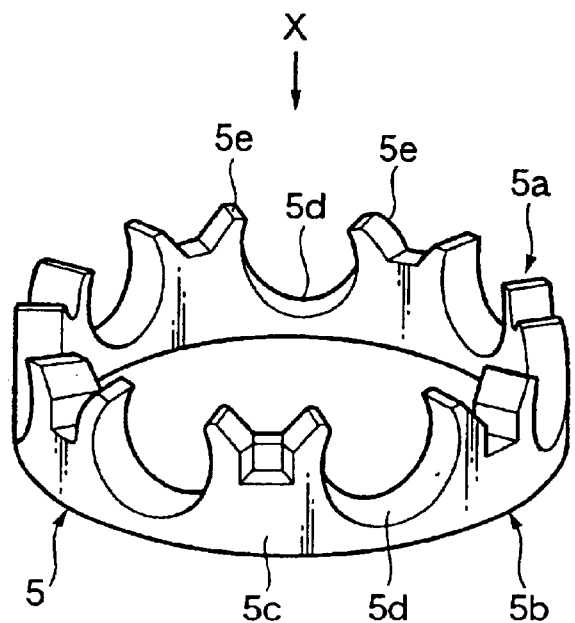
FIG. 53 is a section view taken along the X arrow line shown in FIG. 37.
Figure 53B:
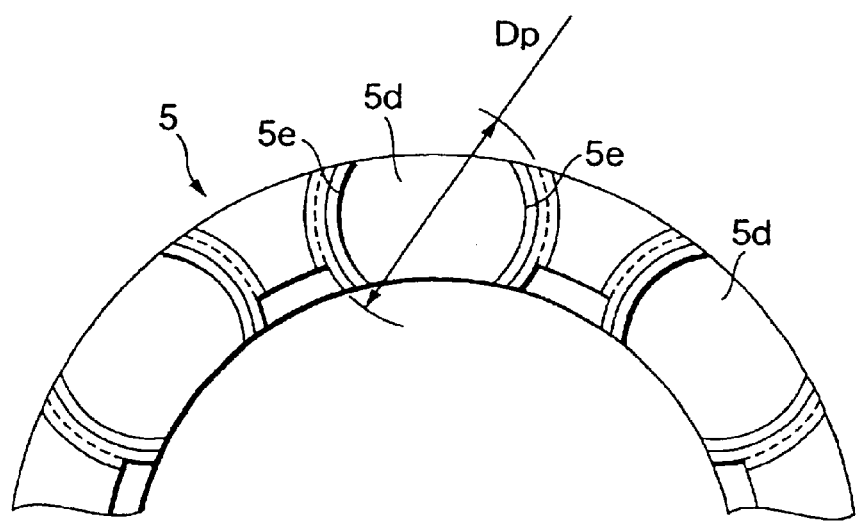
Figure 54:
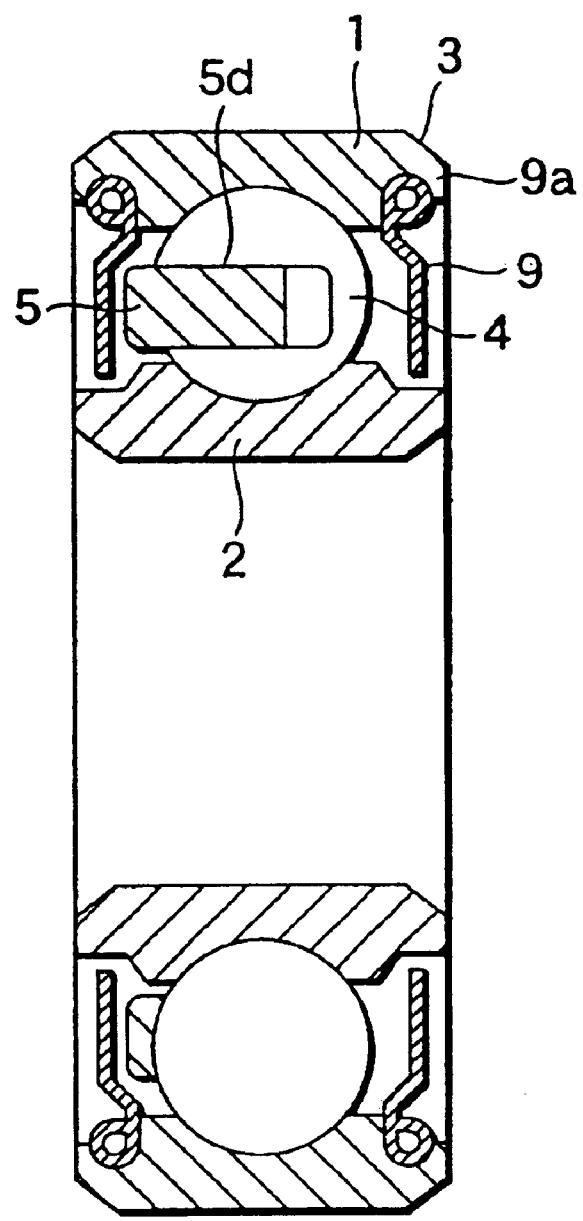
FIG. 54 is a section view of a ball bearing.

The crown-shaped retainer 5 to be incorporated into the bearing 1 is structured in the following manner. That is, the retainer 5 is structured such that the pocket diameter (Dp: see FIG. 53) of the crown-shaped retainer 5 is set with respect to a ball diameter (Dw) so that 1.050>Dp/Dw>1.005. The crown-shaped retainer 5 has an ordinary structure except for the ratio of Dp/Dw. That is, the crown-shaped retainer 5 comprises a circular-ring-shaped main portion 5c and a plurality of pockets 5d formed in the axial-direction one surface of the main portion 5c, while the pockets 5d are interposed between a pair of elastic pieces 5e which are disposed spaced from each other in the axial-direction one surface of the main portion 5c. For example, there can be properly selected a retainer of a ball guide type shown in FIG. 37, or a retainer of an inner/outer ring guide type including a projecting portion provided on the outer periphery or inner periphery thereof (which is disclosed in JP-A-10-159855).

In the bearing 1 with the thus-structured crown-shaped retainer 5 incorporated therein, by applying the preload not only to the end face 2b of the inner ring 2 situated on the retainer pocket opening side 5a but also to the end face 3b of the outer ring 3 situated on the retainer pocket counter-opening side 5b, it is possible to design a bearing apparatus which is low in dynamic friction torque and small in noises and vibrations.

Fourth Test

Here, description will be given below of a fourth test conducted in order to confirm the effects of the present invention.

Bearing: Inside diameter, 5 mm; outside diameter, 13 mm; and, width, 3 mm (corresponding to JIS 695).

Number or rotations: 10000 ml n-1

Preload: 20N

Time: Vibrations and torque, values measured five minutes after start of rotation.

In the fourth test, while the ratio Dp/Dw between the pocket diameter (Dp) of the crown-shaped retainer 5 and ball diameter (Dw) was set in the range of 1.005–1.070, by changing the preload applying directions, the vibration amplitude (here, the retainer rotation component of the vibration) and dynamic friction torque were measured.

Figure 34:
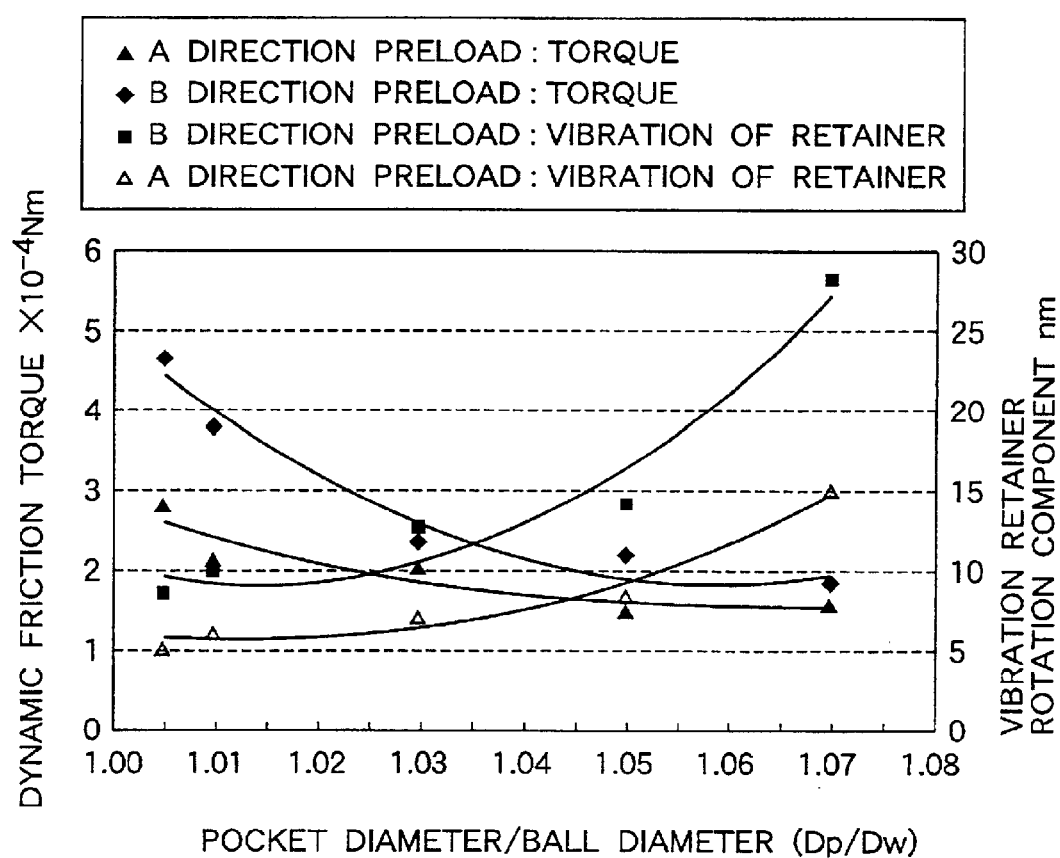
FIG. 34 is a graphical representation of the results of a fourth test conducted to confirm the effects of the present invention and related comparison example.
Figure 35A:
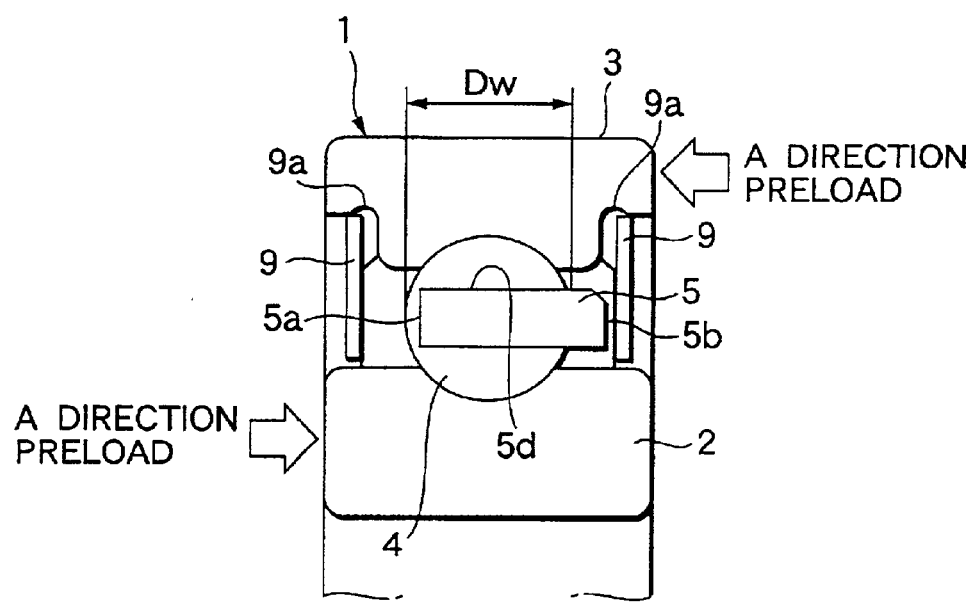
FIG. 35A is a schematic view of a bearing, showing a preload direction according to the present invention (an A-direction preload shown in FIG. 34); and, FIG. 35B is a schematic view of a bearing, showing, a preload direction according to the related comparison example (a B-direction preload shown in FIG. 34)
Figure 35B:
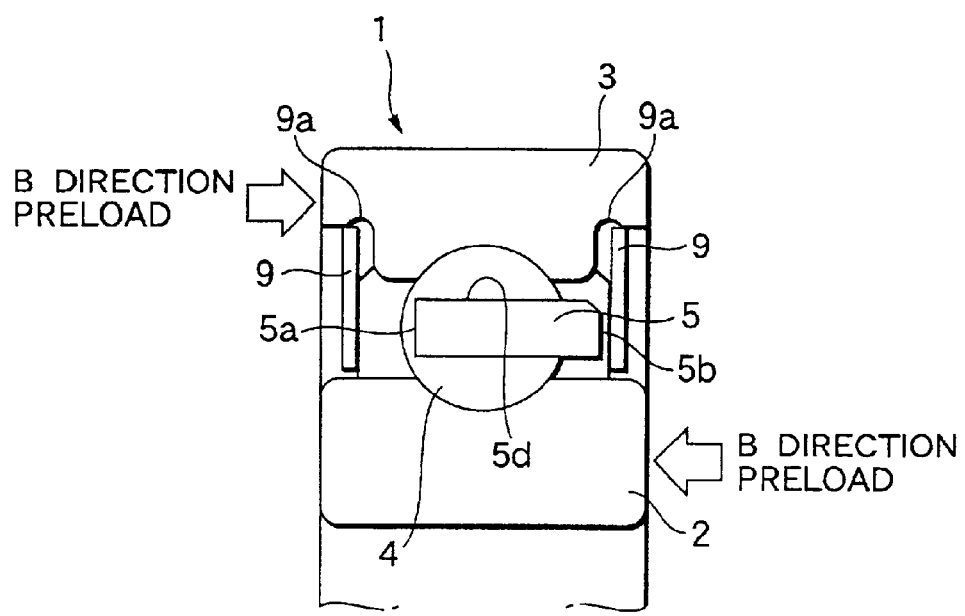

FIG. 34 shows the results of the fourth test. By the way, an A-direction preload shown in FIG. 34 expresses a preload (the present invention) which was applied not only to the retainer pocket-opening side 5a of the inner ring 2 but also to the retainer counter-pocket-opening side 5b of the outer ring 3; and, a B-direction preload expresses a preload (comparison example) which was applied not only to the retainer counter-pocket-opening side 5b of the inner ring 2 but also to the retainer pocket-opening side 5a of the outer ring 3. FIG. 35A shows a schematic view of the A-direction preload as in the present invention, whereas FIG. 35B shows a schematic view of the B-direction preload as the comparison example.

The fourth test results show that the dynamic friction torque of the bearing apparatus decreases as the ratio Dp/Dw increases and, on the other hand, the vibrations of the bearing apparatus increase as the ratio Dp/Dw increases.

However, both the dynamic friction torque and vibrations do not vary uniformly, but vary in an exponential curve manner. That is, 1.050>Dp/Dw>1.005 can be found as the range in which the dynamic friction torque and vibrations do not increase excessively.

Also, for example, a magnetic storage (which is represented by an HDD) has recently become very highly dense, with the number of tracks per inch going to reach 75,000 TPI (Track Per Inch).

Here, in the case of 75,000 TPI, the width of the track is 0.33 $\mu$m/track and, in order to distinguish a piece of track information clearly from its adjoining track information when reading and writing a signal, the vibration of a magnetic disk must be controlled down to 1/30 of the track width.

Therefore, there arises the need to control the vibration down to 0.01 $\mu$m. When this is applied to the vibration of the A-direction preload in FIG. 34, it is found that the ratio (Dp/Dw) must be set for 1.05 or less. On the other hand, referring to the preload applying direction, it can be seen clearly that the A-direction preload shown in FIG. 35A is smaller in both of the dynamic friction torque and vibrations.

From this, the following fact can be confirmed: that is, when not only the preload is applied from the retainer pocket-opening side 5a of the inner ring 2 and the retainer pocket counter-opening side 5b of the outer ring 3 (the preload direction a shown in FIG. 35A), but also the ratio (Dp/Dw) of the pocket diameter (Dp) of the crown-shaped retainer 5 to the ball diameter (Dw) is set in the range of 1.005 to 1.050, the dynamic friction torque and vibrations can be made very excellent.

By the way, it is not preferable to set the ratio (Dp/Dw) at 1.005 or less. That is, when the ratio (Dp/Dw) is 1.005 or less, and an error in manufacturing the crown-shaped retainer 5 is taken into account, there is a fear that the retainer pocket can restrict the balls.

Twenty-Third Embodiment

Figure 36:
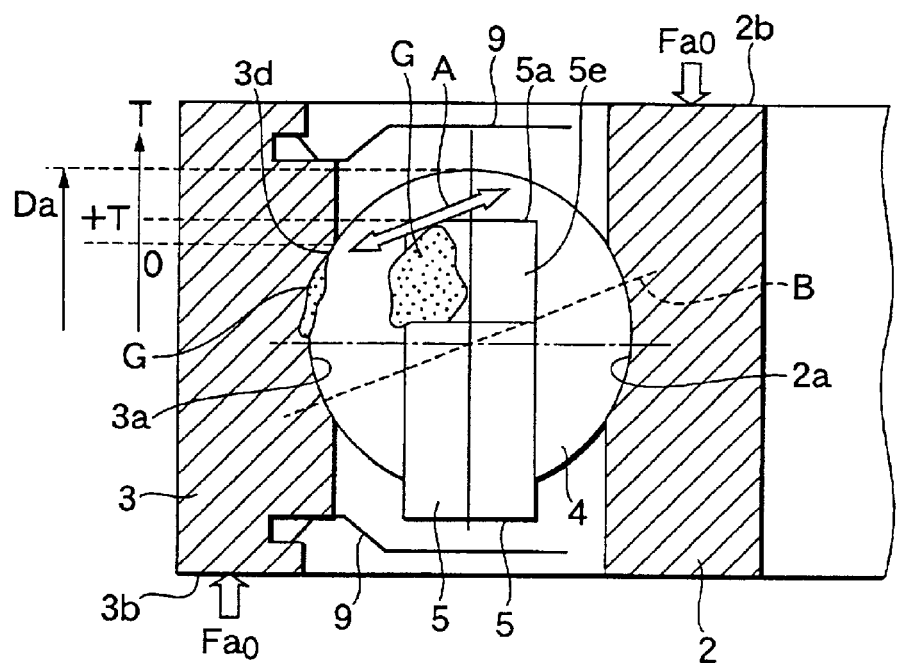
FIG. 36 is a partial sectional view of a twenty-third embodiment of a ball bearing according to the present invention.

FIG. 36 shows a schematic section view of a twenty-third embodiment of a ball bearing according to the present invention.

The ball bearing 1 comprises an inner ring 2 having an inner raceway 2a formed in the outer periphery thereof, an outer ring 3 having an outer raceway 3a formed in the inner periphery thereof, a plurality of rolling elements incorporated between the inner raceway 2a and outer raceway 3a, and a crown-shaped retainer 5 for holding the rolling elements 4 at regular intervals.

Also, as the need arises, between the inner and outer rings 2 and 3 of the ball bearing 1, there may be interposed two seal rings (in the present embodiment, shield rings) 9. The structure of the seal ring 9 is not limited to any specific structure so that the structure of the seal ring 9 can be changed without departing from the scope of the present invention. Also, in order to enhance the oscillation resistance of the product (ball bearing 1) in transit, a lubricant such as grease to be filled into the ball bearing 1 is filled into the raceways (that is, the inner raceway 2a and outer raceway 3a) of the ball bearing 1.

The crown-shaped retainer 5, for example as shown in FIG. 37, comprises a circular-ring-shaped main portion 5c and a plurality of pockets 5d respectively formed in one surface of the main portion 5c in the axial direction thereof; and, each of the pockets 5d is interposed between a pair of pawls (which may also be referred to as elastic pieces) 5e which are disposed in the axial-direction one surface of the main portion 5c with a clearance between them. And, the ball bearing 1 according to the present invention is characterized in that, when the outer raceway shoulder position 3d of the outer ring 3 is considered as the standard, the pawl height T of the retainer 5 is 20% or less of the diameter Da of the ball (rolling element) (that is, T≦20%×Da). The significance of such numerical definition will be discussed later in combination with the results of a fifth test (which also will be described later).

Also, the ball bearing 1 according to the present invention is also characterized in that a preload is applied not only to the inner ring 2 situated on the pocket opening side 5a of the retainer 5 but also to the outer ring 3 on the pocket counter-opening side 5b of the retainer 5.

With use of the two bearings each incorporating the crown-shaped retainer 5 therein, in case where a preload is applied not only to the inner ring end faces 2b and 2b situated on the retainer pocket opening sides 5a and 5a but also to the outer ring end faces 3b and 3b situated on the retainer pocket counter-opening sides 5b and 5b, there can be designed a bearing apparatus which is low in torque and is high in rotation accuracy.

Further, the grease G filled into the raceways of the bearings collects on the counter-contact-angle sides and, especially, due to the centrifugal force, the grease G collects on the outer ring sides. In case where, as described above, the preload is applied not only to the inner ring end faces 2b on the retainer pocket-opening sides 5a, but also to the outer ring end faces 3b on the retainer counter-pocket-opening sides 5b, as the ball 4 is rotated, the grease G collecting on the counter-contact-angle sides, as shown in FIG. 36, moves to the retainer pawl 5e sides in parallel to a contact angle line B (in FIG. 36, the moving direction of the grease G is shown by an arrow mark A). According to the present embodiment, since the pawl height T of each of the outer rings 3 with respect to the raceway shoulder position 3d is set 20% or less of the ball diameter Da (T<20%×Da), the scraping of the grease G can be controlled and the scraped grease G can be accumulated between the pawls 5e and 5e, which can provide a proper supply of grease.

The above operation makes it possible to realize bearing specifications which can provide low torque variations, low torque and low vibrations. Also, the dust generation problem can be solved by using a magnetic fluid seal.

Fifth Test

Next, description will be given below of a fifth test conducted in order to confirm the effects of the present invention.

In the present test, a miniature ball bearing for information equipment having an inside diameter of 5 mm, an outside diameter of 13 mm and a width of 3 mm was assembled into an HDD/SPM apparatus (FIG. 31), and time series variations in the torque and NRRO of the two following structures were measured and compared. In the present test, the end face 2b of the inner ring 2 in one bearing (in FIG. 31, the lower bearing) was butted against a stepped portion 6a formed on one end of the shaft 6 of the HDD/SPM apparatus; between the outer rings 3 and 3 of the two bearings 1 and 1, there were interposed the stepped portions 8 that were formed in the inside diameter surface of the housing; a weight or a spring force equal to a desired preload was applied to the end face 2b of the inner ring 2 of the other bearing (in FIG. 31, the upper bearing) to thereby fix the inner ring 2 to the shaft 6 by adhesion. In this case, instead of adhesion, the inner ring 2 may also be fixed by pressure insertion.

Number of rotations: 7200 min-1 (outer ring rotation)
Preload: Axial load 11.76N (1.2 kgf)
Time: 2 Hrs.

The fifth test was conducted to confirm the effects of the present invention as to the position of the pawl 5e of the crown-shaped retainer 5. When the height T of the pawl 5e of the crown-shaped retainer 5 was 30%, 20%, 10%, 0%, -10%, and -20% of the ball diameter Da, the respective NRRO and torque were measured in a time series manner, and there were compared times that were taken for the time series measured NRRO values to go below the measurement initial values such that NRRO: ⅓ and torque: ½.

Figure 38:
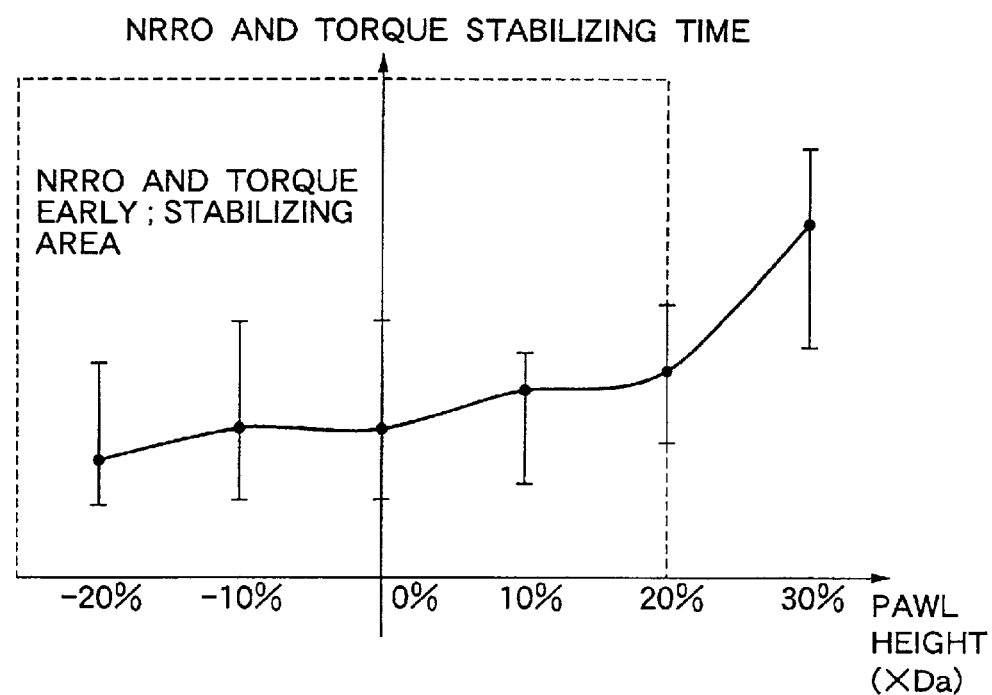
FIG. 38 shows the results of a fifth test conducted to confirm the effects of the present invention.

From the fifth test results, as shown in FIG. 38, it can be confirmed that, when the pawl height T is 20% or less of the ball diameter Da, NRRO and torque are stabilized at an early stage and, when the pawl height T is higher than 20% of the ball diameter Da, it takes time for NRRO and torque to stabilize. That is, it can be confirmed that, in order to stabilize NRRO and torque early, the pawl height T of the crown-shaped retainer 5 must be 20% or less of the ball diameter Da. Further, preferably, the pawl height T may be 0% or less and, from the viewpoint of rigidity, it may be -15% or less.

Figure 39:
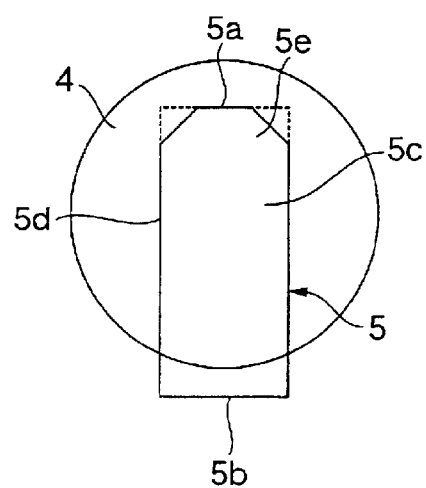
FIG. 39 is a schematic view of another embodiment of a retainer pawl portion.

In the present embodiment, the shape of the pawl 5e of the crown-shaped retainer 5 is not limited to any specific shape, so that the present invention can also apply to any pawl shape. For example, as shown in FIG. 39, it may be effective to cut away the leading end portions of the pawl 5e obliquely. In FIG. 39, the broken-line portions show the cut-away portions.

Twenty-Fourth Embodiment

Figure 40:
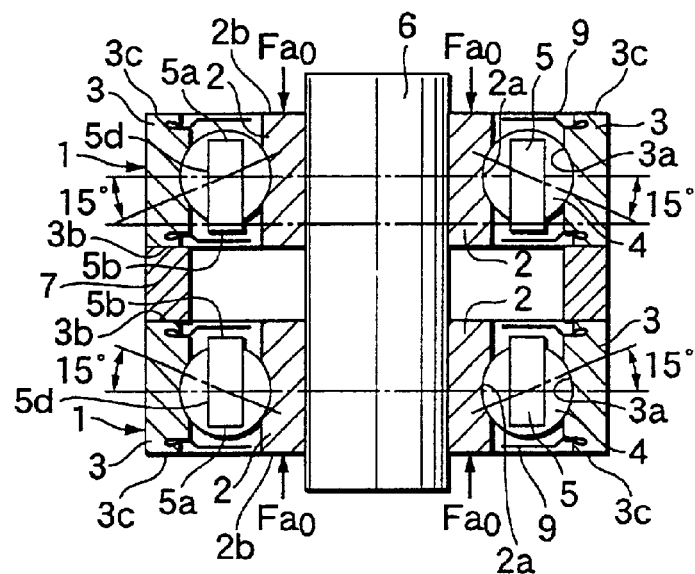
FIG. 40 is a schematic section view of a twenty-fourth embodiment of a bearing apparatus according to the present invention.

FIG. 40 shows a twenty-fourth embodiment of a bearing apparatus according to the present invention.

The present bearing apparatus comprises two ball bearings 1 and 1, wherein the two ball bearings 1 and 1 are combined together in such a manner that their inner rings 2 and 2 are respectively fixed to the outer periphery of a shaft 6 and a preload is applied thereto.

The rolling (ball) bearing 1 comprises an outer ring 3 having an outer raceway 3a formed in the inner peripheral surface thereof, an inner ring 2 having an inner raceway 2a formed in the outer peripheral surface thereof, a crown-shaped retainer 5 interposed between the outer and inner rings 3 and 2 in such a manner that it can be rotated with respect to the outer and inner rings 3 and 2, and a plurality of balls 4 respectively rotatably held in a plurality of pockets 5d formed in the crown-shaped retainer 5.

To the inner peripheral surfaces of the two end portions of the outer ring 3, there are secured the outer peripheral edges 9a and 9a of associated circular-ring-shaped seal plates (in the present embodiment, shield plates) 9 and 9, respectively. The two shield plates 9 and 9 prevent grease existing in the above-mentioned ball installation portions from leaking to the outside or prevent dust floating in the outside from flowing into the ball installation portions.

The structure of the seal plate 9 is not limited to any specific structure, and can be changed without departing from the scope of the present invention. Also, the seal plate 9 may also be provided as the need arises. In order to enhance the oscillation resistance of the product (ball bearing) in transit, a lubricant can be filled into the ball bearing 1 raceways (that is, the inner raceways 2a and outer raceways 3a).

The crown-shaped retainer 5, for example as shown in FIG. 37, comprises a circular-ring-shaped main portion 5c and a plurality of pockets 5d formed in one surface of the main portion 5c in the axial direction thereof. And, each of the pockets 5d is interposed between a pair of pawls (which are also referred to as elastic pieces) 5e disposed in one axial-direction end surface of the main portion 5c such that they are spaced from each other.

As described above, the present (rolling) ball bearing is not limited to any specific structure but employs an ordinary structure as a ball bearing. However, the present embodiment has the following characteristic elements of the present invention. That is, the counter-pocket-opening sides 5b and 5b of the respective retainers 5 and 5 of the two bearings 1 and 1 are disposed opposed to each other; a preload Fao is applied not only to the end faces 2b and 2b of the inner rings 2 and 2 situated on the retainer pocket-opening sides 5a and 5a, but also to the end faces 3b and 3b of the outer rings 3 and 3 situated on the retainer pocket counter-opening sides 5b and 5b; and, an initial contact angle between the ball and raceway surface is set at an angle of 15°. Further, according to the present embodiment, there are interposed spacers 7 between the outer rings 3 and 3 of the two bearings 1 and 1. The initial contact angle, as shown in sixth test results which will be discussed later, may be an angle of 5° or more and, preferably, it may be set in the range of 5 to 30°.

The structures of the inner rings 2, outer rings 3, balls 4 and seal plates (or, shield plates) 9 as well as the clearances of the bearings are not limited to any specific ones, but can be selected arbitrarily and thus the detailed description thereof is omitted here.

Also, the method for applying the preload and the quantity of the preload are not limited to any specific ones, but the quantity of the preload can be set at the optimum quantity according to the situation.

According to the ball bearing 1 with the crown-shaped retainer 5, since the preload is applied not only to the inner ring end faces 2b and 2b situated on the retainer pocket-opening sides 5a and 5a, but also to the outer ring end faces 3b and 3b situated on the retainer counter-pocket-opening sides 5b and 5b, and also since the initial contact angle is set at an angle of 15°, there can be designed a bearing apparatus which is low in dynamic friction torque and is small in variations in such dynamic friction torque.

Twenty-Fifth Embodiment

Figure 41:
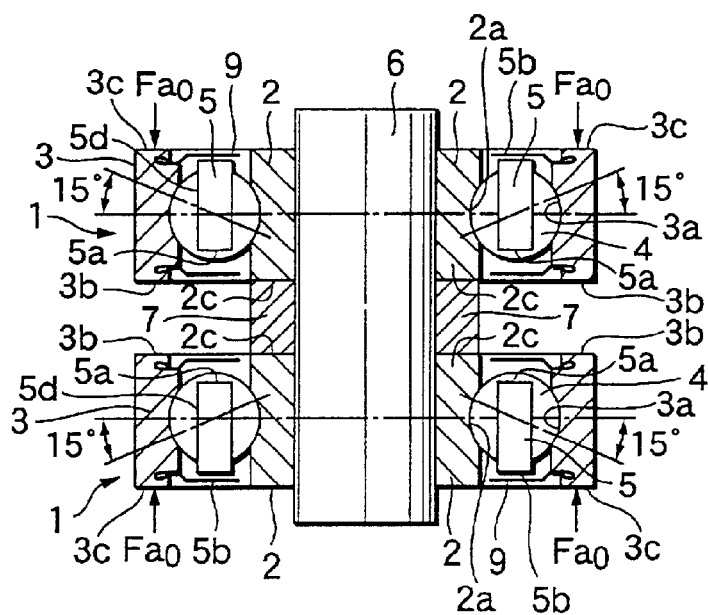
FIG. 41 is a schematic section view of a twenty-fifth embodiment of a bearing apparatus according to the present invention.

FIG. 41 shows a twenty-fifth embodiment of a bearing apparatus according to the present invention.

The present embodiment has the following characteristic elements of the present invention that are different from the twenty-fourth embodiment. That is, the pocket-opening sides 5a and 5a of the respective retainers 5 and 5 of the two bearings 1 and 1 are disposed opposed to each other; and, a preload is applied not only to the end faces 2c and 2c of the inner rings 2 and 2 situated on the retainer pocket-opening sides 5a and 5a, but also to the end faces 3c and 3c of the outer rings 3 and 3 situated on the retainer counter-pocket-opening sides 5b and 5b. The initial contact angle, similarly to the twenty-fourth embodiment, is set at an angle of 15°.

According to the present embodiment, there are interposed spacers 7 between the inner rings 2 and 2 of the two bearings 1 and 1.

The load applying method and direction, as well as the pocket diameter dimension of the retainer 5, are similar to those of the twenty-fourth embodiment. Also, the remaining structures of the inner rings 2, outer rings 3, balls 4 and seal plates 9, as well as the operation effects, of the present bearing apparatus are similar to those of the twenty-fourth embodiment. Therefore, by applying the description of the twenty-fourth embodiment, the detailed description thereof is omitted here.

Sixth Test

Here, description will be given below of a sixth test conducted to confirm the effect of the present invention.

Bearing (which corresponds to JIS695): inside diameter, 5 mm; outside diameter, 13 mm; and width, 4 mm.

Number of rotations: 10000 min-1

Preload: 20N

Time: dynamic friction torque values five minutes after rotation start were measured.

In the sixth test, while changing the initial contact angle in the range of 5 to 30° by changing the clearance of the bearing, the preload direction was changed and the dynamic friction torque was measured.

Figure 42:
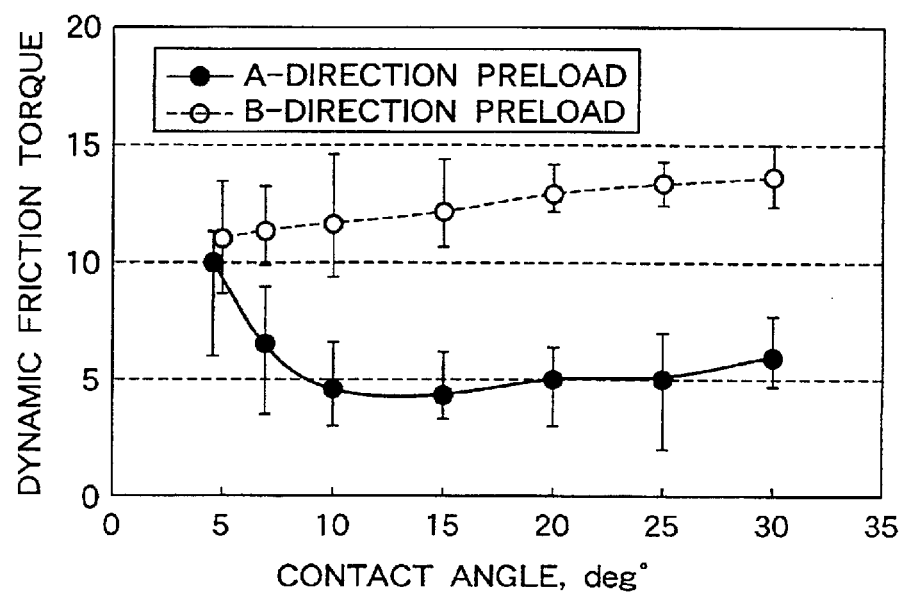
FIG. 42 is a graphical representation of the results of a sixth test conducted to confirm the effects of the present invention.
Figure 43A:
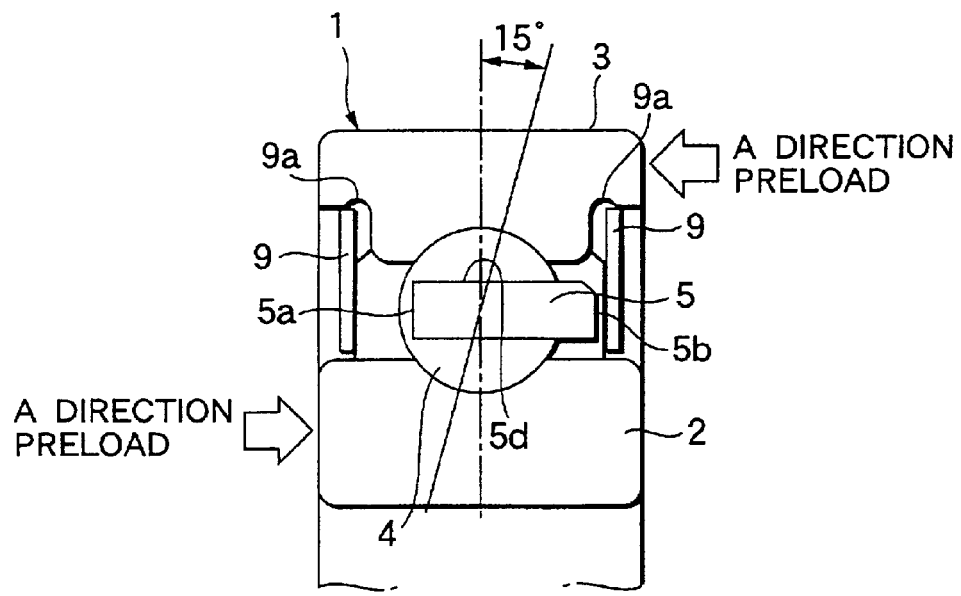
FIGS. 43A and 43B are schematic views of a bearing, showing preload directions; specifically.
Figure 43B:
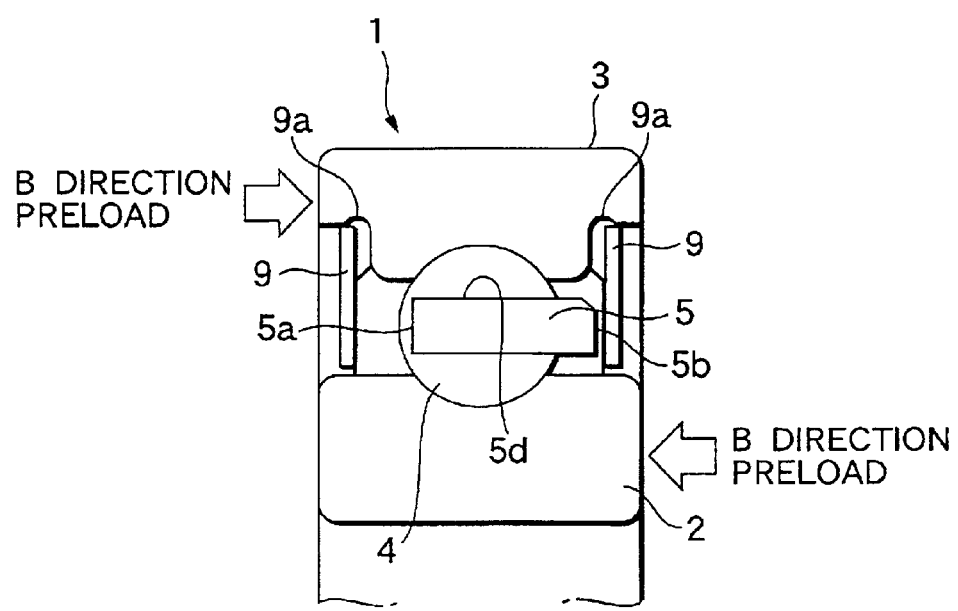

FIG. 42 shows the results of the sixth test. By the way, FIGS. 43A and 43B are, respectively, schematic views which correspond to preload directions A and B shown in FIG. 42. Here, "A-direction preload" means a preload which, as in the twenty-fourth and twenty-fifth embodiments respectively shown in FIGS. 40 and 41, is applied from the portion of the inner ring 2 on the retainer pocket-opening side 5a and from the portion of the outer ring 3 on the retainer counter-pocket-opening side 5b. Additionally, "B-direction preload" means a preload which, reversely to the A-direction preload, is applied from the portion of the inner ring 2 on the retainer counter-pocket-opening side 5b and from the portion of the outer ring 3 on the retainer pocket-opening side 5a.

The results of the sixth test show that, when the preload is applied in the B direction, as the initial contact angle decreases, the dynamic friction torque decreases. On the other hand, when the preload is applied in the A direction, in case where the initial contact angle is 10° or so, the dynamic friction torque is smaller than the A-direction preload; however, in case where the initial contact angle goes below this value, the dynamic friction torque increases suddenly and becomes almost the same as the B-direction preload. In the case of the initial contact angle of 5° or less, there is little difference between the A- and B-direction preloads.

That is, the initial contact angle may be set at 5° or more and, preferably, it may be set 7° or more where the dynamic friction torque provides a sufficiently low value; and, the preload direction may be the direction (A direction) shown in FIGS. 40 and 41.

In the present test, the initial contact angle is set up to 30°. However, when the initial contact angle is excessively large, there is a fear that the load of the ball occurring when the ball moves up onto the raceway surface can be lowered to thereby impair the intrinsic function of the bearing. Therefore, when the preload is large, or when it can be assumed that not only the preload but also an axial-direction force are applied, the initial contact angle must be set at an angle not exceeding the angle at which the ball can move up onto the raceway surface. For example, in the case of the bearing corresponding to JIS695 used in the present test, preferably, the initial contact angle may be set at an angle of 20° or less.

Also, in the respective embodiments, there is employed a combination of two ball bearings. However, the number of ball bearings to be combined is not limited to two; for example, use of a single ball bearing can also provide a similar effect, and use of three or more ball bearings can also provide a similar effect.

According to the bearing apparatus shown in FIG. 40, the marks 11 shown in FIGS. 24A and 24B may be applied, in the case of the axial-direction upper bearing 1, to the end faces (in FIG. 40, the upper end faces) 2b and 3c of the inner and outer rings 2 and 3 of the upper bearing 1 and, in the case of the axial-direction lower bearing 1, to the end faces (in FIG. 41, the lower end faces) 2b and 3c of the inner and outer rings 2 and 3 of the lower bearing 1; that is, the two bearings 1 are assembled together in such a manner that the marks 11 and 11 are not opposed to each other.

Also, according to the bearing apparatus shown in FIG. 41, the marks 11 shown in FIGS. 24A and 24B may be applied, in the case of the axial-direction upper bearing 1, to the end faces (in FIG. 41, the lower end faces) 2c and 3b of the inner and outer rings 2 and 3 of the upper bearing 1 and, in the case of the axial-direction lower bearing 1, to the end faces (in FIG. 41, the upper end faces) 2c and 3b of the inner and outer rings 2 and 3 of the lower bearing 1; that is, the two bearings 1 are assembled together in such a manner that the marks 11 and 11 are opposed to each other.

Effects and Advantages

According to the present invention, since it has the above-mentioned structure, even when the grease, which has moved to the outer raceway when in rotation, collects in a large quantity, since the grease collects from the raceway portions on the counter-contact-angle side to the shoulder portions of the raceways, the distance between the grease and retainer is large and thus the grease is not involved so much with the rotation of the retainer, which makes it possible to settle the bearing apparatus at low torque. Also, even when the grease collecting in the outer raceways is involved with the rotation of the ball, since the grease is scraped in the vicinity of the pawl leading-end portion of the retainer and is held and settled between the pawls respectively interposed between the retainer pockets, the grease is not stirred so much, which provides an effect that the bearing apparatus can be made to settle at low torque. Thus, according to the present invention, there can be provided a bearing apparatus which is small in rotation torque and in variations in such rotation torque as well as is high in rotation accuracy.

As has been described heretofore, according to the present invention, since it is structured in the above-mentioned manner and thus the incorporating direction of the retainer can be distinguished from the outside simply and positively, the assembling directions of the respective bearings can be controlled positively according to the incorporating direction of the retainers. Therefore, in the case of a bearing apparatus incorporating the present bearings into the shaft, the preload can be applied to the inner rings on the retainer opening sides easily and positively, which makes it possible to reduce the rotation torque of the bearing apparatus and variations in such rotation torque, as well as reduce the vibrations of the bearing apparatus that are not synchronous with the rotation thereof.

According to the present invention, due to the above-described structure, there can be realized a bearing apparatus which is high in rotation accuracy, is low in both rotation torque and the variations of such rotation torque, and is able to control an increase in the temperature and the friction thereof for a long period of time. Use of the bearing apparatus having a structure according to the present invention not only can reduce the dynamic friction torque, but also can prevent harmful noises and vibrations possibly caused by poor lubrication. This can enhance the performance of various rotary equipment incorporating the present bearing apparatus, as well as can save energy in such rotary equipment.

According to the present invention, since the ratio Dp/Dw of the pocket diameter (Dp) of the retainer to the ball diameter (Dw) is set such that 1.050>Dp/Dw>1.005, the movement of the retainer can be restricted, which can reduce the noise and vibrations of the bearing apparatus that could be otherwise generated due to the vibrations of the retainer. Also, because the preload is applied not only to the portion of the inner ring situated on the retainer pocket-opening side, but also to the portion of the outer ring on the retainer counter-pocket-opening side, an increase in the dynamic friction torque of the bearing apparatus can be prevented.

Therefore, according to the present invention, due to the above two advantages, there can be provided a bearing apparatus which is very excellent in both of the dynamic friction torque and vibrations thereof.

According to the present invention, since the preload is applied not only to the inner ring on the retainer pocket-opening side, but also to the outer ring on the retainer counter-pocket-opening side, the grease collects on the counter-contact-angle and, as the ball rotates, the grease moves to the retainer pawl side in parallel to the contact angle.

Also, according to the present invention, by setting the pawl height for 20% or less of the outer raceway shoulder position, the scraping of the grease can be controlled, which makes it possible to supply the grease properly.

The above operations can realize such bearing specifications that can provide low torque variations, low torque and low vibrations.

As the bearing apparatus rotates, the grease existing in the interior portion of the bearing is caused to move; and when a preload is applied to the bearing, the movement of the grease is made uneven on the right and left sides in the axial direction of the bearing. That is, it is known that the grease collects on the counter-contact side of the ball with respect to the inner ring or outer ring. According to the present invention, since the preload is applied not only to the portion of the inner ring on the retainer pocket-opening side but also to the portion of the outer ring on the retainer counter-pocket-opening side, and also since the initial contact angle is set at an angle of 5°, the moved grease is hard to accumulate on the outer ring inside diameter, which is situated on the retainer back surface side and is small in space capacity, so that resistance due to stirring of the grease is hard to occur between the outer ring inside diameter and the retainer-back-surface-side outside diameter. This can prevent an increase in the dynamic friction torque of the present bearing apparatus.

What is claimed is:

1. A bearing apparatus comprising a first bearing fixed to a shaft, the first bearing including:

an outer ring having an outer raceway formed in an inner peripheral surface thereof;

an inner ring having an inner raceway formed in an outer peripheral surface thereof;

a crown-shaped retainer interposed between the outer and inner rings so as to be rotated with respect to the outer and inner rings; and a plurality of balls rotatably held in a plurality of pockets formed in the crown-shaped retainer, wherein a preload is applied to a retainer pocket-opening side of the inner ring of the first bearing and a retainer counter-pocket-opening side of the outer ring of the first bearing, and wherein an indicating arrangement, allowing the incorporating-direction of the retainer to be distinguished, is provided on at least one axial-direction end face of the bearing apparatus.

2. The bearing apparatus as set forth in claim 1, wherein the bearing apparatus is of an outer-ring rotation type or of an inner-ing rotation type.

3. The bearing apparatus structured as set forth in claim 1, wherein the crown-shaped retainer has at least a rolling element sliding contact surface formed as a rough surface.

4. The bearing apparatus as set forth in claim 1, wherein a ratio Dp/Dw of a pocket diameter (Dp) of the retainer to a diameter of the ball (Dw) is set such that 1.050>Dp/Dw>1.005.

5. The bearing apparatus as set forth in claim 1, wherein an initial contact angle between the ball and a raceway surface of either raceway is set at an angle of 5° or more.

6. The bearing apparatus as set forth in claim 5, wherein the first bearing and a second bearing are fixed to the shaft and the retainers of the first and second bearings are disposed in such a manner that respective counter-pocket-opening sides of the retainers are opposed to each other.

7. The bearing apparatus as set forth in claim 5, wherein two seal plates are respectively disposed on the two axial-direction end portions of the bearing, and an indicating arrangements, allowing the incorporating direction of the retainer to be distinguished, are provided on the two axial-direction end portions of and differ in color from each other.

8. A bearing apparatus comprising two bearings fixed to a shaft, each bearing including:

an outer ring having an outer raceway formed in an inner peripheral surface thereof;

an inner ring having an inner raceway formed in an outer peripheral surface thereof;

a crown-shaped retainer interposed between the outer and inner rings so as to be rotated with respect to the outer and inner rings; and a plurality of balls rotatably held in a plurality of pockets formed in the crown-shaped retainer, wherein a preload is applied to the retainer pocket-opening sides of the respective inner rings of the two bearings and the retainer counter-pocket-opening sides of the respective outer rings of the two bearings, and wherein the respective retainers of the two bearings are incorporated in such a manner that the pocket-opening sides of the retainers are opposed to each other.

9. The bearing apparatus as set forth in claim 8, wherein the respective retainers of the two bearings are incorporated in such a manner that the counter-pocket-opening sides of the retainers are opposed to each other.

10. The bearing apparatus structured as set forth in claim 8 wherein the crown-shaped retainers have at least a rolling element sliding contact surface formed as a rough surface.

11. The bearing apparatus as set forth in claim 8, wherein a ratio Dp/Dw of a pocket diameter (Dp) of the retainer to the diameter of the ball (Dw) is set such that 1.050>Dp/Dw>1.005.

12. A bearing apparatus comprising two bearings structured such that a preload is applied to respective outer rings of the two bearings by a spring interposed between the respective outer rings in a direction so as to separate the outer rings from each other, wherein crown-shaped retainers of the two bearings are incorporated in such a manner that respective counter-pocket-opening sides of the retainer are opposed to each other.

13. The bearing apparatus as set forth in claim 12, further comprising a shaft fixing the two bearings, wherein the shaft includes a double row raceway so as to receive rolling elements of the two bearings.

14. The bearing apparatus as set forth in claim 12, further comprising a shaft fixed to the bearing and an inner ring, wherein the shaft includes a raceway formed in one side thereof so as to receive rolling elements of one of the two bearings, whereas the inner ring is fixed to the other side of the shaft so as to receive rolling elements of the other of the two bearings.

15. The bearing apparatus as set forth in claim 12, wherein a raceway for balls is formed at least in a portion of the shaft or in a housing.

16. A bearing apparatus comprising two bearings structured such that a preload is applied to respective inner rings of the two bearings by a spring interposed between the respective inner rings in a direction so as to separate the inner rings from each other, wherein crown-shaped retainers of the two bearings are incorporated in such a manner that respective pocket-opening sides of the retainers are opposed to each other.

17. A rolling bearing comprising:
an inner ring having an inner raceway formed in an outer peripheral surface thereof;
an outer ring having an outer raceway formed in an inner peripheral surface thereof;
a plurality of rolling elements rotatably interposed between the inner raceway and the outer raceway;
a crown-shaped retainer for holding the rolling elements at regular intervals; and,
a seal ring interposed between the inner and outer rings for sealing grease or lubricating oil filled into a bearing space or for preventing dust from being generated to the outside;
wherein an indicating arrangement, allowing the incorporating-direction of the retainer to be distinguished is provided on at least one axial-direction end face of the bearing.

18. The rolling bearing as set forth in claim 17, wherein the indicating arrangement is a mark provided on one axial-direction thereof.

19. The rolling bearing as set forth in claim 18, wherein the mark includes a toothing.

20. The rolling bearing as set forth in claim 17, wherein the indicating arrangement is provided on a seal ring disposed on an axial-direction end face of the bearing.

21. The rolling bearing as set forth in claim 17, wherein the indicating arrangements are indicating seal rings, which are respectively disposed on both axial-direction end faces of the bearing, and which differ in color from each other.

22. The bearing apparatus, wherein a bearing as set forth in claim 17 is fixed to a shaft and a preload is applied to a retainer pocket-opening side of the inner ring and a retainer counter-pocket-opening side of the outer ring.

23. A ball bearing, comprising:
an inner ring having an inner raceway formed in an outer peripheral surface thereof;
an outer ring having an outer raceway formed in an inner peripheral surface thereof;
a plurality of balls rotatably incorporated between the inner raceway and the outer raceway; and,
a crown-shaped retainer for holding the balls at regular intervals;
wherein a preload is applied to a pocket-opening side of the inner ring of the retainer and a counter-pocket-opening side of the outer ring of the retainer, and a pawl height T of the retainer is set to 20% or less of a diameter Da of the ball (T<20%×Da), as measured from a shoulder position of the raceway of the outer ring.

24. The ball bearing as set forth in claim 23, wherein an indicating arrangement, allowing the incorporating-direction of the retainer to be distinguished, is provided on the two axial-direction end faces of the ball bearing.

25. A bearing apparatus, wherein a ball bearing as set forth in claim 23 is incorporated into a shaft.

* * * * *